United States Patent
Takada et al.

(10) Patent No.: US 8,286,771 B2
(45) Date of Patent: Oct. 16, 2012

(54) ROTATIONAL DIRECTION SWITCHING CLUTCH UNIT

(75) Inventors: Seiichi Takada, Kuwana (JP); Tsutomu Maiwa, Kuwana (JP)

(73) Assignee: NTN Corporation, Osaka (JP)

( * ) Notice: Subject to any disclaimer, the term of this patent is extended or adjusted under 35 U.S.C. 154(b) by 565 days.

(21) Appl. No.: 12/528,484

(22) PCT Filed: Feb. 26, 2008

(86) PCT No.: PCT/JP2008/053276
§ 371 (c)(1),
(2), (4) Date: Aug. 25, 2009

(87) PCT Pub. No.: WO2008/105401
PCT Pub. Date: Sep. 4, 2008

(65) Prior Publication Data
US 2010/0089714 A1    Apr. 15, 2010

(30) Foreign Application Priority Data

| Feb. 28, 2007 | (JP) | 2007-050152 |
| Mar. 30, 2007 | (JP) | 2007-092855 |
| Apr. 17, 2007 | (JP) | 2007-108441 |
| May 30, 2007 | (JP) | 2007-143518 |
| Feb. 22, 2008 | (JP) | 2008-041547 |

(51) Int. Cl.
*F16D 41/20* (2006.01)
*F16D 21/02* (2006.01)
*F16D 13/08* (2006.01)

(52) U.S. Cl. ..... 192/41 S; 192/48.92; 192/51; 192/81 C

(58) Field of Classification Search ................. 192/41 S, 192/43
See application file for complete search history.

(56) References Cited

U.S. PATENT DOCUMENTS

| 3,304,793 A | * | 2/1967 | Nishimura | 192/51 |
| 4,825,988 A | * | 5/1989 | Nishimura | 192/41 S |
| 5,159,854 A | * | 11/1992 | Mino et al. | 192/48.92 |

FOREIGN PATENT DOCUMENTS

| JP | 4-282031 A | 10/1992 |
| JP | 7-4445 A | 1/1995 |
| JP | 2002-154727 A | 5/2002 |

OTHER PUBLICATIONS

International Search Report issued Apr. 1, 2008 in International (PCT) Application No. PCT/JP2008/053276, filed Feb. 26, 2008.

* cited by examiner

*Primary Examiner* — Richard M. Lorence
(74) *Attorney, Agent, or Firm* — Wenderoth, Lind & Ponack, LLP.

(57) ABSTRACT

A clutch unit includes axially arranged input, output and reverse input gears, and a spring clutch. The input and output gears respectively include radially opposed input and output clutch portions. The spring clutch is tightly bound to the input clutch portion and includes coil springs each having transmission and release hooks. With the transmission hooks in engagement with the output clutch portion, the release hooks are spaced forward from the transmission hooks. From an unlocking state, when the release portion is reverse rotated by distance c while pushing the release portions, the spring clutch is unlocked, and when a reverse rotational portion is reverse rotated by distance b, it engages a reverse rotation engaging portion. When the release portion is further reverse rotated after the spring clutch has been unlocked by distance a, the release portion engages the hook engaging portion and stops. a>b>c.

20 Claims, 50 Drawing Sheets

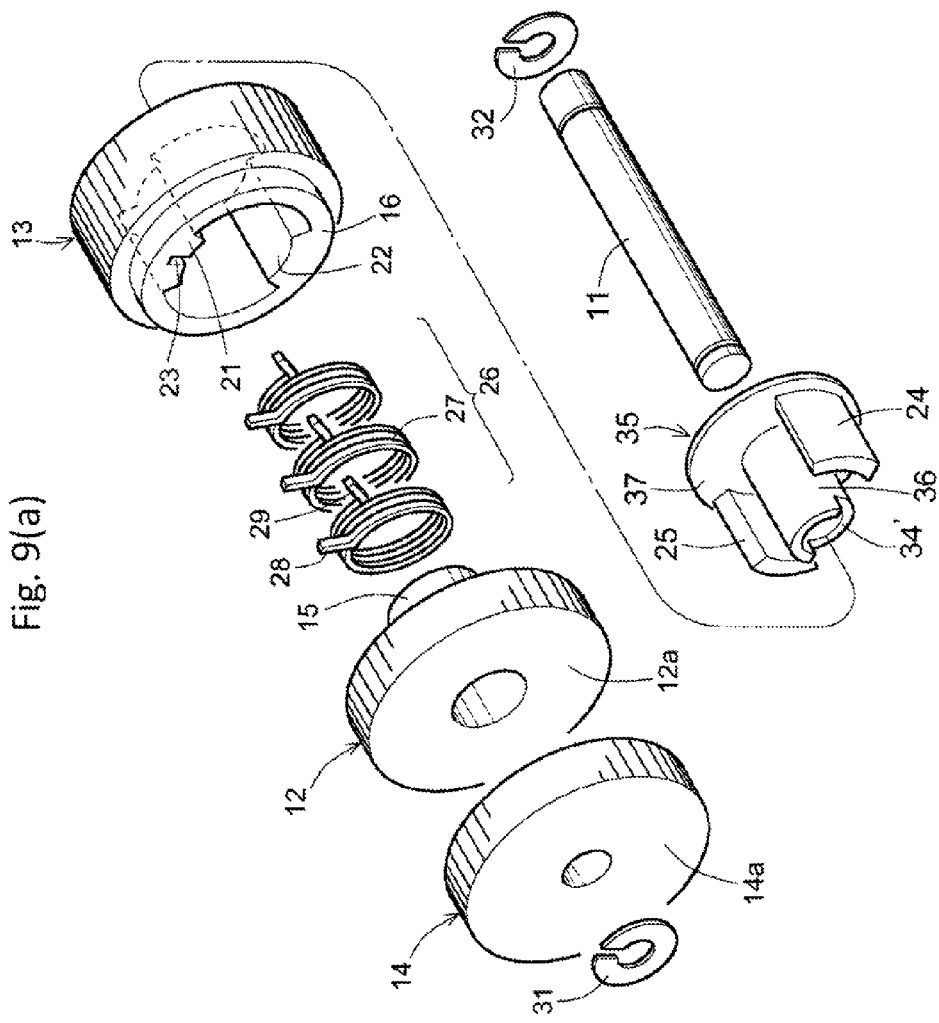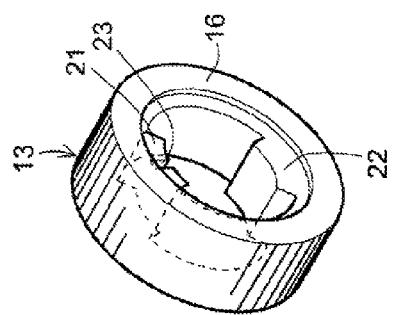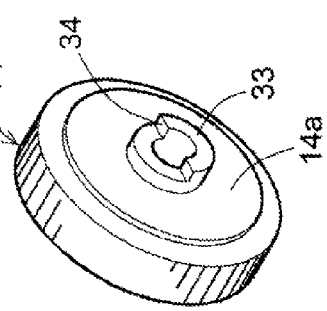

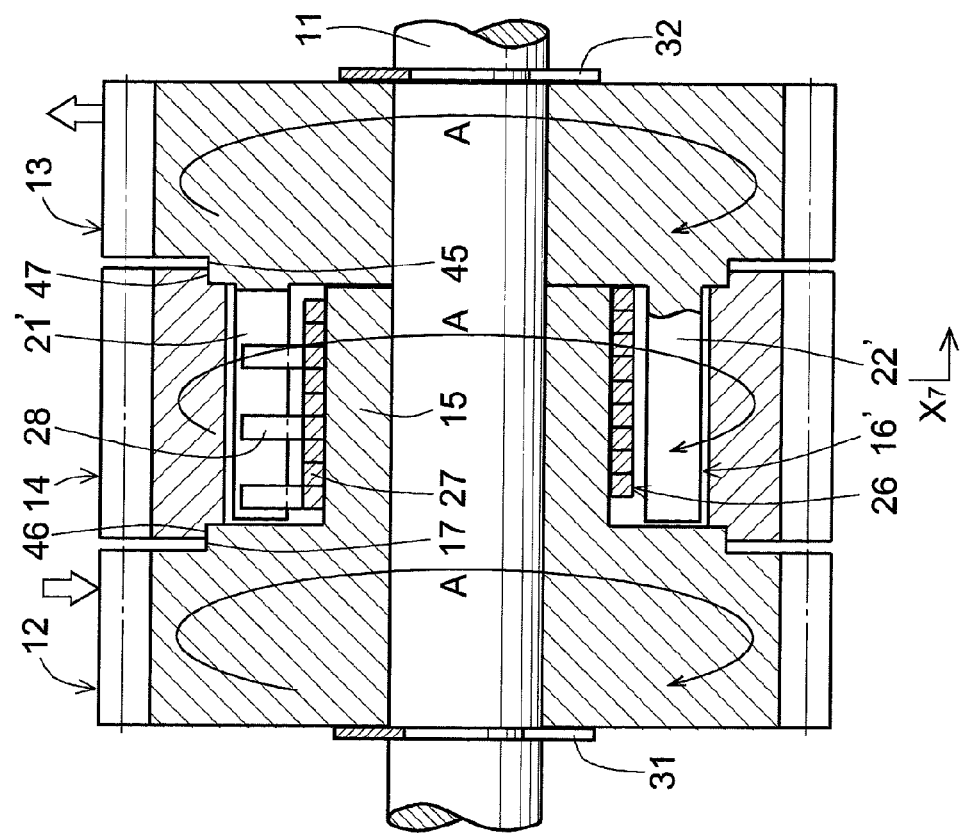
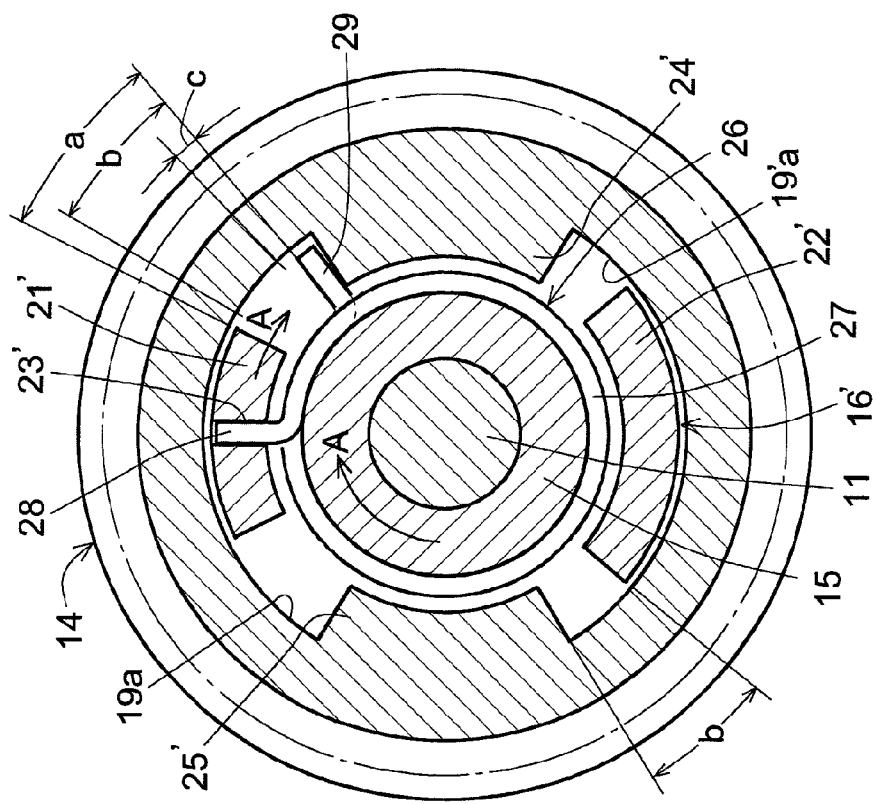

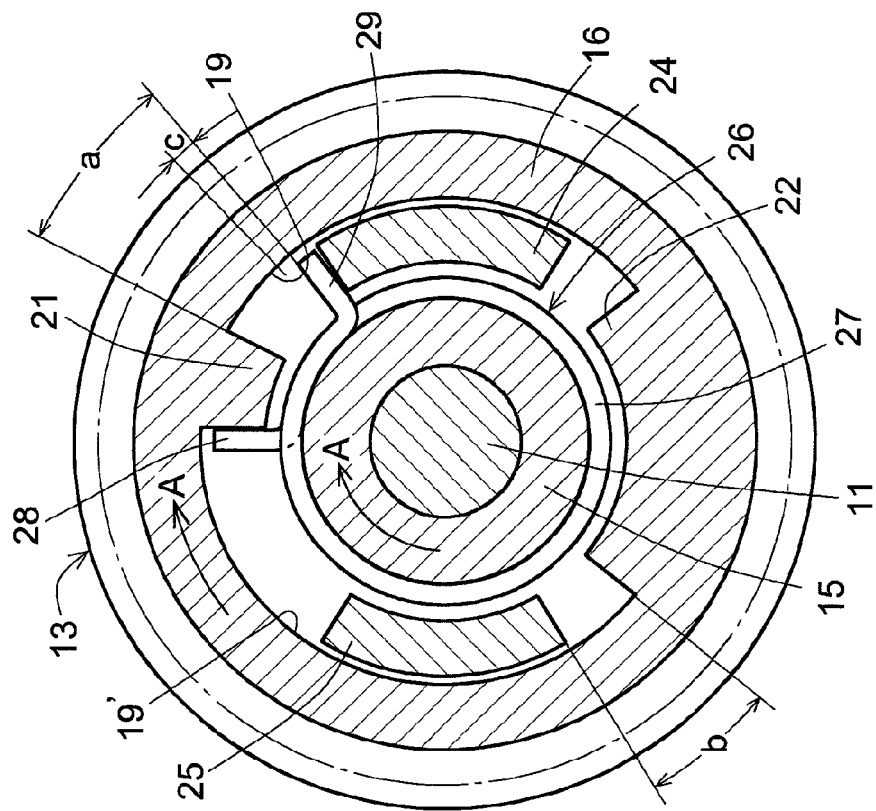
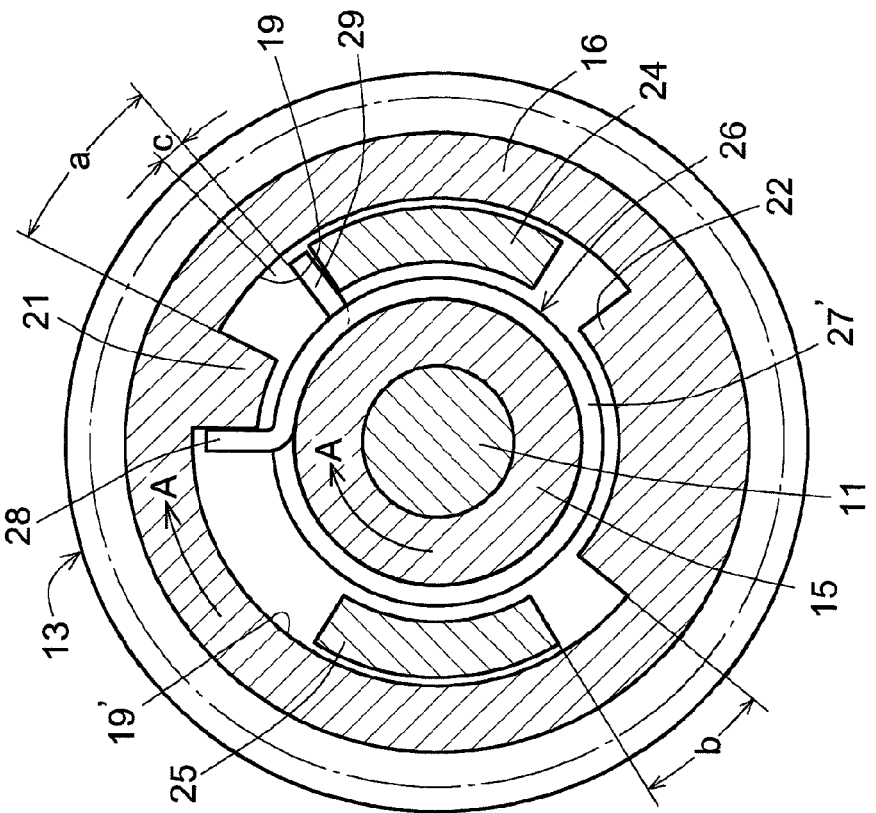

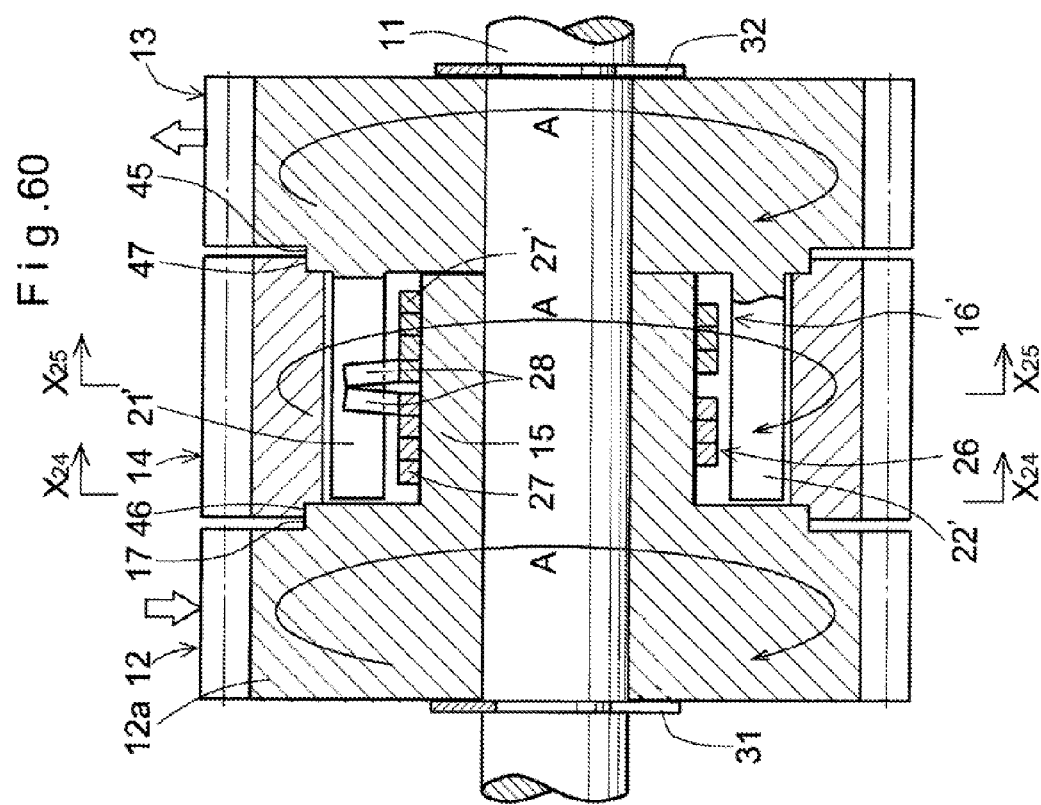

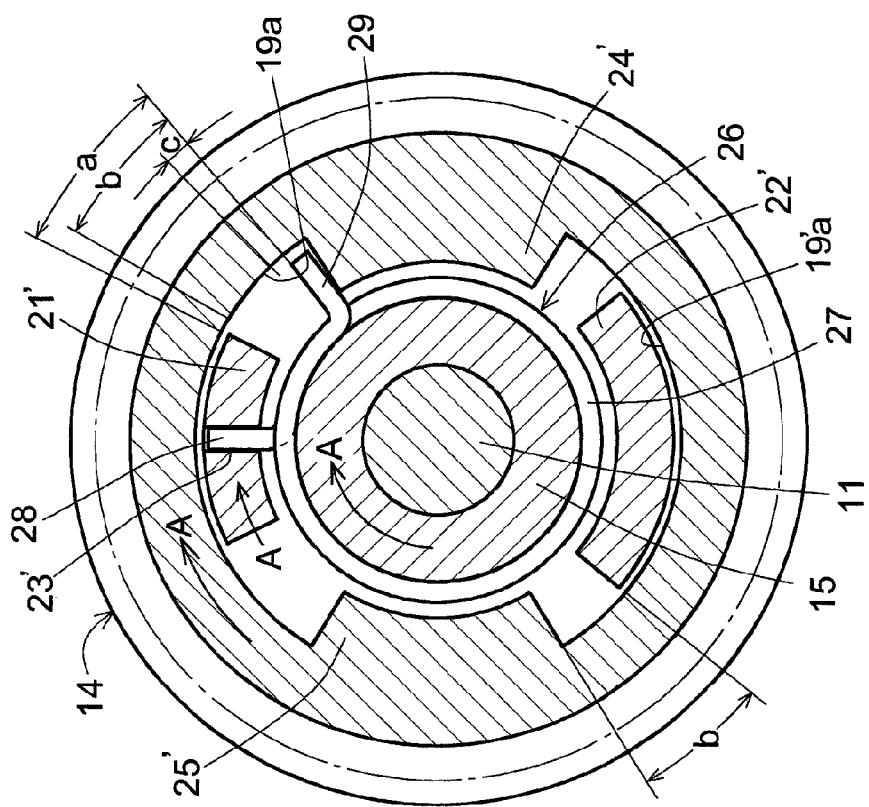
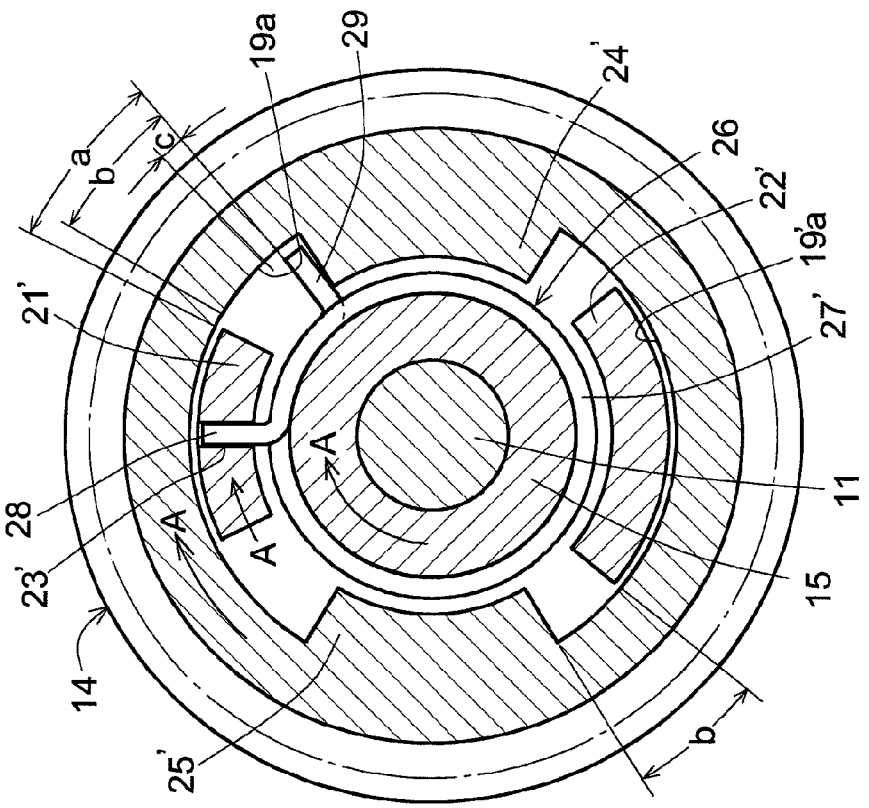

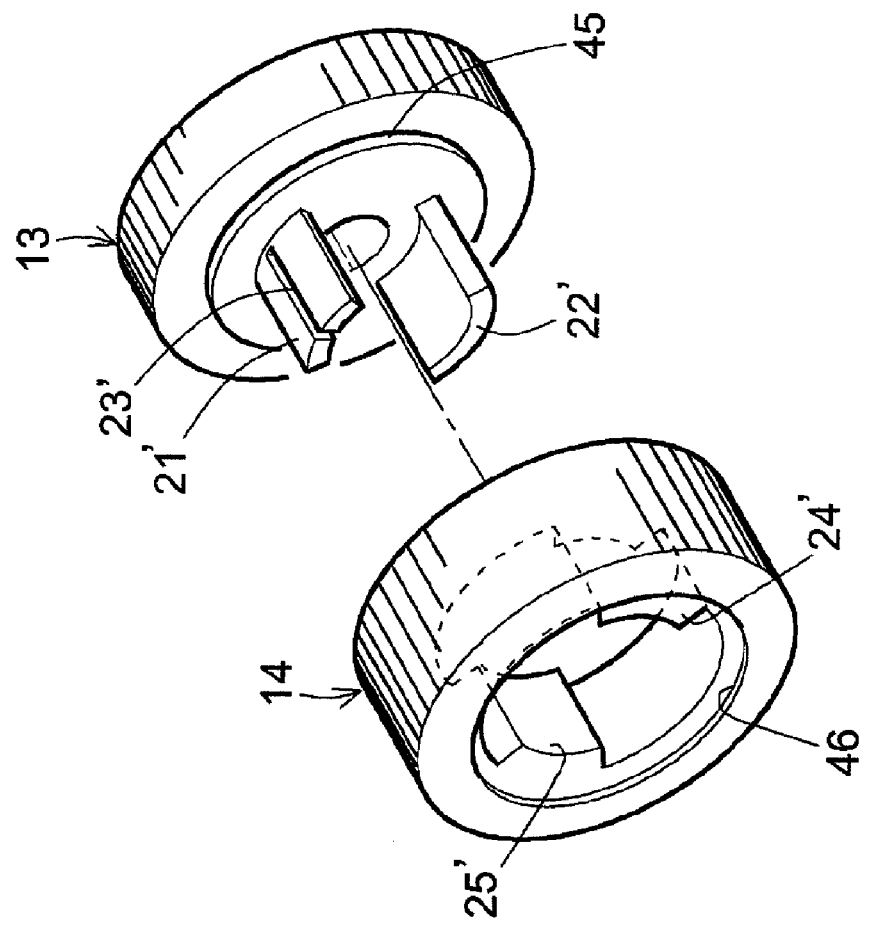

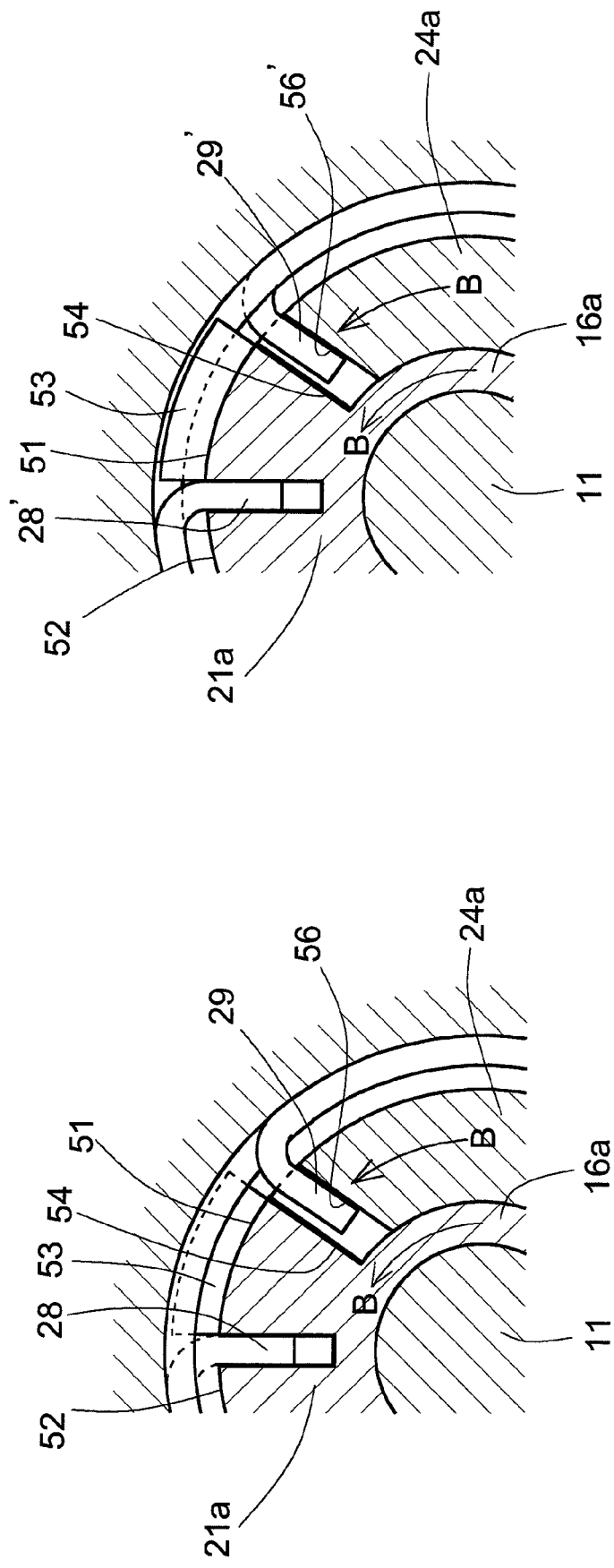

ROTATIONAL DIRECTION SWITCHING CLUTCH UNIT

BACKGROUND OF THE INVENTION

1. Technical Field

This invention relates to a rotational direction switching clutch unit used e.g. in office machines.

2. Background Art

In a paper feed mechanism of an office machine such as a copier, in order to switch the paper feed direction between forward and backward, it is necessary to selectively connect the paper feed mechanism to one of forward and reverse rotational driving sources, thereby selectively driving the paper feed mechanism in the forward or reverse rotational direction.

For this purpose, it is known to use a rotational direction switching clutch unit using a spring clutch (Patent document 1, FIG. 3).

The clutch unit disclosed in Patent document 1 includes an output gear having a boss portion, and an input gear having a boss portion rotatably fitted around the boss portion of the output gear. A spring presser is threaded onto the front end portion of the boss portion of the output gear. A coil spring as a spring clutch is tightly wrapped around the radially outer surface of the boss portion of the input gear. A control gear is fitted around the coil spring. In order to lock and unlock the spring clutch, the control gear is selectively turned in one and the other directions, thereby twisting the coil spring in one and the other directions and radially expanding and compressing the coil spring. The input gear is coupled to a driving source for forward rotation. The control gear is coupled to a reverse rotational driving source through a rotation delaying device and an electromagnetic clutch. A reverse input transmission gear which is branched from the rotation delaying device meshes with the output gear.

In this clutch unit, when the spring clutch is locked, driving force in the forward rotational direction is transmitted to the output gear through the spring clutch. In this state, when the electromagnetic clutch is turned on, the driving force in the reverse rotational direction is transmitted to the control gear, so that the spring clutch is unlocked and transmission of driving force in the forward rotational direction is shut off. Then, with a time delay due to the rotation delaying device, reverse rotation is transmitted to the output gear. The rotation delaying device is provided to compensate for the delay in clutching action when the spring clutch is compressed and expanded, thereby ensuring transmission and non-transmission of driving force.

Patent document: JP Patent Publication 2002-154727A ("Embodiments" and FIGS. 3 and 4)

This rotational direction switching clutch unit requires the control gear to selectively radially expand and compress the coil spring as the spring clutch, and also the transmission gear for reverse input. The clutch unit further needs the rotation delaying device to compensate for the delay in clutching action of the spring clutch. Thus, this clutch unit requires a large number of component parts and complicated in structure, and is thus costly.

SUMMARY OF THE INVENTION

An object of the present invention is to simplify the structure of the rotational direction switching clutch unit, thereby reducing its cost, by improving the way the spring clutch is controlled.

In order to achieve this object, the rotational direction switching clutch unit according to this invention basically comprises, as shown in FIGS. 1 to 6, an input gear 12, an output gear 13, and a reverse input gear 14 that are coaxial with each other and arranged in the axial direction, and a spring clutch 26.

In addition to this basic structure, the rotational direction switching clutch unit according to this invention has the following structures. That is, the input gear 12 includes an input clutch portion 15, and the output gear 13 includes an output clutch portion 16 that radially faces the input clutch portion 15.

The spring clutch 26 comprises coil springs 27. The coil springs 27 are tightly bound to the input clutch portion 15 with such directivity that they lock onto the clutch portion 15 when the input clutch portion 15 rotates in the forward rotational direction A. Each coil spring 27 has a transmission hook 28 at one end thereof and a release hook 29 at the other end. With the transmission hook 28 in engagement with a hook engaging portion 21 of the output clutch portion 16, the release hook 29 is located forward of the transmission hook 28 in the forward rotation direction A by a predetermined distance.

The reverse input gear 14 includes a release portion 24 axially protruding into a radial space between the input clutch portion 15 and the output clutch portion 16. The release portion 24 faces the release hooks 29 in the reverse rotational direction B.

From the state where the release portion 24 has rotated in the reverse rotational direction B until it contacts the release hooks 29, i.e. from the unlocking starting state, the distance c by which the release portion 24 moves while pushing the release hooks 29 in the reverse rotational direction B until the spring clutch 26 is unlocked is smaller than the distance a by which the release portion 24 moves while pushing the release hooks 29 until the release hooks 29 engage the hook engaging portion 21 (a>c).

According to the present invention, the "forward rotational direction A" refers to the right-hand rotation as viewed from the left-hand side of FIG. 1, and the "reverse rotational direction B" refers to the rotational direction opposite to the forward rotational direction (see FIG. 4). The language "facing in the reverse rotational direction B" means that when the release portion 24 rotates by a predetermined rotational angle in the reverse rotational direction B relative to the release hooks 29, they engage each other. This is applicable to the situation where, as described below, a reverse rotating portion 25 faces a reverse rotation engaging portion 22.

In this rotational direction switching clutch unit, when driving torque in the forward rotational direction A is applied from the input gear 12 (see FIGS. 2 and 3), since the input clutch portion 15 rotates in the forward rotational direction A, the spring clutch 26 is locked, thus allowing the driving torque to be transmitted through the transmission hooks 28 of the spring clutch 26 to the output clutch portion 16 and the output gear 13, which is integral with the clutch portion 16.

When driving torque in the reverse rotational direction B is applied from the reverse input gear 14 while torque in the forward rotational direction A is being transmitted from the input gear 12 to the output gear 13 (FIGS. 4 and 5), in order to switch the rotational direction of the output members, the release portion 24 of the reverse input gear 14 contacts the release hooks 29 (unlocking starting state) and then pushes the release hooks 29 by the distance c in the reverse rotational direction B, thereby unlocking the spring clutch 26.

When the release portion 24 further rotates from this unlocked state until the release hooks 29 are pushed by the distance a as a whole (see chain line in FIG. 6(a)), the release hooks 29 engage the hook engaging portion 21. In this state, driving torque in the reverse rotational direction B is transmitted to the output gear 13. Because the distances a and c are determined to satisfy the relation a>c, the spring clutch 26 is unlocked first and then with a predetermined time delay, transmission of torque in the reverse rotational direction B begins.

As shown in FIGS. 1 through 5, the reverse input gear 14 may include, besides the release portion 24, a reverse rotational portion 25 axially protruding into the space between the input clutch portion 15 and the output clutch portion 16 so as to face the reverse rotation engaging portion 22 in the reverse rotational direction B.

In this case, the distances a, b and c are determined to satisfy the relation a>b>c, where c is the distance by which the release portion 24 moves from the above unlocking starting state until the spring clutch 26 is unlocked by pushing the release hooks 29, b is the distance by which the reverse rotational portion 25 moves from the unlocking starting state until it engages the reverse rotation engaging portion 22, and a is the distance by which the release portion 24 moves from the unlocking starting state until it engages the hook engaging portion 21 while pushing the release hooks 29.

In the same manner as in the first case, when the release portion 24 moves by the distance c from the unlocking starting state while pushing the release hooks 29, the spring clutch 26 is unlocked. When the reverse rotational portion 25 rotates by the distance b, it engages the reverse rotation engaging portion 22 of the output gear 13, so that driving torque in the reverse rotational direction B is transmitted to the output gear 13. Since the distances b and c satisfy the relation b>c, the driving torque in the reverse rotational direction B is transmitted with a predetermined time delay after the spring clutch 26 has been unlocked.

Because the distances a and b satisfy the relation a>b, it is possible to prevent the release portion 24 from engaging the hook engaging portion 21, thus allowing transmission of torque in the reverse rotational direction B, before the reverse rotational portion 25 engages the reverse rotation engaging portion 22, thereby transmitting torque in the reverse rotational direction B.

As for the embodiment of FIGS. 18 to 23 (Embodiment 4), in which the output clutch portion 16, and the hook engaging portion 21 and the reverse rotation engaging portion 22, which are integral with the output clutch portion 16, are modified, though its function is the same, it differs from the previous embodiments in the forms of the output clutch portion 16, hook engaging portion 21, reverse rotation engaging portion 22, release portion 24 and reverse rotational portion 25. Thus, in claims, dash (') is attached to the numeral indicating each of the above elements in Embodiment 4 to distinguish them from the corresponding elements in the previous embodiments.

The spring clutch may comprise an even number of coil springs that are arranged axially close to each other, and wherein half of the coil springs is or are wound in an opposite direction to the other half of the coil springs. With this arrangement, while the spring clutch 26 is unlocked, because thrust forces produced in half of the coil springs and the other of the coil springs due to idling of the input clutch portion 15 are opposite in direction to each other, these thrust forces cancel each other and do not influence the operation of the clutch unit.

The spring clutch 26 may be of an externally mounted type comprising coil springs tightly bound to the radially outer surface of the input clutch portion 15, or, as shown in FIG. 65, may be of an internally mounted type comprising coil springs tightly bound to the radially inner surface of the input clutch portion 15a. With the internally mounted type, since the radius of the spring clutch 26a is larger than with the externally mounted type, bending moment applied to the transmission hooks 28 is smaller.

ADVANTAGES OF THE INVENTION

According to the present invention, the following advantages are achieved.

(1) Since driving torque in the forward rotational direction A is transmitted by locking the spring clutch 26, 26a disposed between the input gear 12 and the output gear 13, and by applying torque in the reverse rotational direction B from the reverse input gear 14, transmission of torque in the forward rotational direction A is shut off, and then with a predetermined time delay, a portion of the output gear 13 (reverse rotational portion 25 or release portion 24, 24', 24a) is brought into engagement with a portion of the output gear 13 (reverse rotation engaging portion 22 or hook engaging portion 21, 21', 21a), thereby transmitting torque in the reverse rotational direction B, the reverse input gear 14 serves both to control the spring clutch 26 and to transmit driving torque to the output gear 13. This eliminates the necessity of an independent control member such as a control gear, thereby making it possible to reduce the number of parts.

(2) When the direction of torque transmission is switched to the reverse rotational direction B, torque is transmitted with a predetermined time delay. Thus, the spring clutch 26, 26a is reliably unlocked.

(3) Since the time delay is achieved by the relative movement between the portion of the reverse input gear 14 and the portion of the output gear 13, no special time delay device is necessary. This reduces the number of parts and simplifies the structure.

(4) As shown in the embodiments, since the present invention offers a variety of axial layouts of the input gear 12, output gear 13 and reverse input gear 14, it is possible to select the optimum layout according to the arrangements of the driving sources of the device to which the clutch unit according to the present invention is mounted.

(5) Since the spring clutch 26 is unlocked while torque in the reverse rotational direction B is being transmitted, it is possible to minimize the idling torque applied to the input gear 12, which keeps rotating, thus minimizing wear of the input clutch portion 15.

(6) In the arrangement in which the coil springs 27 and 27a forming the spring clutch 26, 26a are mounted on the radially inner surface of the input clutch portion 15, 15a (internally mounted type), it is possible to reduce bending moment that acts on the transmission hooks 28. By providing the hook reinforcing protrusion 53, it is possible to further extend the life of the transmission hooks 28.

(7) In the arrangement in which the spring clutch 26, 26a comprises a plurality of coil springs 27 and 27' wherein half of the coil springs is or are wound in an opposite direction to the other of the coil springs, thrust forces S produced in the respective coil springs cancel each other, thereby preventing the rotation of the input gear 12 or the output gear 13 from being influenced by such thrust forces, so that the gears 12 and 13 can rotate smoothly.

BRIEF DESCRIPTION OF THE DRAWINGS

FIG. 9(a) is an exploded perspective view of Embodiment 2; FIG. 9(b) is a perspective view of the output gear; and FIG. 9(c) is a perspective view of the reverse input gear.

FIG. 18 is a sectional view of Embodiment 4.

FIG. 19 is a sectional view taken along line X7-X7 of FIG. 18.

FIG. 32 is a sectional view taken along line X11-X11 of FIG. 30.

FIG. 33 is a sectional view taken along line X12-X12 of FIG. 30.

FIG. 60 is a sectional view of Embodiment 11.

FIG. 61 is a sectional view taken along line X24-X24 of FIG. 60.

FIG. 62 is a sectional view taken along line X25-X25 of FIG. 60.

FIG. 63 is a partial exploded perspective view of Embodiment 11.

FIG. 75 is a partial enlarged sectional view of a coil spring wound counterclockwise, while torque in the reverse rotational direction is being transmitted.

FIG. 76 is a partial enlarged sectional view of a coil spring wound clockwise, while torque in the reverse rotational direction is being transmitted.

DESCRIPTION OF NUMERALS

Figure 1:
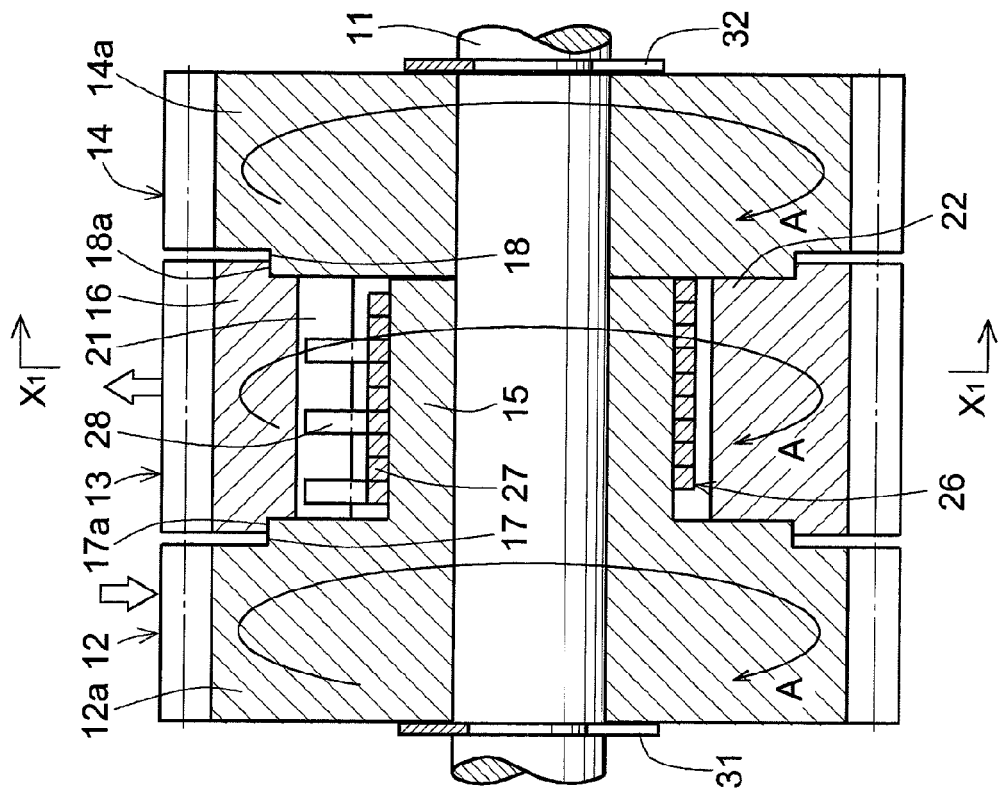
FIG. 1 is a sectional view of Embodiment 1.

11. Fixed shaft
12. Input gear
12a. Gear body
13. Output gear
13a. Gear body
14. Reverse input gear
14a. Gear body
15, 15a. Input clutch portion
16, 16', 16a. Output clutch portion
17. Shoulder
17a. Positioning step
18. Shoulder
18a. Positioning step
19, 19a, 19', 19'a. Receiving recess
20. Engaging groove
21, 21', 21a. Hook engaging portion
22, 22'. Reverse rotation engaging portion
23, 23', 23a. Engaging slit
24, 24', 24a. Release portion
25, 25'. Reverse rotational portion
26, 26a. Spring clutch
27, 27', 27a, 27'a. Coil spring
28, 28'. Transmission hook
29, 29'. Release hook
29a. surface
30. End surface
31, 32. Snap ring
33. Boss portion
34, 34'. Coupling portions comprising a protrusion and a recess.
35. Flange member
36. Flange boss portion
37. Flange portion
38. Boss portion
38'. Small-diameter boss portion
39. Flange member
40, 40'. Coupling portions comprising a protrusion and a recess.
41. Flange boss portion
42, 42'. Flange portion
45. Shoulder
46. Positioning step
47. Positioning step
51. Engaging portion
52. Engaging portion
53. Hook reinforcing protrusion
54. Engaging surface
55. Engaging surface
56, 56'. Engaging groove

BEST MODE FOR EMBODYING THE INVENTION

Now the rotational direction switching clutch units according to the embodiments of the present invention are described with reference to the drawings.

Embodiment 1

The rotational direction switching clutch unit according to Embodiment 1, shown in FIGS. 1 to 6, comprises an input gear 12, an output gear 13 and a reverse input gear 14 that are coaxially mounted on a fixed shaft 11 in this order.

The input gear 12 has an integral cylindrical input clutch portion 15 axially protruding from the center of the inner end surface of the gear body 12a. The input clutch portion 15 has its front end surface in abutment with the inner end surface of the reverse input gear 14. The input clutch portion 15 has a shoulder 17 on its radially outer portion. The reverse input gear 14 includes a gear body 14a having a shoulder 18 formed on its inner end surface so as to axially oppose the shoulder 17 and having the same diameter as the shoulder 17.

The output gear 13 is received between the opposed surfaces of the input gear 12 and the reverse input gear 14. Positioning steps 17a and 18a are formed on the respective end surfaces of the output gear 13, in which the shoulders 17 and 18 are received, respectively, thereby keeping the output gear 13 in position in the radial and thrust directions, while allowing its rotation relative to the gears 12 and 14.

The gear body of the output gear 13 serves as an output clutch portion 16. Thus, the output clutch portion 16 is an integral radially inner portion of the output gear 13. The output clutch portion 16 is concentrically provided around and radially spaced from the input clutch portion 15.

Figure 2:
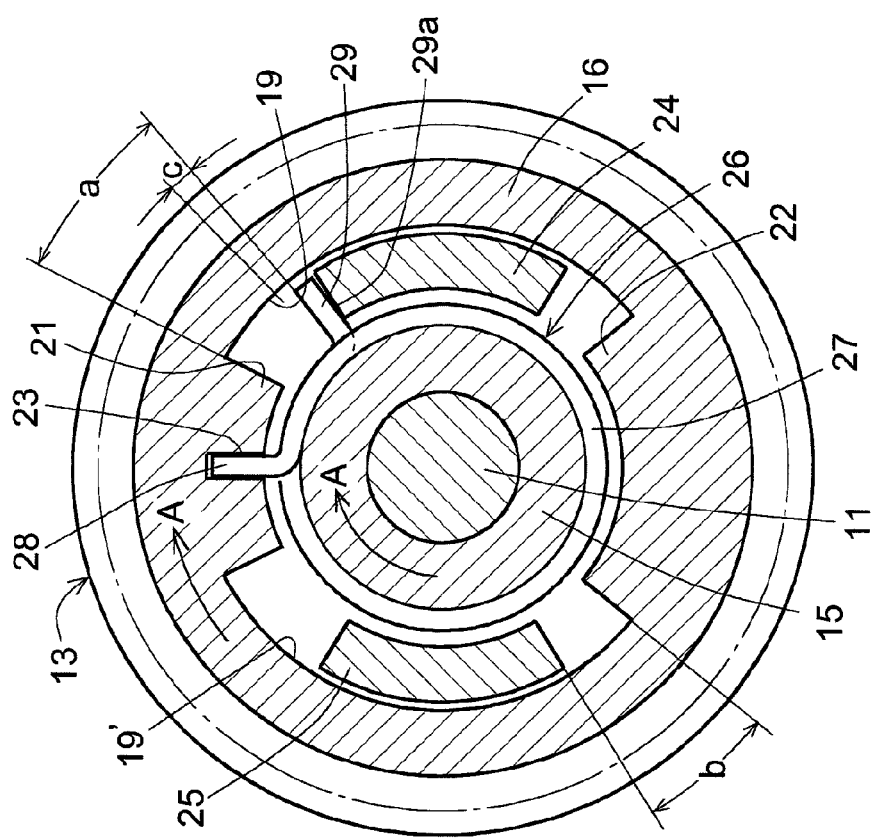
FIG. 2 is a sectional view taken along line X1-X1 of FIG. 1.
Figure 3:
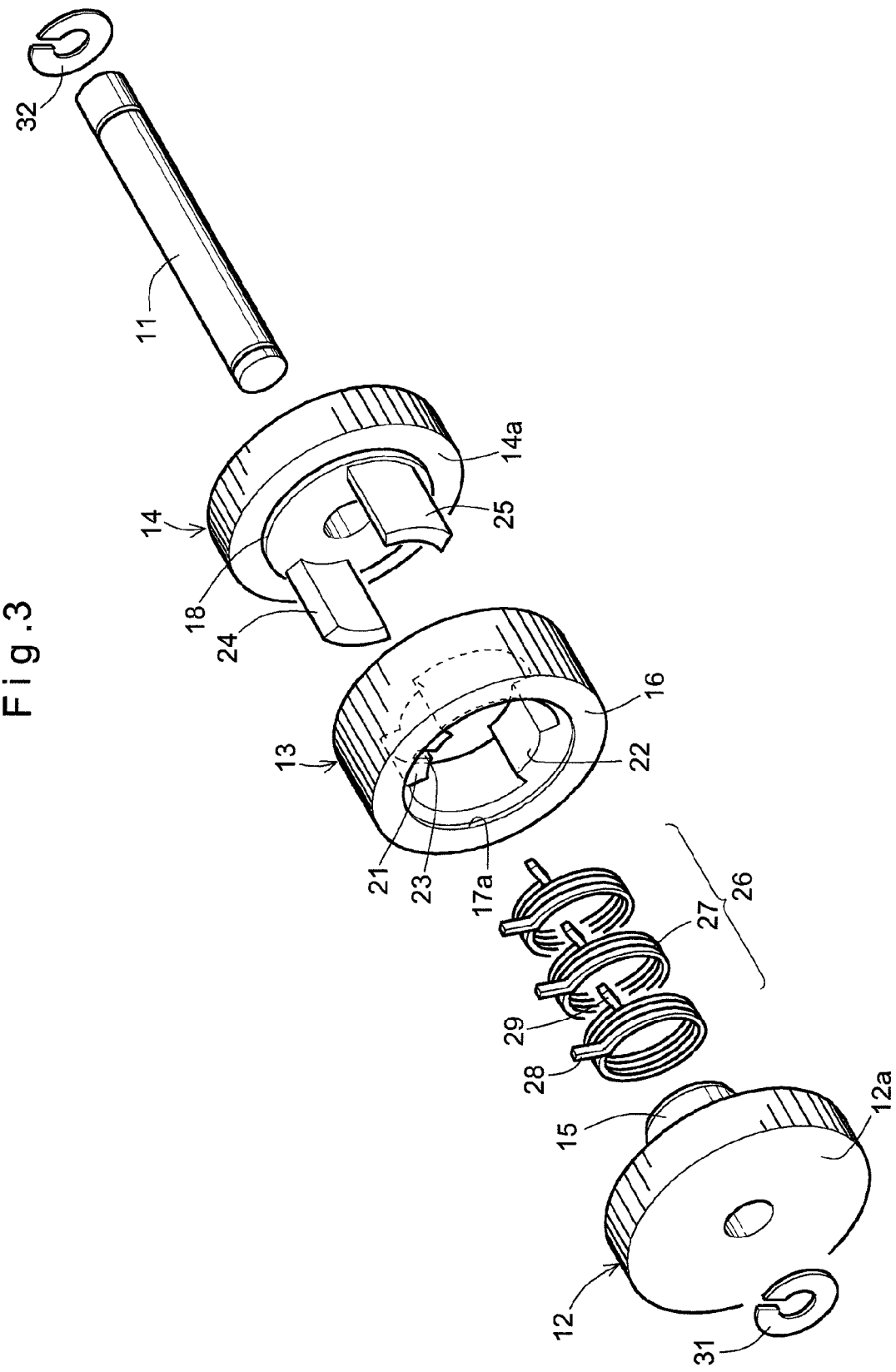
FIG. 3 is an exploded perspective view of Embodiment 1.

The output clutch portion 16 has on its radially inner surface a hook engaging portion 21 and a reverse rotation engaging portion 22, which are radially inwardly extending, axially symmetrical protrusions (see FIGS. 2 and 3). The hook engaging portion 21 has an axial engaging slit 23. The radially inner surfaces between the hook engaging portion 21 and the reverse rotation engaging portion 22 define receiving recesses 19 and 19', respectively.

The reverse input gear 14 has on its inner end surface a release portion 24 and a reverse rotational portion 25 which are axially protruding and axially symmetrical arm-shaped members provided radially inwardly of and along the shoulder 18 (see FIG. 3). The release portion 24 and the reverse rotational portion 25 both have an arcuate section such that they are arranged along the radially inner surfaces of the receiving recesses 19 and 19', respectively, so as to be circumferentially movable in the respective recesses 19 and 19'.

Three coil springs 27 that form a spring clutch 26 are tightly bound to the radially outer surface of the input clutch portion 15, which is an integral portion of the input gear 12, while being axially pressed against each other. Each coil spring 27 is formed by winding a wire having a square cross-section by two-plus times, and has two radially outwardly bent hooks, i.e. a transmission hook 28 and a release hook 29, at the respective ends.

The transmission hooks 28 are received in the engaging slit 23 without circumferential play (see FIG. 2). The release hooks 29 are freely movable at a location circumferentially spaced from the transmission hooks 28 in the forward rotational direction A and between the hook engaging portion 21 and the release portion 24.

When the input clutch portion 15 is rotated in the same direction as the winding direction of the coil springs 27 (clockwise direction in FIG. 2) relative to the output clutch portion 16, the coil springs 27 are radially compressed, so that the spring clutch 26 is locked to the input clutch portion 15. Conversely, when the release portion 24 engages the surface 29a of each release hook 29 (front surface with respect the forward rotational direction A (see FIG. 2); rear surface with respect to the reverse rotational direction B (see FIG. 5)), and pushes the respective release hooks 29 in the direction opposite to the winding direction of the springs 27 (counterclockwise direction in FIG. 2), the spring clutch 26 is unlocked.

The state of FIG. 2 is hereinafter referred to as the "unlocking starting state", wherein with the spring clutch 26 locked, the release portion 24 has rotated in the reverse rotational direction B until it contacts the surfaces 29a of the release hooks 29 and pushes the hooks 29. The letter c indicates the angular distance (which is hereinafter simply referred to as "distance"; the same is true for the distances b and c) by which the release hook 29 moves from the unlocking starting state until the spring clutch 26 is unlocked while pushing the release hooks 29.

The letter b indicates the distance by which the reverse rotational portion 25 moves from the unlocking starting state until it engages the reverse rotation engaging portion 22, and the letter a indicates the distance by which the release portion 24 moves from the unlocking starting state until it engages the hook engaging portion 21 while pushing the release hooks 29. The distances a, b and c are determined to satisfy the relation a>b>c. In any of the below-described embodiments too, the distances a, b and c are determined to satisfy this relation.

In FIG. 1, numerals 31 and 32 designate snap rings.

Now in operation of the rotational direction switching clutch unit of Embodiment 1, when driving torque in the forward direction A (see arrow in FIG. 1) is applied to the input gear 12 from an external driving source, the input clutch portion 15 rotates in the same direction together with the input gear 12, so that the coil springs 27 are radially compressed and the spring clutch 26 is locked (see FIG. 2).

When the spring clutch 26 is locked, torque in the forward rotational direction A is transmitted through the transmission hooks 28 to the output clutch portion 16 and then to the output gear 13, which is integral with the clutch portion 16 (see FIGS. 1 and 2). In this state, the reverse input gear 14 is separated from a reverse rotation driving source, so that it is rotated in the same direction through the engagement of the release hooks 29 with the release portion 24.

Figure 4:
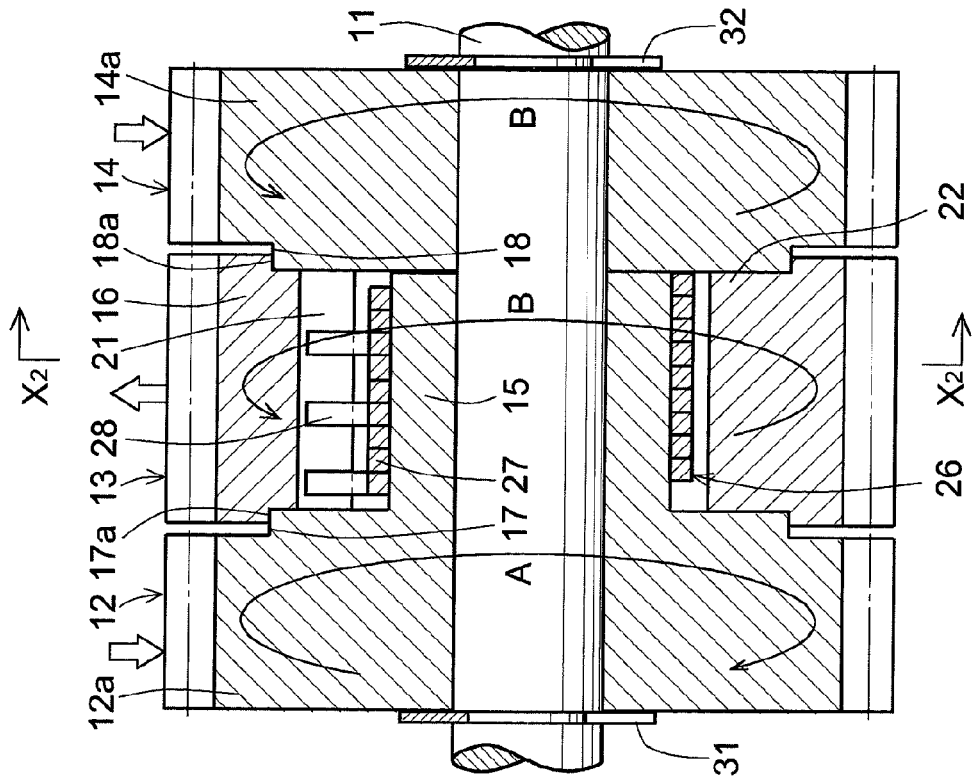
FIG. 4 is a sectional view of Embodiment 1 while torque in the reverse rotational direction is being transmitted.
Figure 5:
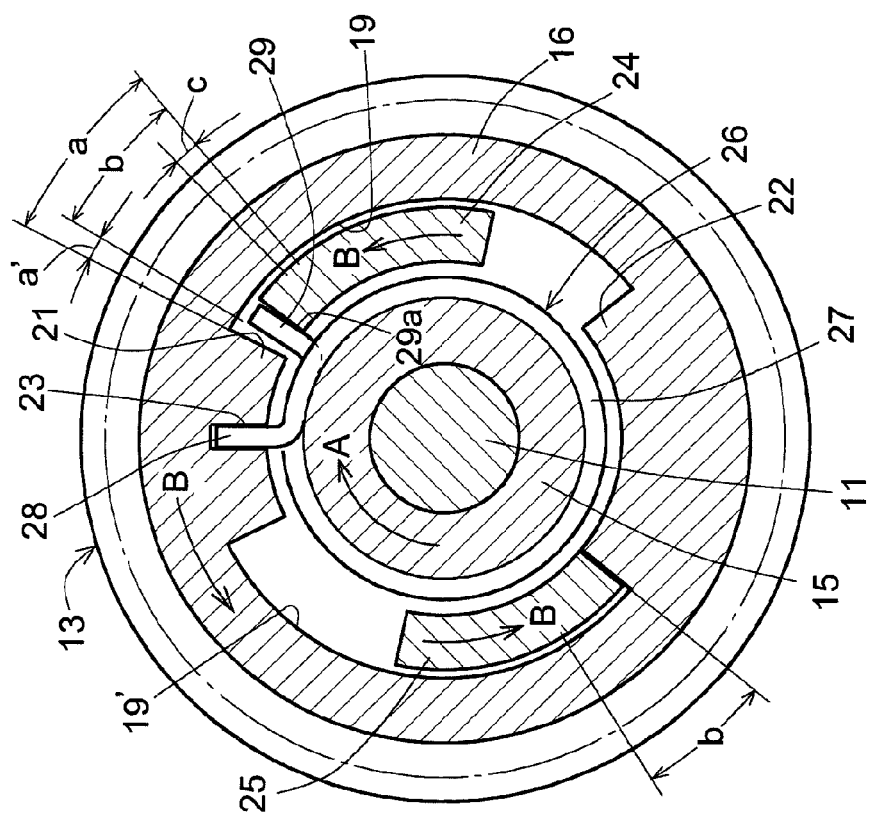
FIG. 5 is a sectional view taken along line X2-X2 of FIG. 4.

With driving torque in the forward rotational direction A being applied to the input gear 12 and thus to the output gear, when driving torque in the reverse rotational direction B is applied to the reverse input gear 14 in order to switch the output rotational direction, as shown in FIGS. 4 and 5, the reverse input gear 14 as well as the release portion 24 and the reverse rotational portion 25, which are integral with the gear 14, rotate in the reverse rotational direction B.

When the release portion 24 rotates in the reverse rotational direction B, and moves from the unlocking starting state, where the release portion 24 contacts the release hooks 29, by the distance c in the reverse rotational direction B, the spring clutch 26 is unlocked, thus preventing transmission of driving torque in the forward rotational direction A to the output gear 13 through the spring clutch 26. The output gear 13 now stops rotating in the forward rotational direction A.

On the other hand, when the reverse rotational portion 25 rotates in the reverse rotational direction B by the distance b, it engages the reverse rotation engaging portion 22 and torque in the reverse rotational direction B is transmitted to the output clutch portion 16 and the output gear 13, which is integral with the output clutch portion 16. In this case, because the distances b and c are determined to satisfy the relation b>c, after the spring clutch 26 has been unlocked and the transmission of torque in the forward rotational direction A to the output gear 13 has been cut off, torque in the reverse rotational direction B is transmitted to the output gear 13 with a predetermined time delay. If the distances b and c were determined to satisfy the relation b<c, since driving torque in the reverse rotational direction B is applied to the output gear 13 before the spring clutch 26 is unlocked, it would become difficult to stably unlock the spring clutch 26.

Also, since the distances a and b are determined to satisfy the relation a>b, when the reverse rotational portion 26 engages the reverse rotation engaging portion 22, a small gap a' remains between the release hooks 29 and the hook engaging portion 21 (see FIG. 5). The small gap a' prevents the release portion 24, which moves together with the release hooks 29, from abutting the hook engaging portion 21, before the distance b becomes zero and torque in the reverse rotational direction B is transmitted, thus preventing torque in the reverse rotational direction B from being transmitted to the output gear 13 through release portion 24 and the hook engaging portion 21. This ensures that torque in the reverse rotational direction B is always transmitted through the reverse rotational portion 25 and the reverse rotation engaging portion 22.

While torque in the reverse rotational direction B is being transmitted to the output gear 13, the input gear 12 keeps rotating in the forward rotational direction A. But because the spring clutch 26 is unlocked in this state, idling torque between the spring clutch 26 and the input gear 12 is low.

When the reverse torque input is interrupted, the reverse input gear 14 becomes free, so that the spring clutch 26 is radially compressed by its resilience and gets locked. Torque in the forward rotational direction is thus again transmitted to the output gear.

In this arrangement, the spring clutch 26 is unlocked by bringing the release portion 24 into engagement with the release hooks 29 and pushing the release hooks 29 by the distance c. Then, with a predetermined short time delay, the reverse rotational portion 25 of the reverse input gear 14 is brought into engagement with the reverse rotation engaging portion 22 of the output gear 13 to transmit torque in the reverse rotational direction.

Figure 6A:
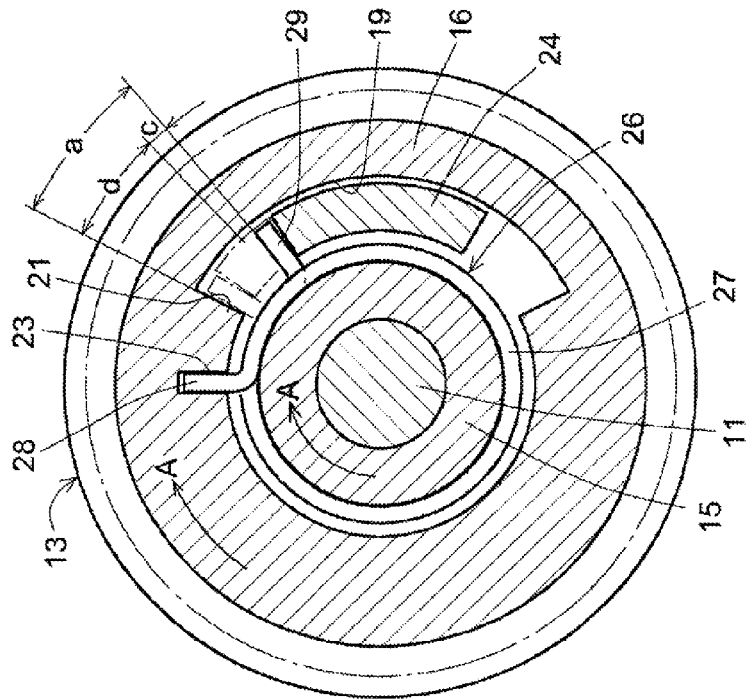
FIG. 6(a) is a sectional view of a modified embodiment of Embodiment 1.

In contrast, in a modified embodiment shown in FIG. 6(a), the output gear 13 has only the hook engaging portion 21, and the reverse input gear 14 has only the release portion 24. That is, the hook engaging portion 21 extends most of the radially inner surface of the output gear 13, with the remaining circumferential portion serving as the receiving recess 19, which is defined by both ends of the hook engaging portion 21. The release portion 24 is received in the receiving recess 19 with radial and circumferential play.

The transmission hooks 28 of the coil springs 27 are received in an engaging slit 23 formed in the hook engaging portion 21 near its end. The release hooks 29 are disposed between the hook engaging portion 21 and the release portion 24. In the unlocking starting state, the release hooks 29 are spaced from the hook engaging portion 21 by a distance a, which is the sum of distances c and d. The distance c is the same as the distance c in the previous embodiment, i.e. the distance by which the release portion 24 moves while pushing the release hooks 29 until the spring clutch 26 is unlocked. The distance d (d=a−c) is the distance by which the release hooks 29 are further pushed until the engaging portion 24 engages the hook engaging portion 21 through the release hooks 29 as shown by the one-dot chain line.

In this arrangement, torque in the forward rotational direction A is transmitted in the same manner as in the previous embodiment. When transmitting torque in the reverse rotational direction B, when the release hooks 29 are pushed by the distance c, the spring clutch 26 is unlocked. When the release hooks 29 are further pushed by the distance d, the release portion 24 engages the hook engaging portion 21 through the release hooks 29 as shown by the one-dot chain line in FIG. 6(a). Torque in the reverse rotational direction B is thus transmitted to the output gear 13.

Figure 6B:
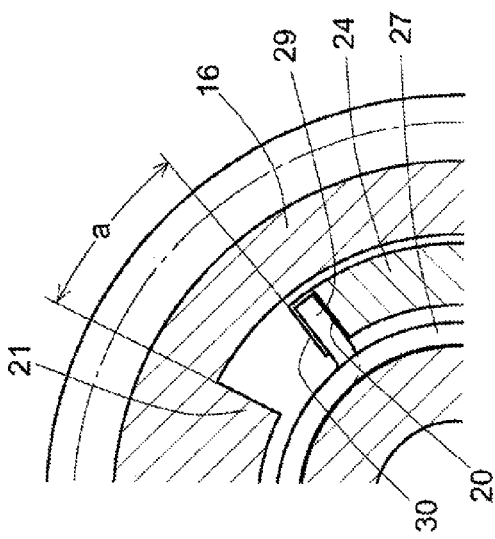
FIG. 6(b) is a partial sectional view of FIG. 6(a)
Figure 6C:
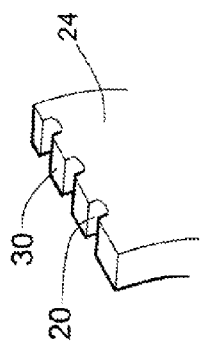
FIG. 6(c) is a partial perspective view of another modified embodiment.

In this arrangement, because the release portion 24 engages the output gear 13 through the release hooks 29, the durability of the release hooks 29 tends to decrease. In order to avoid this problem, as shown in FIGS. 6(b) and 6(c), three engaging grooves 20 having a depth equal to or larger than the thickness of the release hooks 29 and corresponding to the respective release hooks 29 may be formed in the end face 30 of the release portion 24 (its front end face with respect to the reverse rotational direction B). With this arrangement, while transmitting torque, the end face 30 of the release portion 24 directly engages the hook engaging portion 21. Thus, the load on the release hooks 29 decreases.

The arrangements shown in the modified embodiment of FIGS. 6(a) to 6(c) may be used in any of the below-described embodiments too.

Embodiment 2

Figure 7:
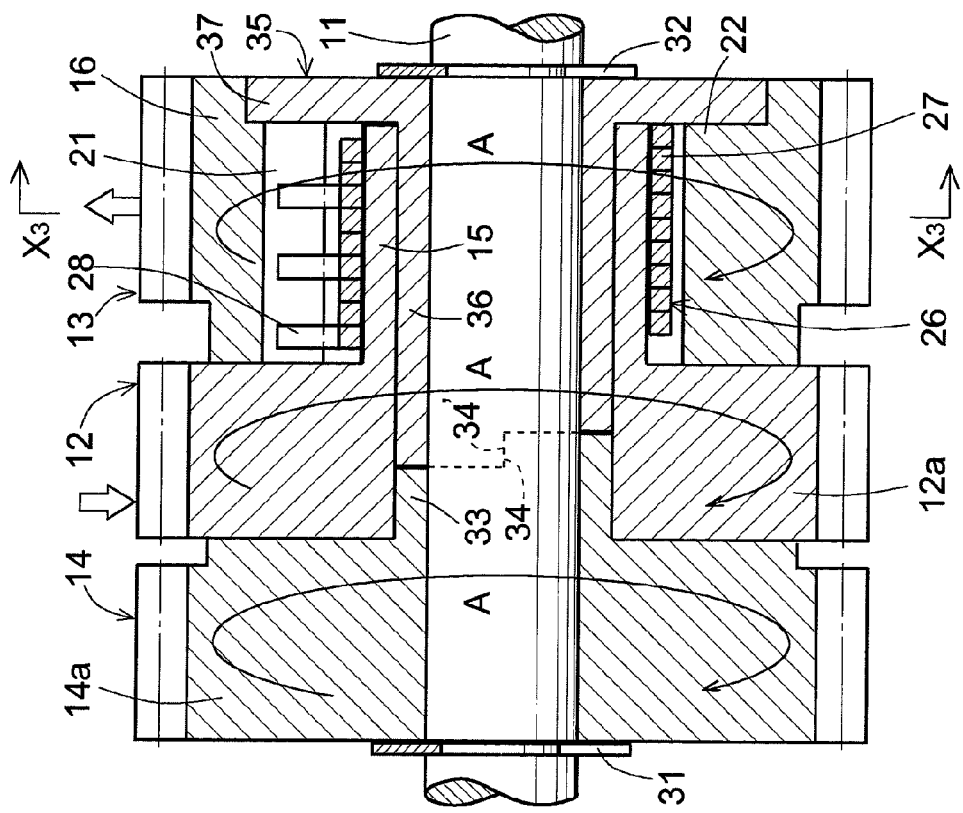
FIG. 7 is a sectional view of Embodiment 2.
Figure 8:
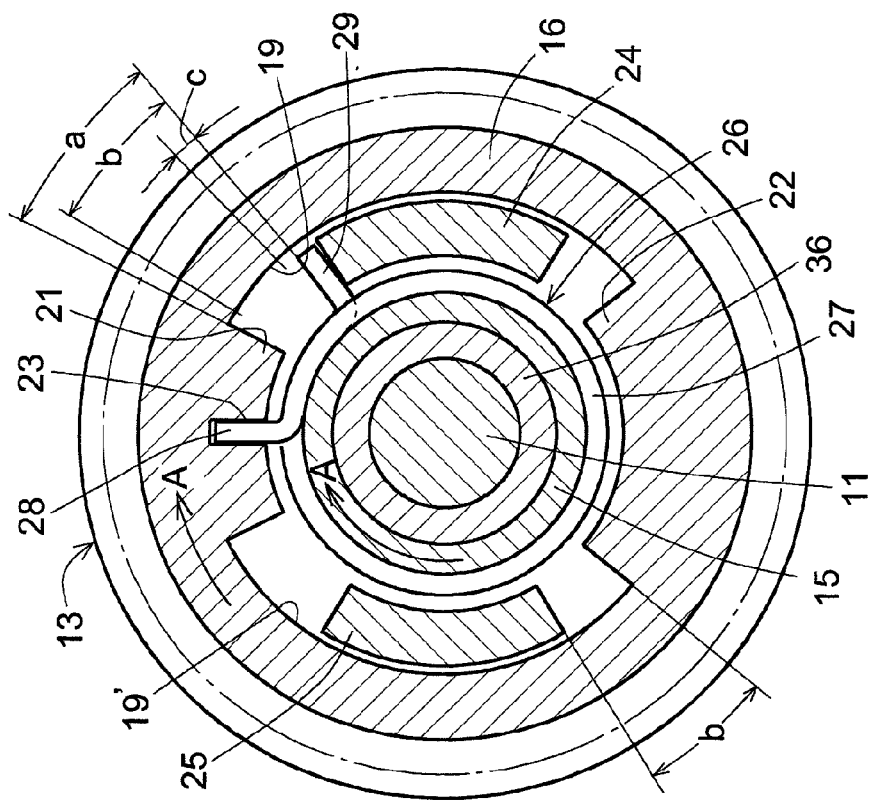
FIG. 8 is a sectional view taken along line X3-X3 of FIG. 7.

FIGS. 7 to 11 show the rotational direction switching clutch unit of Embodiment 2, which differs from Embodiment 1 in that the reverse input gear 14, input gear 12 and output gear 13 are axially arranged in this order from left in FIG. 7, and are also slightly different in structure due to the difference in arrangement of these members.

In particular, the reverse input gear has at its central portion a boss portion 33 inserted in the input gear 12. A flange member 35 is coupled to the front end of the boss portion 33 through coupling portions 34 and 34' comprising a protrusion and a recess. The flange member 35 comprises a flange boss portion 36 and a flange portion 37 is rotatably fitted on a fixed shaft 11. The boss portion 33 of the reverse input gear 14 and the flange boss portion 36 are coupled together through the coupling portions 34 and 34' while axially abutting each other.

The boss portion 33 and the flange boss portion 36, which is coupled to the boss portion 33, extends through the input gear 12 and a cylindrical input clutch portion 15 which is provided on one end face of the input gear 12 at its central portion. The flange portion 37 extends radially outwardly from the front end of the flange boss portion 36 along the front end face of the input clutch portion 15. The flange portion 37 is fitted in the output gear 13 at its end, thereby rotatably supporting the output gear 13.

As in Embodiment 1, the body of the output gear 13 serves as the output clutch portion 16, which is concentrically disposed around and radially spaced from the input clutch portion 15. The output clutch portion 16 has, on its radially inner surface, a hook engaging portion 21 and a reverse rotation engaging portion 22 that are axially symmetrical to each other (see FIGS. 8 and 9). The radially inner surfaces between the hook engaging portion 21 and the reverse rotation engaging portion 22 define receiving recesses 19 and 19', respectively.

As shown in FIG. 9, the flange portion 37 of the flange member 35 has on its inner end surface a release portion 24 and a reverse rotational portion 25 which are axially protruding and axially symmetrical arm-shaped members provided around the flange boss portion 36. The release portion 24 and the reverse rotational portion 25 both have an arcuate section such that they are arranged along the radially inner surfaces of the receiving recesses 19 and 19', respectively, so as to be circumferentially movable in the respective recesses 19 and 19' (see FIG. 8).

Three coil springs 27 that form a spring clutch 26 are arranged in series, and tightly bound to the radially outer surface of the input clutch portion 15 of the input gear 12, while being axially pressed against each other. Each coil spring 27, the structure of the spring clutch 26, and the relations between the spring clutch 26 and the output clutch portion 16, between the transmission hooks 28 and the hook engaging portion 21, between the release hooks 29 and the release portion 24, and between the reverse rotational portion 25 and the reverse rotation engaging portion 22 are all identical to those in Embodiment 1.

Now the operation of the rotational direction switching clutch unit of Embodiment 2 is described. As in Embodiment 1, when driving torque in the forward rotational direction A is applied to the input gear 12, the spring clutch 26 is locked, so that torque in the forward rotational direction A is transmitted to the output gear 13 (see FIGS. 7 and 8).

Figure 10:
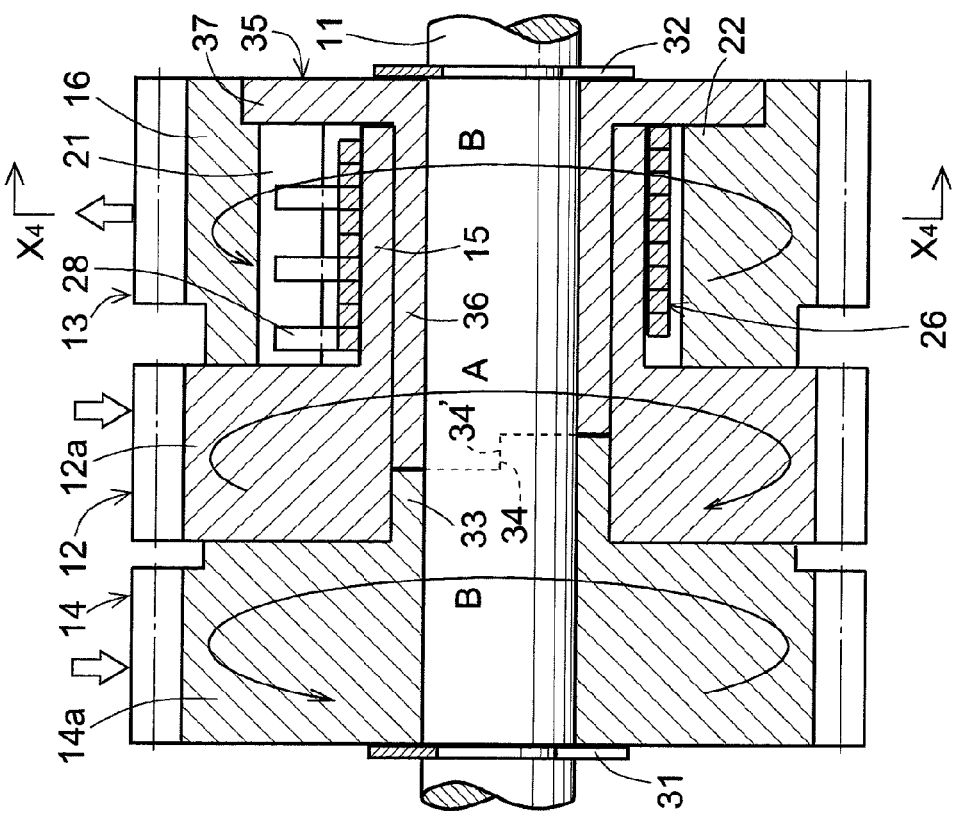
FIG. 10 is a sectional view of Embodiment 2 while torque in the reverse rotational direction is being transmitted.
Figure 11:
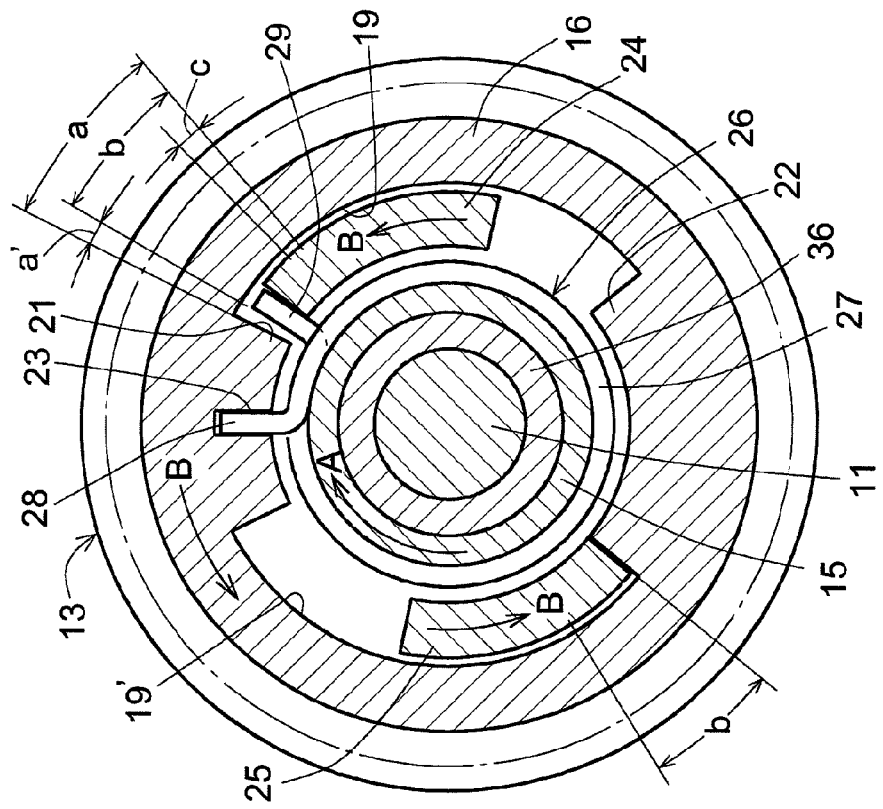
FIG. 11 is a sectional view taken along line X4-X4 of FIG. 10.

When driving torque in the reverse rotational direction B is applied to the reverse input gear 14 while torque in the forward rotational direction A is being transmitted, in order to change over the rotational direction of the output, as shown in FIGS. 10 and 11, the release portion 24 pushes the release hooks 29 by the distance c, thereby unlocking the spring clutch 26. Also, when the reverse rotational portion 25 rotates by the distance b, it engages the reverse rotation engaging portion 22, thereby transmitting torque in the reverse rotational direction to the output gear 13.

Embodiment 3

Figure 12:
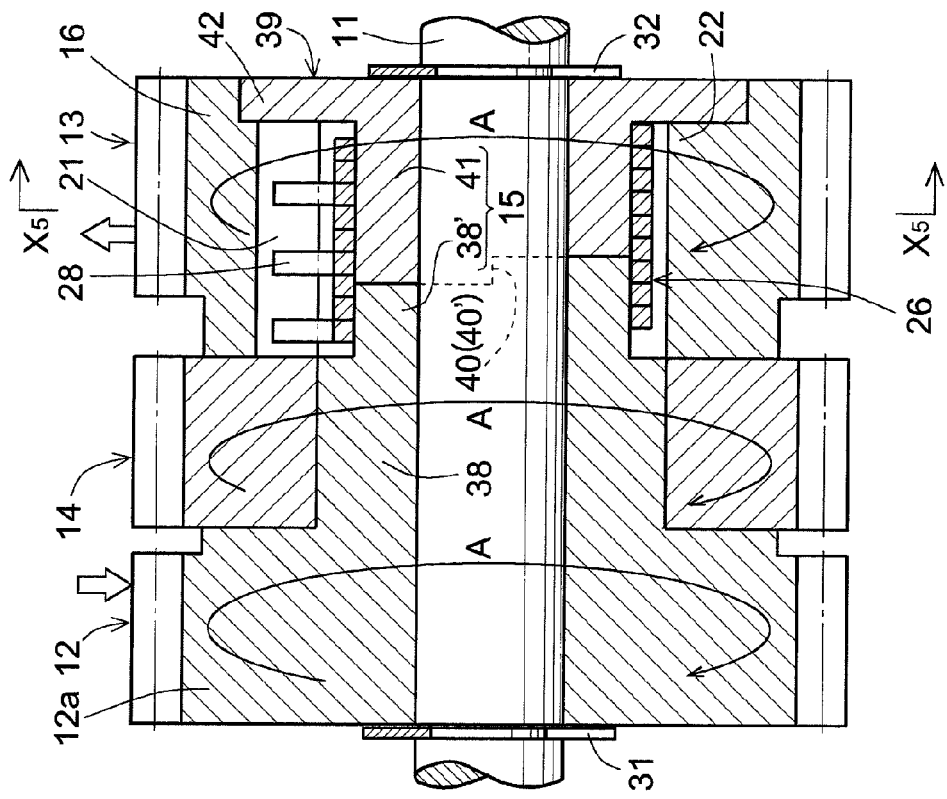
FIG. 12 is a sectional view of Embodiment 3.

FIGS. 12 to 17 show the rotational direction switching clutch unit of Embodiment 3, which differs from Embodiments 1 and 2 in that the input gear 12, reverse input gear 14, and output gear 13 are axially arranged in this order from left in FIG. 12, and are also slightly different in structure due to the difference in arrangement of these members.

That is, the input gear 12 has a boss portion 38 comprising a large-diameter portion and a small-diameter portion 38' with a shoulder defined therebetween. The boss portion 38 extends through the reverse input gear 14. A flange member 39 is coupled to the front end of the small-diameter boss portion 38' through coupling portions 40 and 40' comprising a protrusion and a recess. The flange member 39 comprises a flange boss portion 41 and a flange portion 42, and is rotatably mounted on the fixed shaft 11. The flange portion 42 is received in the output gear 13 at one end portion thereof. The output gear 13 is thus rotatably supported by the radially outer surface of the flange portion 42.

The small-diameter boss portion 38' and the flange boss portion 41 have outer diameters equal to each other, and are axially in abutment with each other, thus constituting the input clutch portion 15.

Figure 13:
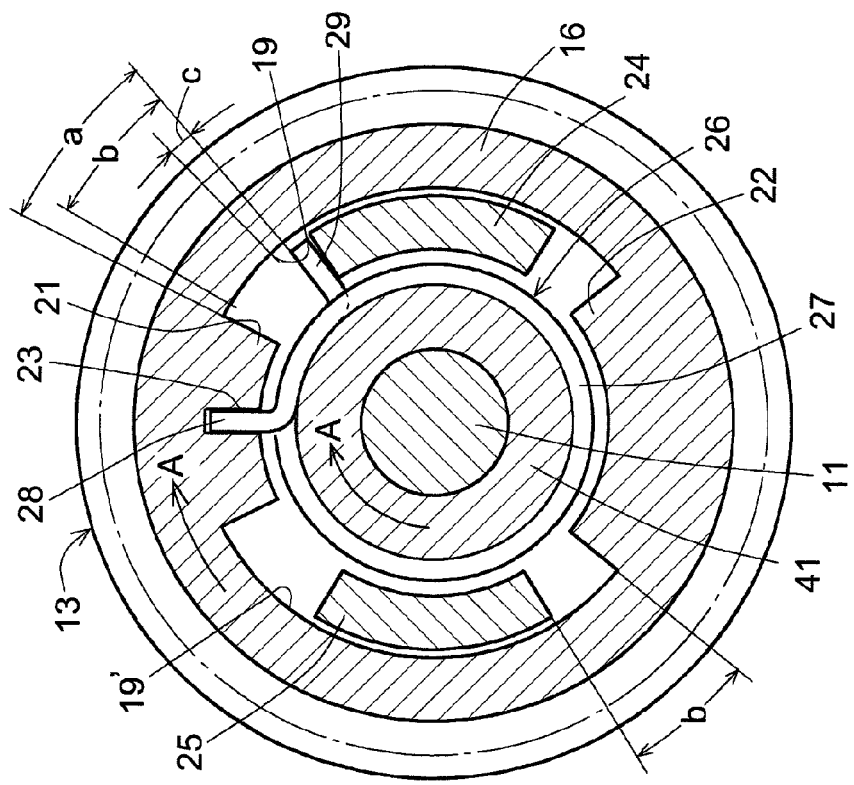
FIG. 13 is a sectional view taken along line X5-X5 of FIG. 12.
Figure 14A:
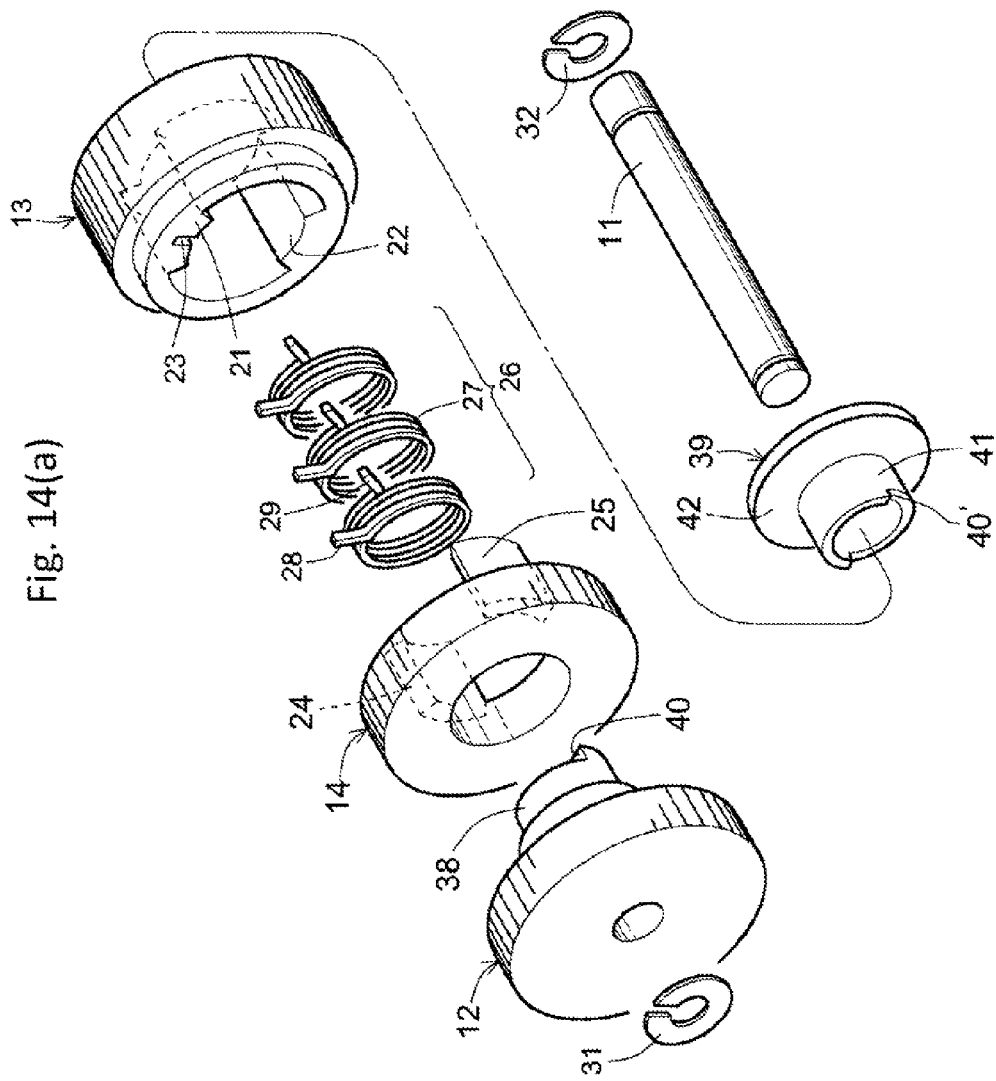
FIG. 14(a) is an exploded perspective view of Embodiment 3.
Figure 14B:
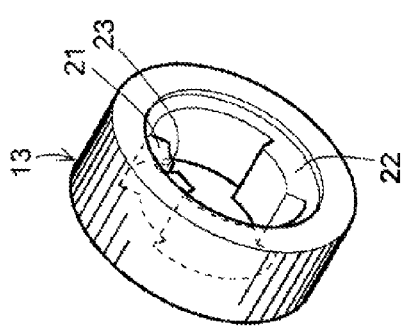
FIG. 14(b) is a perspective view of the output gear.
Figure 14C:
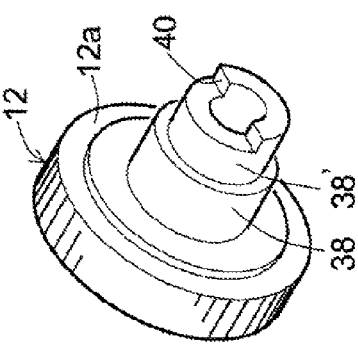
FIG. 14(c) is a perspective view of the reverse input gear.
Figure 15:
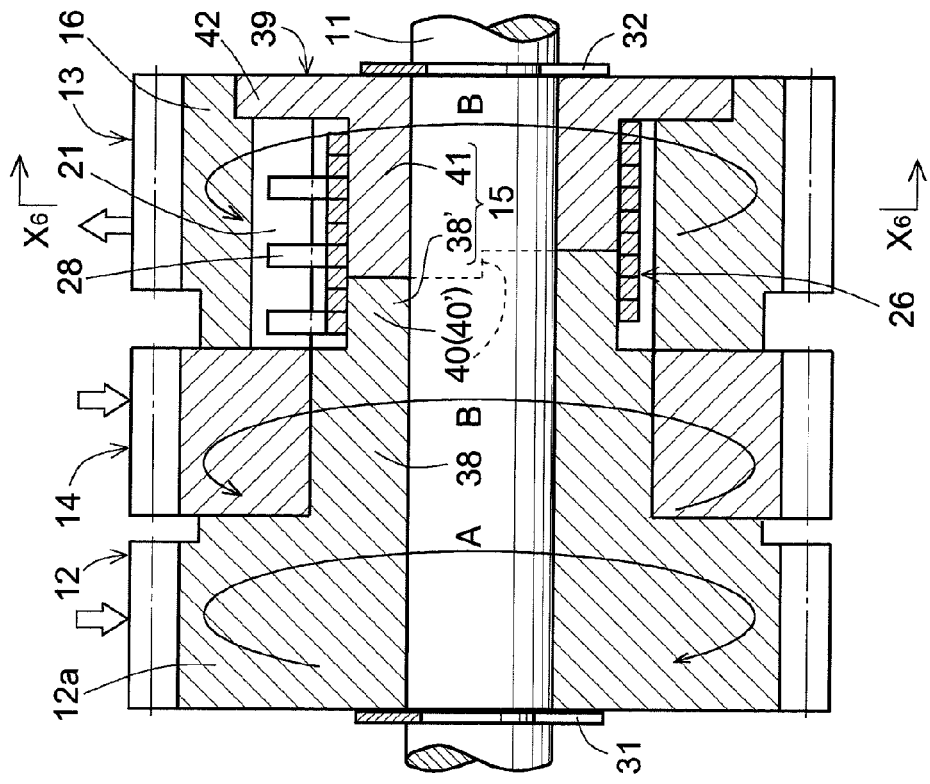
FIG. 15 is a sectional view of Embodiment 3 while torque in the reverse rotational direction is being transmitted.
Figure 16:
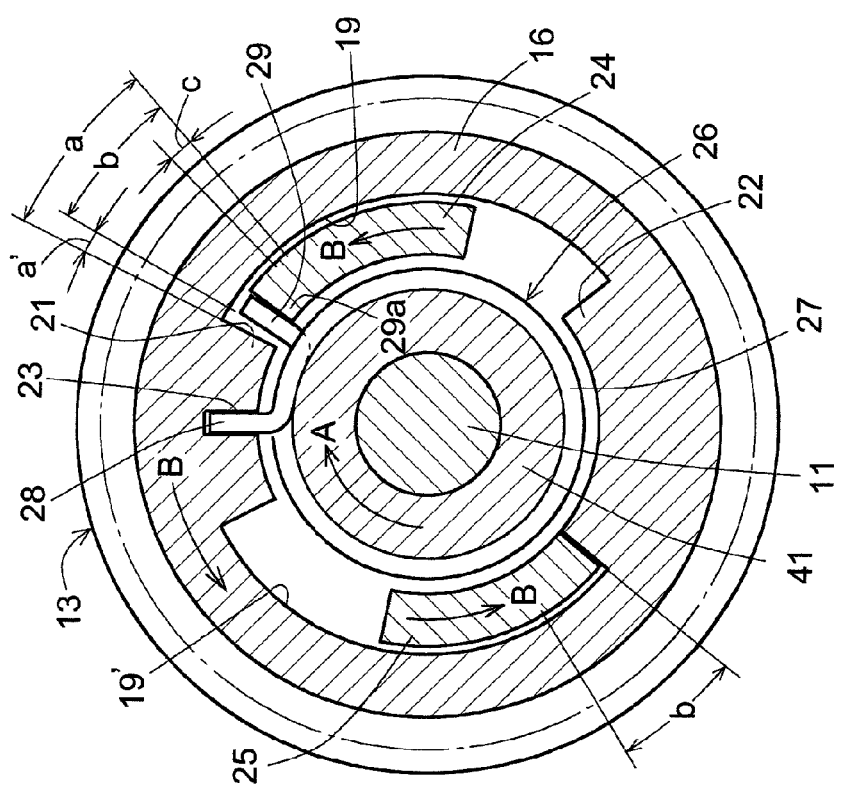
FIG. 16 is a sectional view taken along line X6-X6 of FIG. 15.

As with Embodiments 1 and 2, the output gear 13 has, on its radially inner surface, a hook engaging portion 21 and a reverse rotation engaging portion 22 that are axially symmetrical to each other (see FIG. 13). The hook engaging portion 21 is formed with an axial engaging slit 23. Circumferentially extending receiving portions 19 and 19' are defined between the hook engaging portion 21 and the reverse rotation engaging portion 22.

Figure 17:
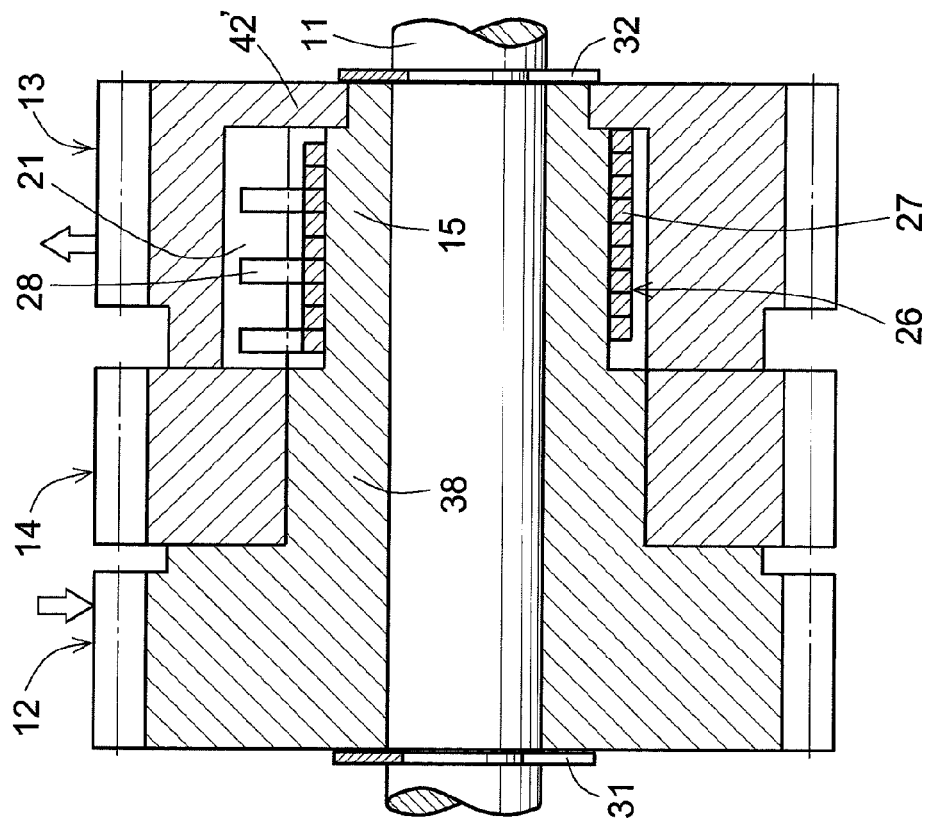
FIG. 17 is a sectional view of a modified embodiment of Embodiment 3.

In Embodiment 3, the output gear 13 is positioned relative to the fixed shaft 11 through the flange member 39. But instead, the arrangement shown in FIG. 17 may be employed. In the arrangement of FIG. 17, the output gear 13 has a radially inwardly extending flange portion 42' at its outer end. The boss portion 38 has at its front end an input clutch portion 15 having a smaller diameter than the boss portion 38. The flange portion 42' is rotatably fitted on the radially outer surface of the input clutch portion 15 at its front end portion.

In this arrangement, the entire input clutch portion 15 is integral with the input gear 12.

Embodiment 4

FIGS. 18 to 23 show the rotational direction switching clutch unit of Embodiment 4, in which, as with Embodiment 3 (see FIG. 12), the input gear 12, output gear 13 and reverse input gear 14 are axially arranged in this order from the left-hand side of FIG. 18. But structurally, this embodiment is more similar to Embodiment 1 than to Embodiment 3.

In particular, the input gear 12 has the input clutch portion 15 on the central portion of its end surface. The input clutch portion 15 has its front end surface in abutment with the inner end surface of the output gear 13. The reverse input gear 14 has, on the respective end surfaces, positioning steps 46 and 47 that are fitted on a shoulder 17 formed on the inner end surface of the input gear 12 and a shoulder 45 formed on the inner end surface of the output gear 13, respectively, thereby positioning the reverse input gear 14 in the radial and thrust directions while being rotatable relative to the input and output gears.

Figure 20:
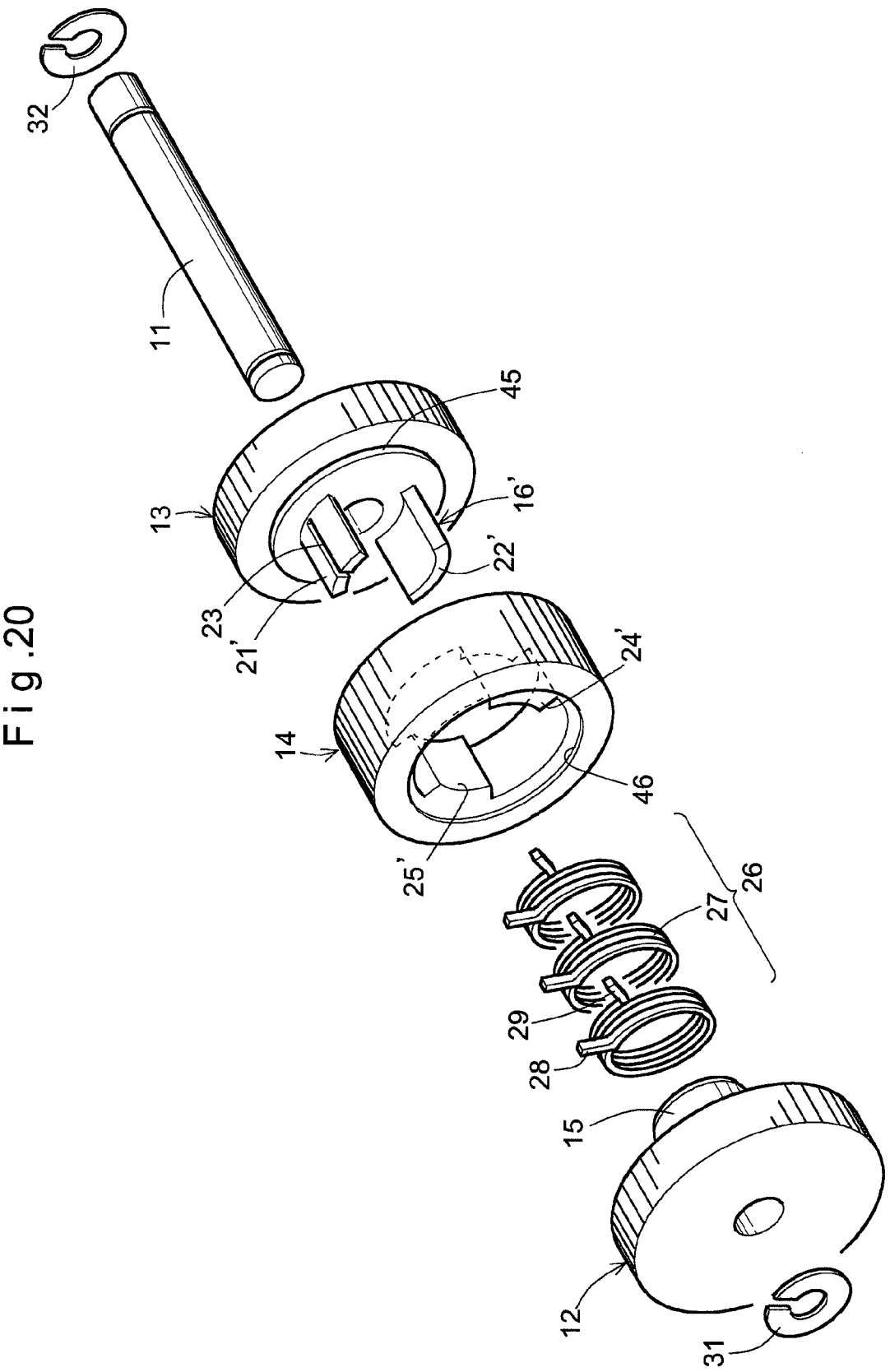
FIG. 20 is an exploded perspective view of Embodiment 4.

The reverse input gear 14 has, on its outer radially inner surface, a release portion 24' and a reverse rotational portion 25' that protrude radially inwardly and are axially symmetrical to each other (see FIGS. 19 and 20). Receiving recesses 19a and 19'a are defined between the release portion 24' and the reverse rotational portion 25'.

On the inner end surface of the output gear 13, a hook engaging portion 21' and a reverse rotation engaging portion 22' are provided which are axially symmetrical to each other and on a common circle. The engaging portions 21' and 22' constitute the output clutch portion 16. The engaging portions 21' and 22' have arcuate surfaces that extend along the radially inner surfaces of the respective receiving recesses 19a and 19'a, and received in the respective receiving recesses 19a and 19'a with circumferential play so as to be circumferentially movable (see FIG. 19). An engaging slit 23' is formed in the hook engaging portion 21'.

Three coil springs 27 that constitute the spring clutch 26 are tightly bound to the input clutch portion 15 of the input gear while being axially pressed against each other. As with the previous embodiments, each coil spring 27 is formed by winding a wire having a square cross-section by two-plus times, and has two radially outwardly bent hooks, i.e. a transmission hook 28 and a release hook 29, at the respective ends.

The transmission hooks 28 are engaged in the engaging slit 23' of the hook engaging portion 21'. The release hooks 29 are circumferentially movably disposed between the release portion 24' and the hook engaging portion 21'. As shown in FIG. 19, in the unlocking starting state, the release hooks 29 are spaced from the hook engaging portion 21' by a distance a. In this state, the reverse rotational portion 25' is spaced from the reverse rotation engaging portion 22' by a distance b which is smaller than the distance a. The distances a, b and c are determined to satisfy the relation a>b>c.

The coil springs 27 are wound in the same direction (clockwise direction in the embodiment shown), so that when the release hooks 29 rotate clockwise relative to the transmission hooks 28 as shown in FIG. 19, the coil springs 27 are radially compressed, and the spring clutch 26 is locked. When the release hooks 29 rotate in the opposite direction, the coil springs 27 are radially expanded, and the spring clutch 26 is unlocked.

Now the operation of the rotational direction switching clutch unit of Embodiment 4 is described.

When driving torque in the forward rotational direction A is applied to the input gear 12, the spring clutch 26 is locked, so that torque in the forward rotational direction A is transmitted through the transmission hooks 28 to the hook engaging portion 21' of the output clutch portion 16', and to the output shaft 13, which is integral with the output clutch portion 16' (see FIGS. 18 and 19). In this state, since the release hooks 29 engage the release portion 24', the reverse input gear 14 idles in the same direction.

Figure 21:
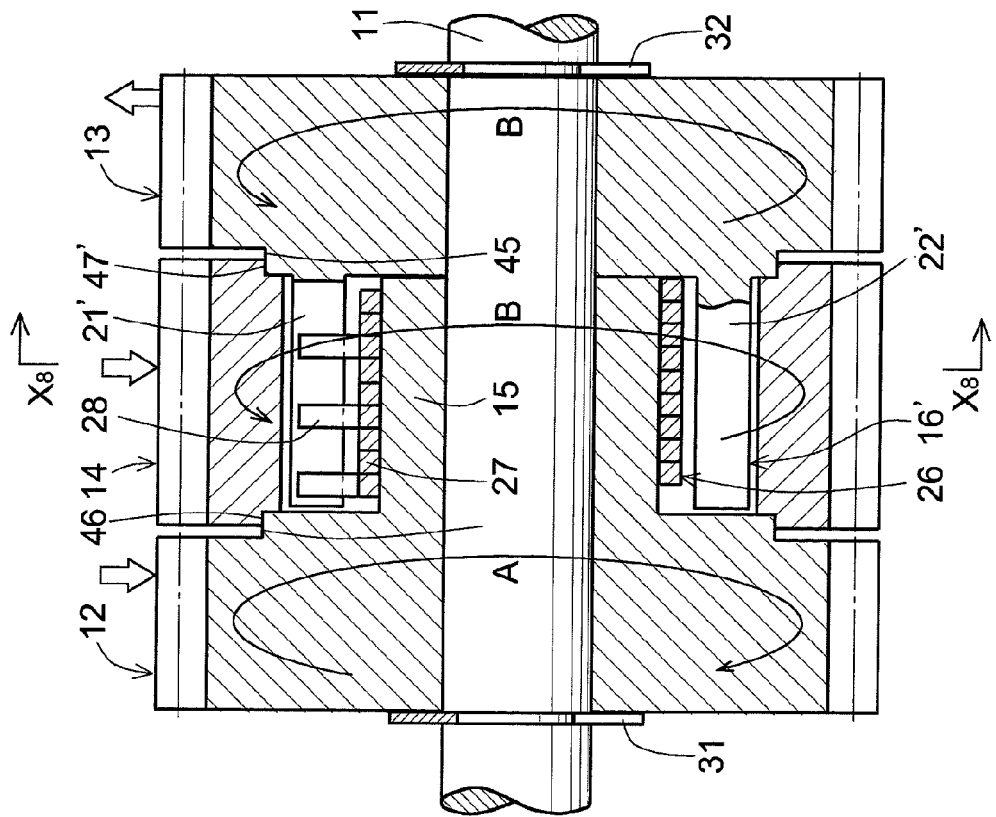
FIG. 21 is a sectional view of Embodiment 4 while torque in the reverse rotational direction is being transmitted.
Figure 22:
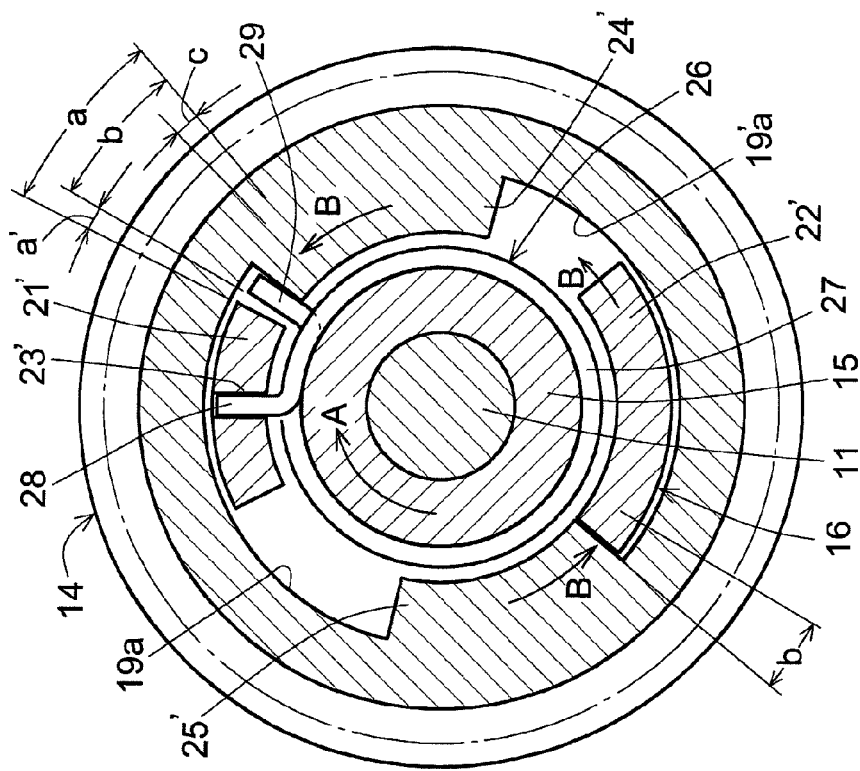
FIG. 22 is a sectional view taken along line X8-X8 of FIG. 21.

If driving torque in the reverse rotational direction B is applied to the reverse input gear 14 while torque in the forward rotational direction is being transmitted, as shown in FIGS. 21 and 22, the release portion 24' pushes the release hooks 29 by the distance c, thereby unlocking the spring clutch 26. Then, the reverse rotational portion 25' engages the reverse rotation engaging portion 22', so that torque in the reverse rotational direction B is transmitted to the output gear 13.

Figure 23:
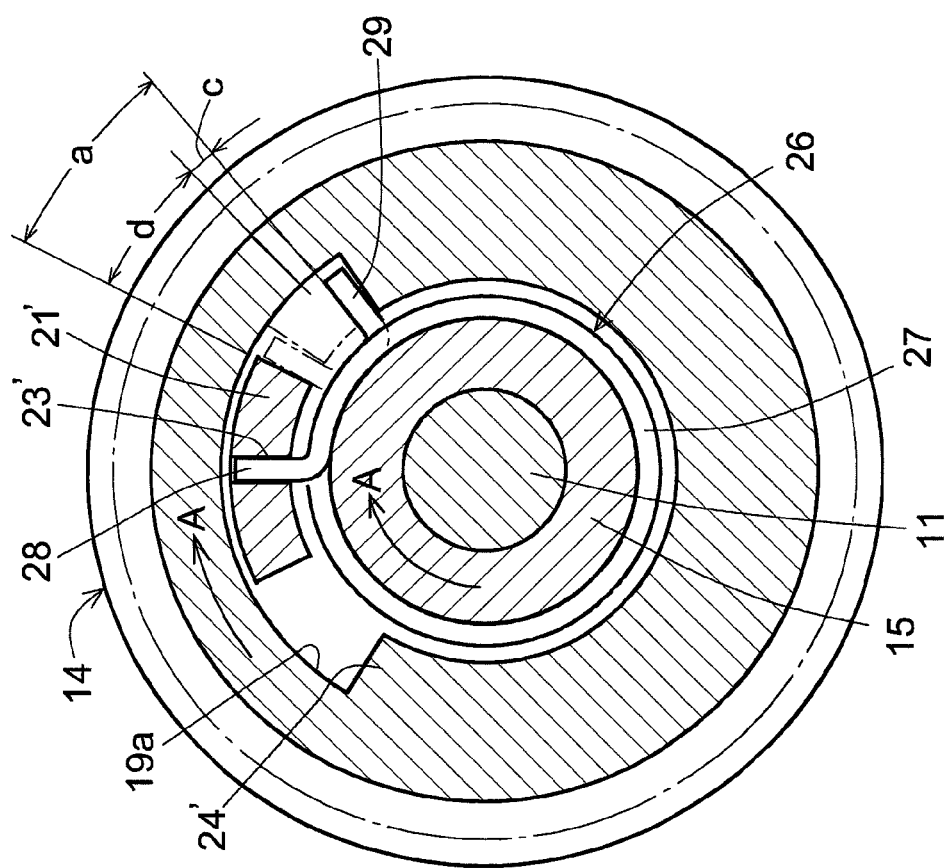
FIG. 23 is a sectional view of a modified embodiment of Embodiment 4.
Figure 24:
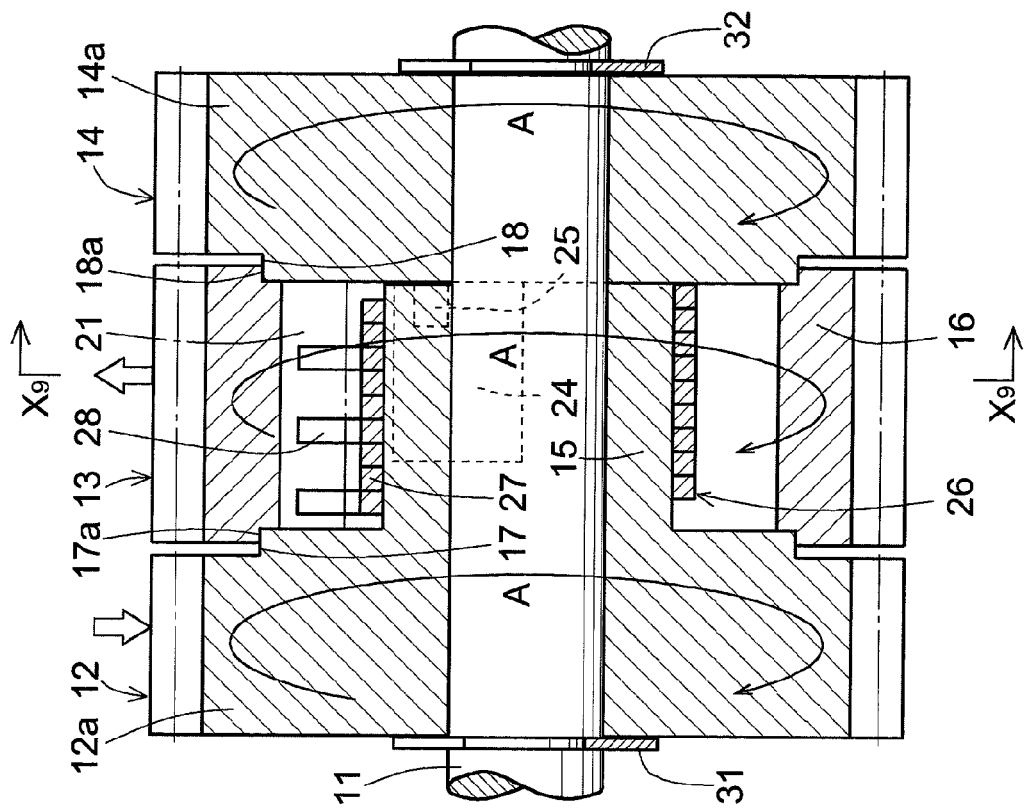
FIG. 24 is a sectional view of Embodiment 5.

This embodiment may also be modified in a similar manner as shown in FIG. 6(a). But the modified embodiment in this case is slightly different from the modified embodiment of FIG. 6(a), the former is shown in FIG. 23. In this embodiment, the release portion 24' extends most of the radially inner surface of the reverse input gear 14, with the remaining portion, i.e. the portion between the ends of the release portion 24', serving as a receiving portion 19a. The hook engaging portion 21' is received in the receiving portion 19a with radial and circumferential play.

The transmission hooks 28 of the coil springs 27 are received in an engaging slit 23' formed in the hook engaging portion 21'. The release hooks 29 are disposed between the hook engaging portion 21' and the release portion 24'. In the unlocking starting state in which the release hook 29 is in contact with the release portion 24', the release hooks 29 are spaced from the hook engaging portion 21' by a distance a. The distance a is the sum of a distance c by which the release portion 24' moves while pushing the release hooks 29 until the spring clutch 26 is radially expanded and unlocked, and a distance d (d=a−c) by which the release portion 24' further moves while pushing the release hooks 29 until the release portion 24' engages the hook engaging portion 21' through the release hooks 29 as shown by one-dot chain line.

In this arrangement too, torque in the forward rotational direction A is transmitted in the same way as in the previous embodiments. For the transmission of torque in the reverse rotational direction B, when the release portion 24' rotates by the distance b, the spring clutch 26 is unlocked, and after a predetermined time period, when the release portion 24' further moves by the distance d, torque in the reverse rotational direction B is transmitted to the output gear 13 as shown by one-dot chain line in FIG. 23. That is, torque in the reverse rotational direction B is transmitted when a portion (release portion 24') of the reverse input gear 14 engages the output gear 13 through the release hooks 29.

Embodiment 5

FIGS. 24 to 29 show Embodiment 5, which is basically of the same structure as Embodiment 1 (shown in FIGS. 1 to 6). Thus, what differs from Embodiment 1 is mainly described.

Figure 25:
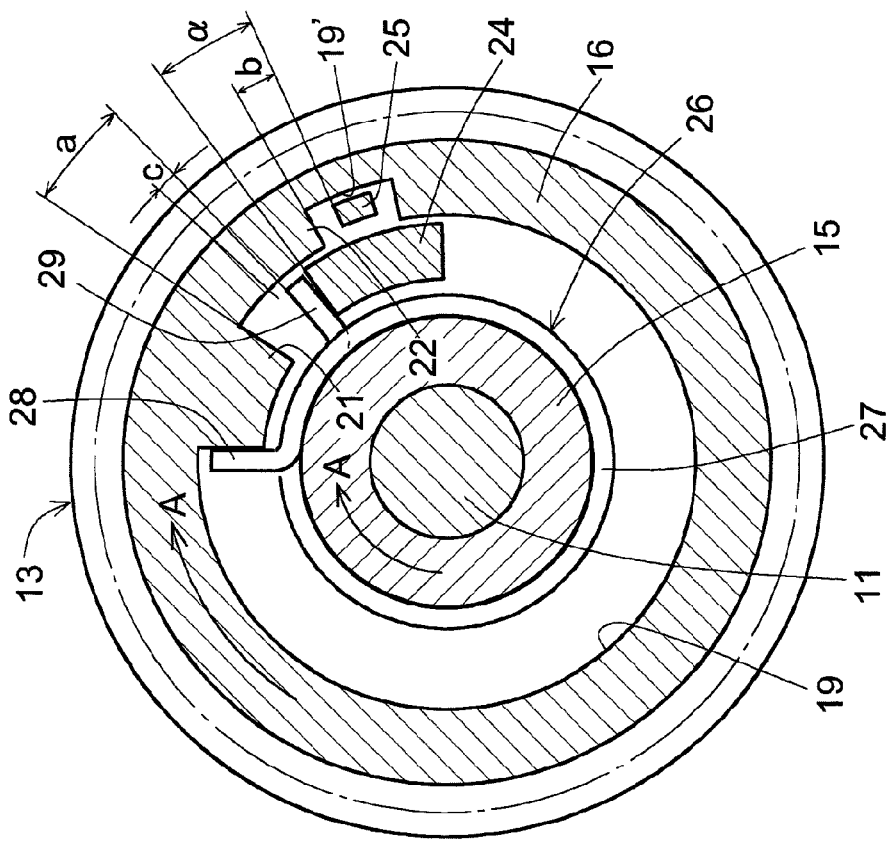
FIG. 25 is a sectional view taken along line X9-X9 of FIG. 24.

First, while the output gear 13 of Embodiment 1 has on its radially inner surface the axially symmetrical hook engaging portion 21 and reverse rotational engaging portion 22 (see FIG. 2), the output gear 13 of this Embodiment 5 has only the hook engaging portion (see FIG. 25). A receiving recess 19 is defined by the portion of the radially inner surface of the output gear not formed with the hook engaging portion 21. In Embodiment 1, the engaging slit 23 is formed in the hook engaging portion 21. But in Embodiment 5, no such engaging slit is provided.

A small recess is formed in the radially inner surface of the output gear 13 at a position slightly spaced from the hook engaging portion 21 in the forward rotational direction A. The small recess serves as the receiving recess 19'. One of the end walls of the receiving recesses 19' that is closer to the hook engaging portion 21 (front end wall with respect to the reverse rotational direction B) serves as the reverse rotation engaging portion 22.

Figure 26:
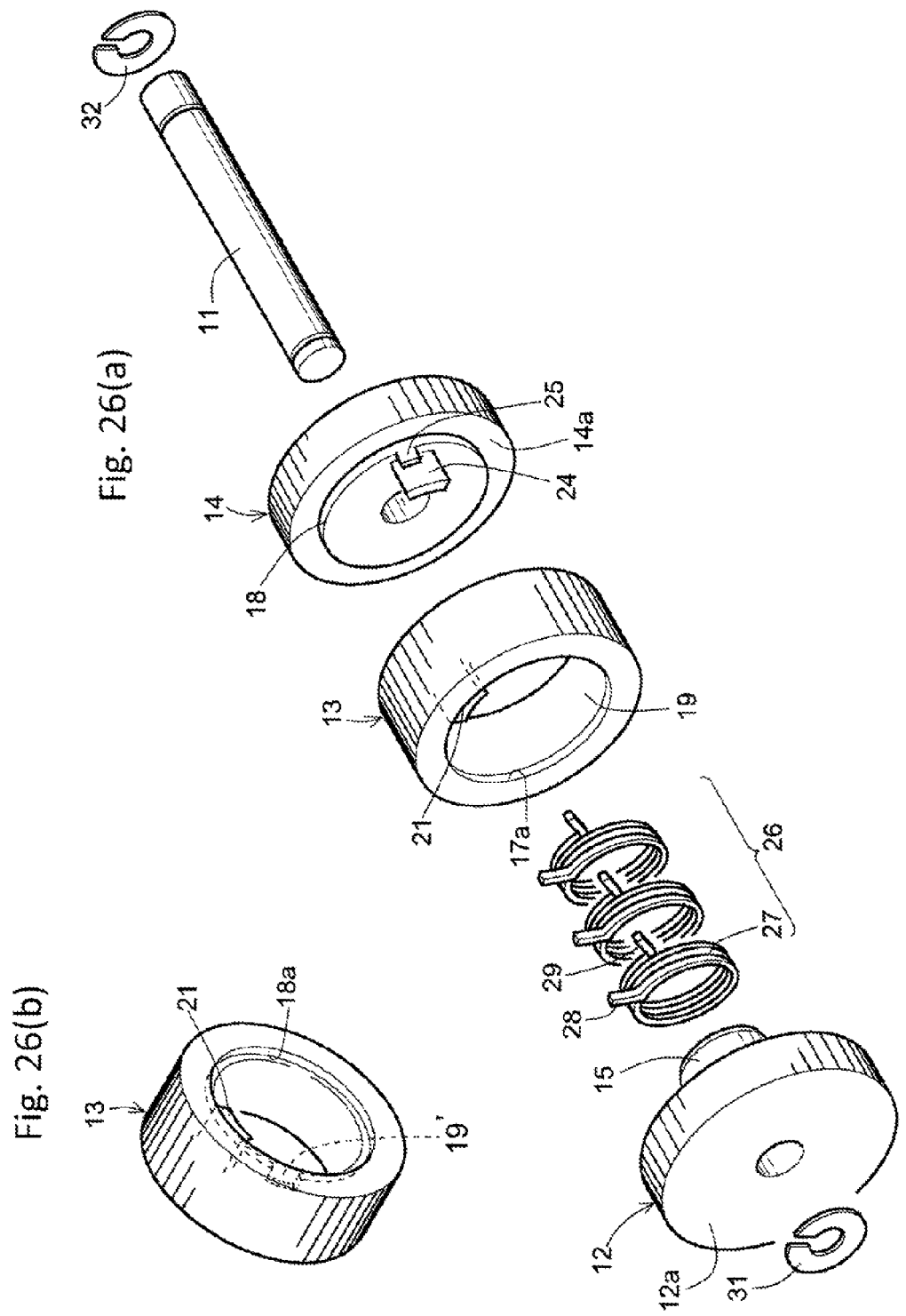
FIG. 26(a) is an exploded perspective view of Embodiment 5.
FIG. 26(b) is a perspective view of the output gear.

In Embodiment 1, the reverse input gear 14 includes the axially symmetrical release portion 24 and reverse rotational portion 25 on its inner end surface (see FIGS. 2 and 3). In Embodiment 5, as shown in FIGS. 25 and 26, the arm-shaped release portion 24 and the reverse rotational portion 25 axially protrudes from the inner end surface of the reverse input gear 14, with the release portion 24 located radially inwardly of and radially aligned with the reverse rotational portion 25. The release portion 24 has a length substantially equal to the axial width of the output gear 13. The reverse rotational portion 25 is shorter than the release portion 24. With respect to the reverse rotational direction B, the release portion 24 is located forwardly of the reverse rotational portion by a distance corresponding to the central angle a (see FIG. 25).

The release portion 24 and the reverse rotational portion 25 are received in the receiving portions 19 and 19', respectively, with circumferential play.

This embodiment is the same as Embodiment 1 in that the spring clutch 26 comprises three coil springs 27 each having a transmission hook 28 and a release hook 29. But in Embodiment 5, the transmission hooks 28 and the release hooks 29 are provided on the respective sides of the hook engaging portion 21 with circumferential play (see FIG. 25). Specifically, the transmission hooks 28 face the rear end surface of the hook engaging portion 21 with respect to the forward rotational direction A. The release hooks 29 face the front end surface of the hook engaging portion 21 with respect to the rotational direction A, and is disposed between this front end surface and the release portion 24.

As shown in FIG. 25, in the unlocking starting state in which the spring clutch 26 is locked with the transmission hooks 28 in contact with the hook engaging portion 21, the release hooks 29 are spaced from the front end surface of the hook engaging portion by a distance a. Also, in this state, the reverse rotational portion 25 is spaced from the reverse rotation engaging portion 22 by a distance b which is smaller than the distance a (a>b). When the release portion 24 moves from this state by a distance c (c<b) while pushing the release hooks 29, the coil springs 27 are radially expanded and the spring clutch 26 is unlocked.

Now in operation of Embodiment 5, as in Embodiment 1, when driving torque in the forward rotational direction A is applied to the input gear 12, the input clutch portion 15 rotates in the same direction together with the input gear 12, so that the coil springs 27 are radially compressed and the spring clutch 26 is locked.

When the spring clutch 26 is locked, the transmission hooks 28 engage the hook engaging portion 21 (see FIG. 25), thereby transmitting torque in the forward rotational direction A to the output clutch portion 16 and the output gear 13, which is integral with the output clutch portion 16. In this state, the reverse input gear 14 is separated from the reverse rotation driving source. Thus, when the release hooks 29 engage the release portion 24, the reverse input gear 14 is rotated in the forward rotational direction A.

Figure 27:
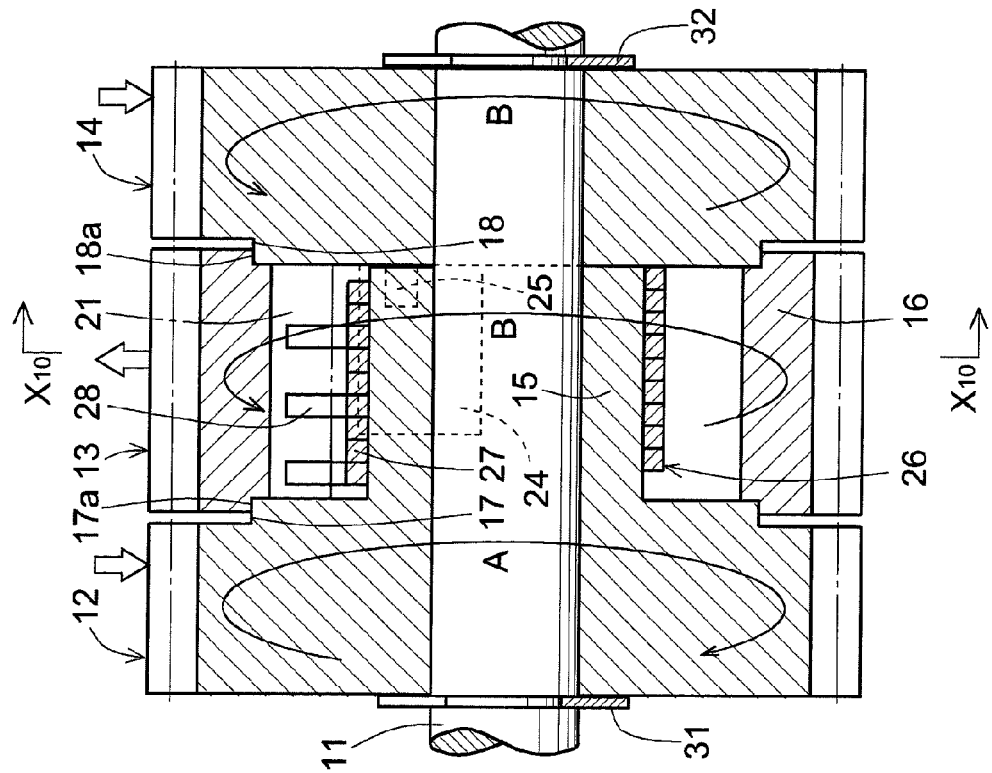
FIG. 27 is a sectional view of Embodiment 5 while torque in the reverse rotational direction is being transmitted.
Figure 28:
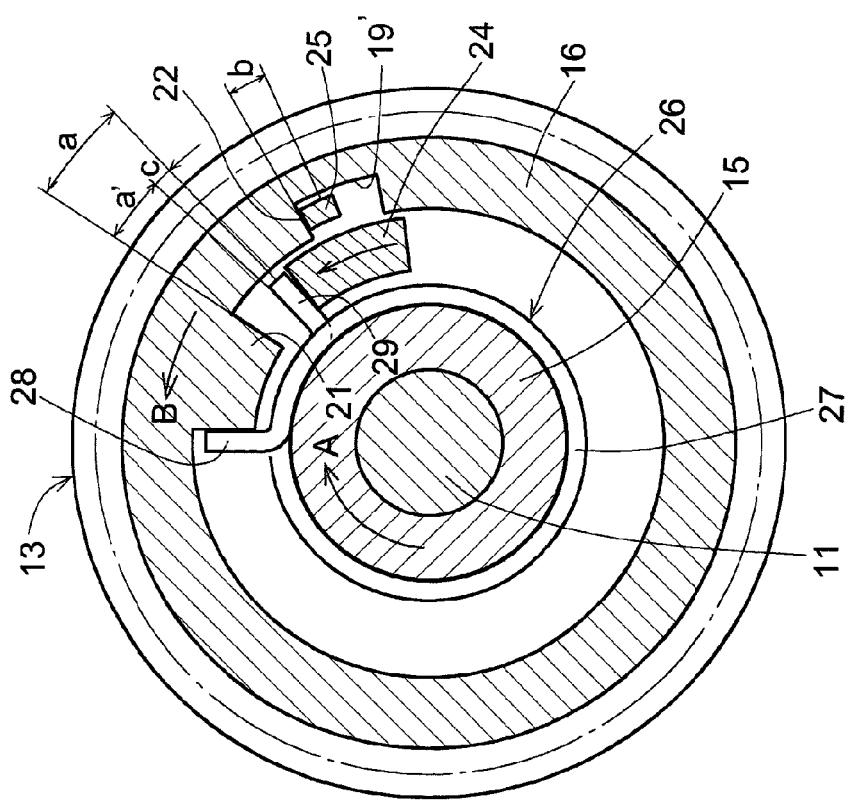
FIG. 28 is a sectional view taken along line X10-X10 of FIG. 27.
Figure 29:
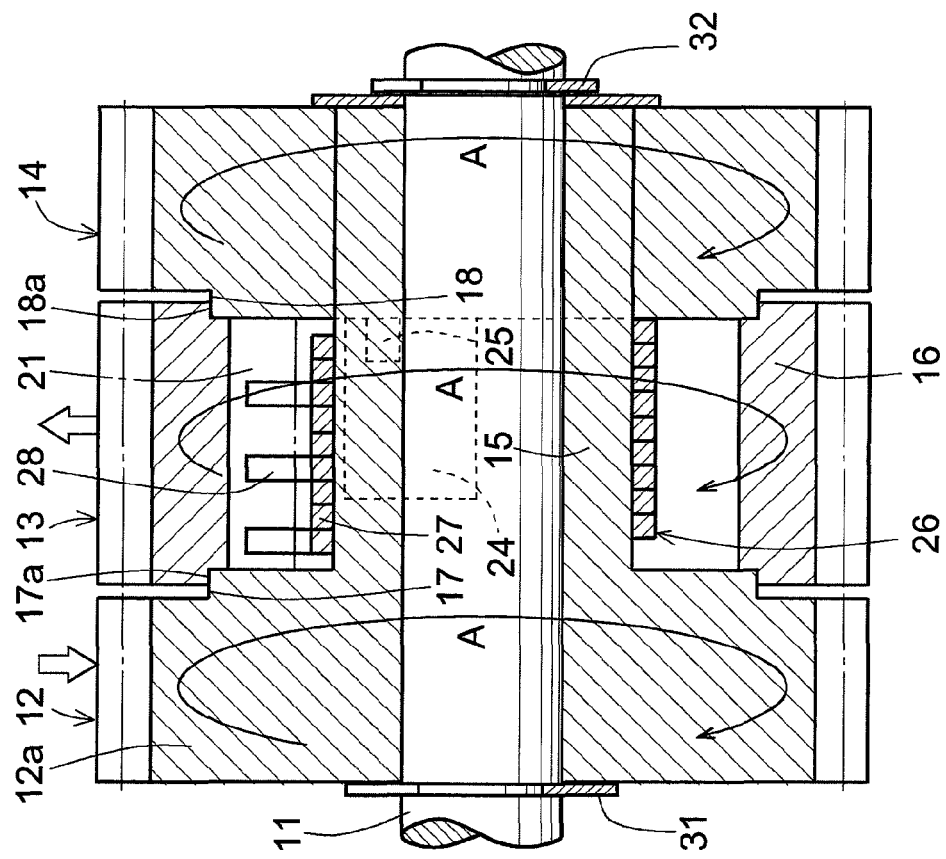
FIG. 29 is a sectional view of a modified embodiment of Embodiment 5.
Figure 30:
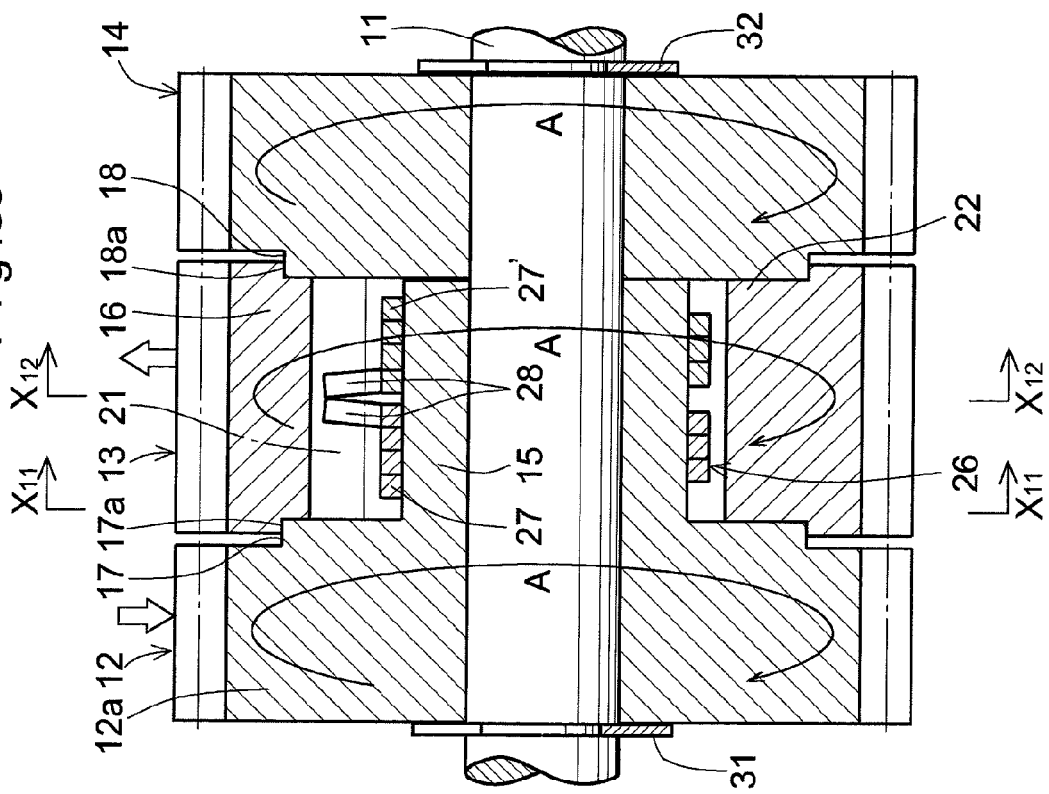
FIG. 30 is a sectional view of Embodiment 6.

When driving torque in the reverse rotational direction B is applied to the reverse input gear 14 while torque in the forward rotational direction A is being transmitted, as shown in FIGS. 27 and 28, the reverse input gear 14, and the release portion 24 and the reverse rotational portion 25, which are integral with the reverse input gear 14, are rotated in the reverse rotational direction B.

When the release portion 24 engages and pushes the release hooks 29 by the distance c, the spring clutch 26 is unlocked, thus shutting off transmission of driving torque to the output gear 13 through the spring clutch 26. The output gear 13 thus stops rotating in the forward rotational direction A.

When the reverse input gear 14 further rotates and the reverse rotational portion 25 engages the reverse rotation engaging portion 22, torque in the reverse rotational direction B is transmitted to the output gear 13. Since the distances b and c are determined to satisfy the relation b>c, after the spring clutch 26 has been unlocked and transmission of torque in the forward rotational direction to the output gear 13 has been shut off, torque in the reverse rotational direction B is transmitted to the output gear 13.

Because the distances a and b are determined to satisfy the relation a>b, when the reverse input gear 14 rotates by the distance b, a small gap a' remains between the release hooks 29 and the hook engaging portion 21. Thus, in the same manner as in Embodiment 1, when the reverse rotational portion 25 moves by a distance and torque in the reverse rotational direction B is transmitted through the reverse rotational portion 25, the release hooks 29 are spaced from the hook engaging portion 21. Thus, torque in the reverse rotational direction B is never transmitted through the release hooks 29 to the hook engaging portion 21.

When the reverse input is shut off, the reverse input gear 14 becomes free, so that the spring clutch 26 is radially compressed by its own elasticity and locked. The output gear thus begins to rotate in the forward rotational direction again.

In the arrangement of Embodiment 5, the front end of the input clutch portion 15, which is provided on the input gear 12, is in abutment with the inner end surface of the reverse input gear 14. In contrast, in the modified embodiment shown in FIG. 29, the input clutch portion 15 extends through the reverse input gear 14 and reaches its outer end face. This clutch unit is easier to handle because the parts are modularized.

Embodiment 6

FIGS. 30 to 37 show Embodiment 6, which is basically of the same structure as Embodiment 1, and differs therefrom in the structure of the spring clutch 1. Otherwise, this embodiment is identical to Embodiment 1.

The clutch spring 26 is made up of two coil springs 27 and 27', which are tightly bound to the input clutch portion 15 while being located axially close to each other or axially pressed against each other. As with the previous embodiments, the coil springs 27 and 27' are each formed by winding a wire having a square cross-section by three-plus times (typically integer and about a quarter times), and are of the same size. Each of the clutch springs has radially outwardly extending transmission hook 28 and release hook 29 at the respective ends. The coil springs 27 and 27' differ from each other in that they are wound in opposite directions to each other.

Figure 31:
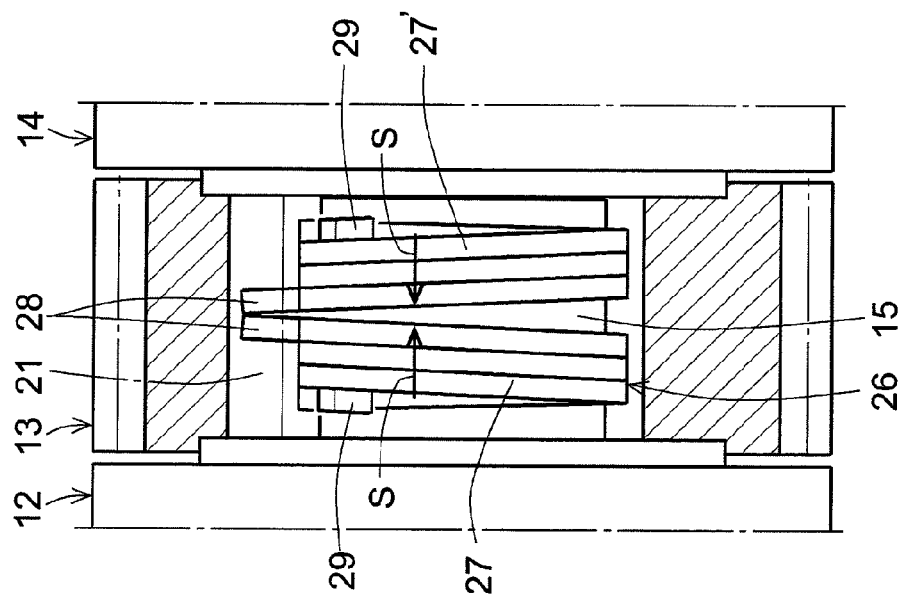
FIG. 31 is a partial vertical sectional front view thereof.
Figure 34:
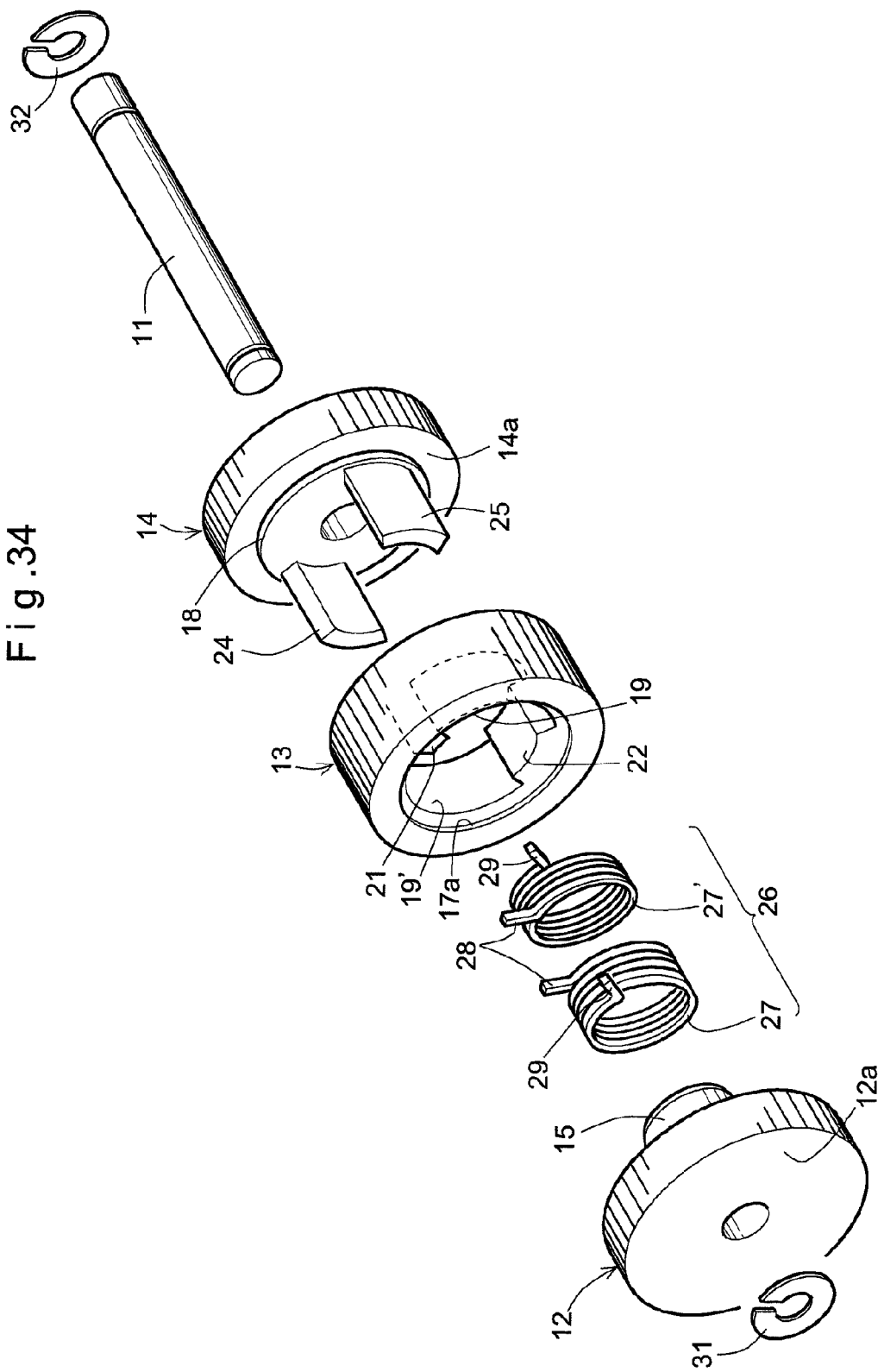
FIG. 34 is an exploded perspective view of Embodiment 6.
Figure 35:
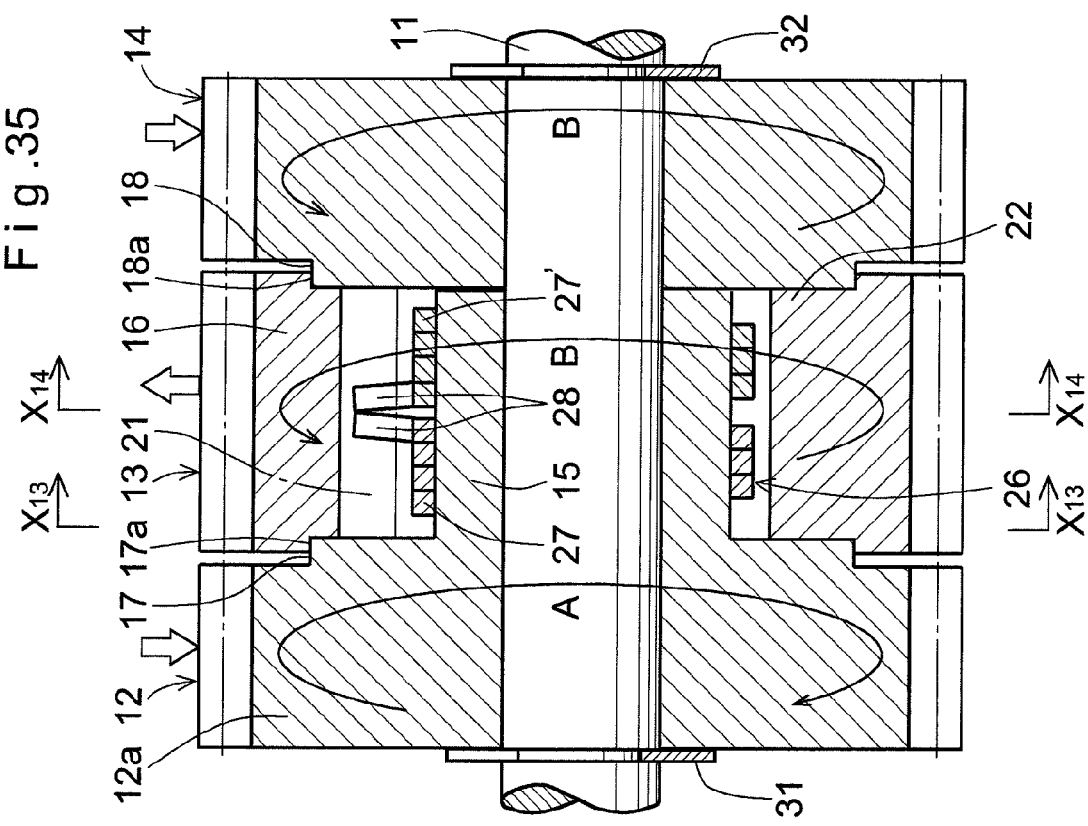
FIG. 35 is a sectional view of Embodiment 6 while torque in the reverse rotational direction is being transmitted.
Figure 36:
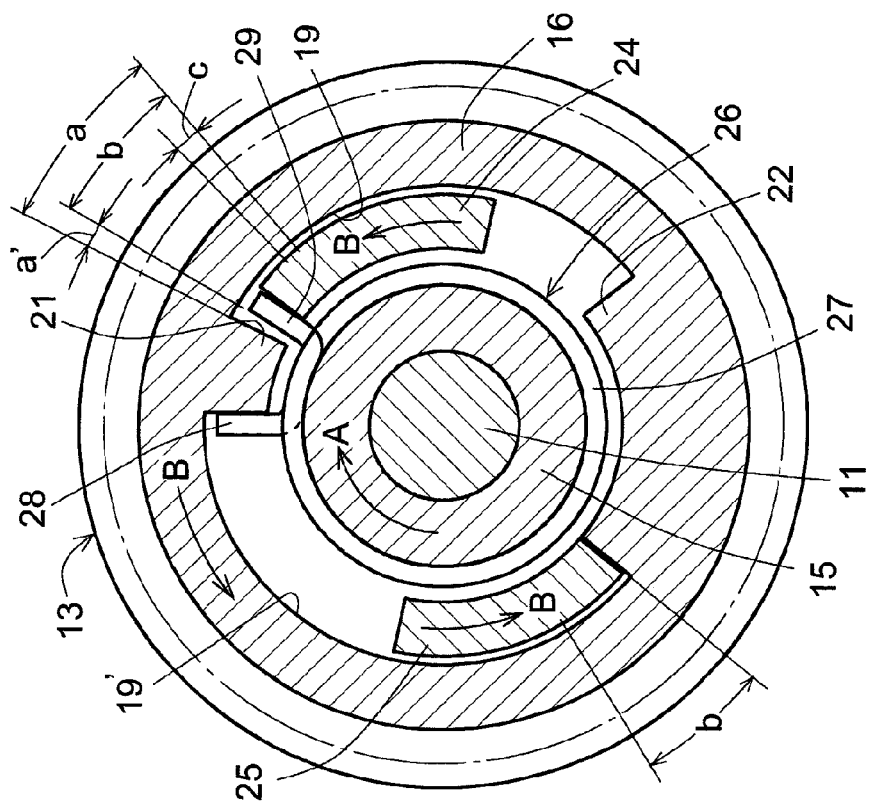
FIG. 36 is a sectional view taken along line X13-X13 of FIG. 35.
Figure 37:
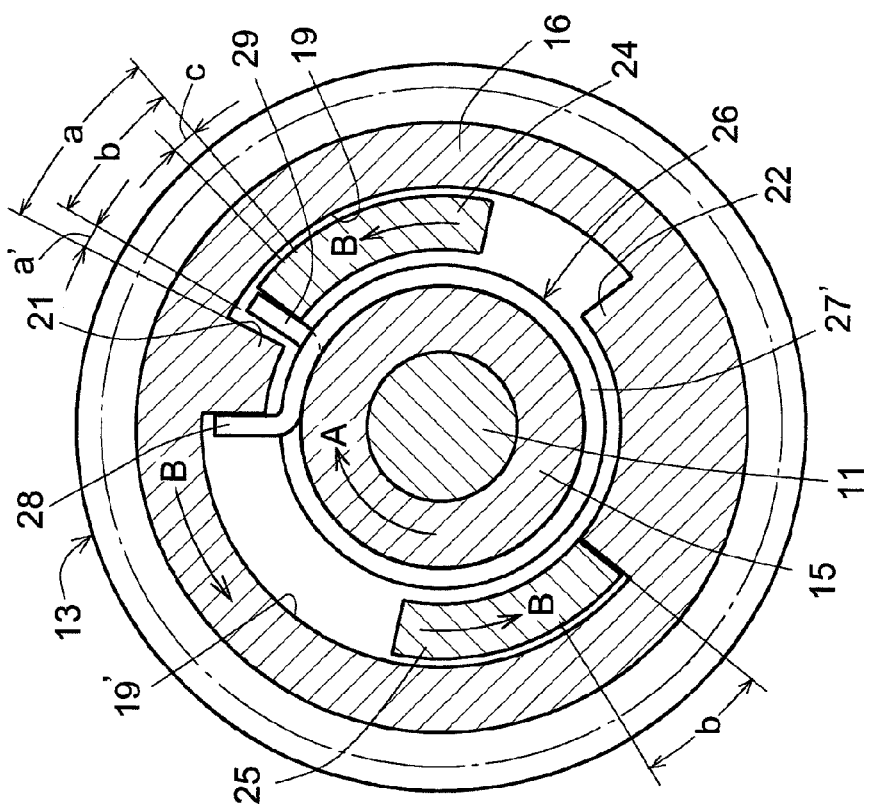
FIG. 37 is a sectional view taken along line X14-X14 of FIG. 35.
Figure 38:
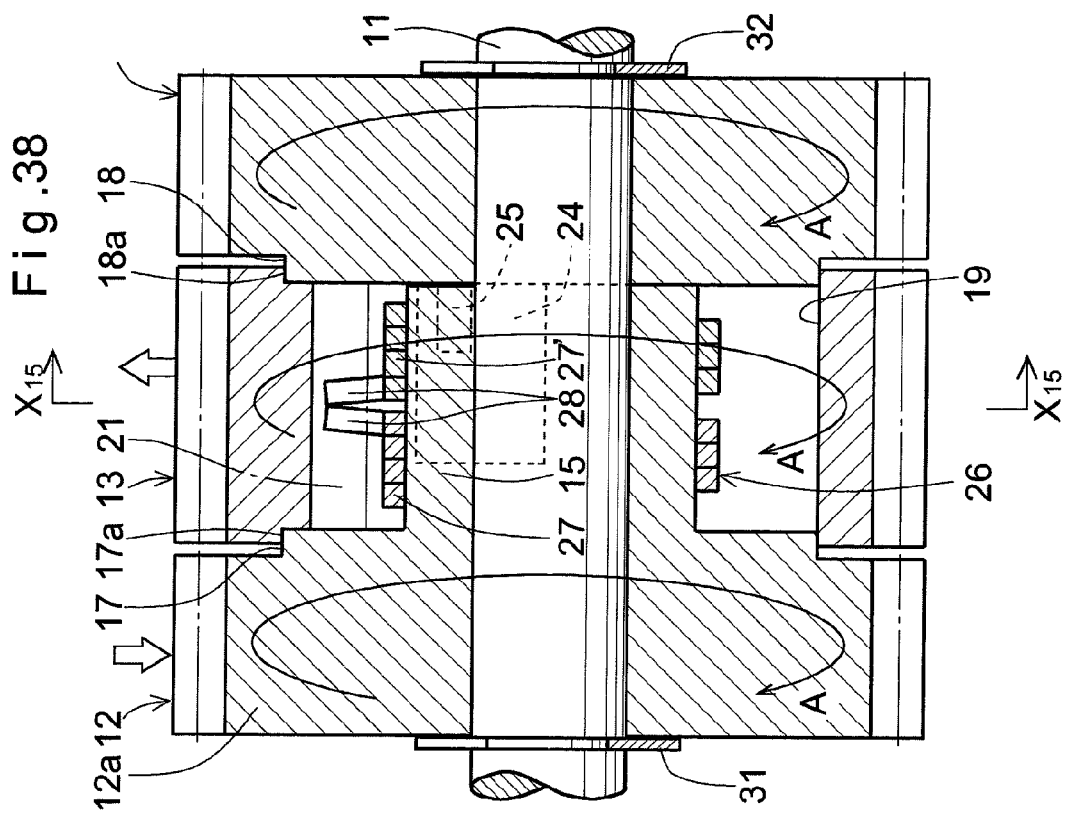
FIG. 38 is a sectional view of Embodiment 7.
Figure 39:
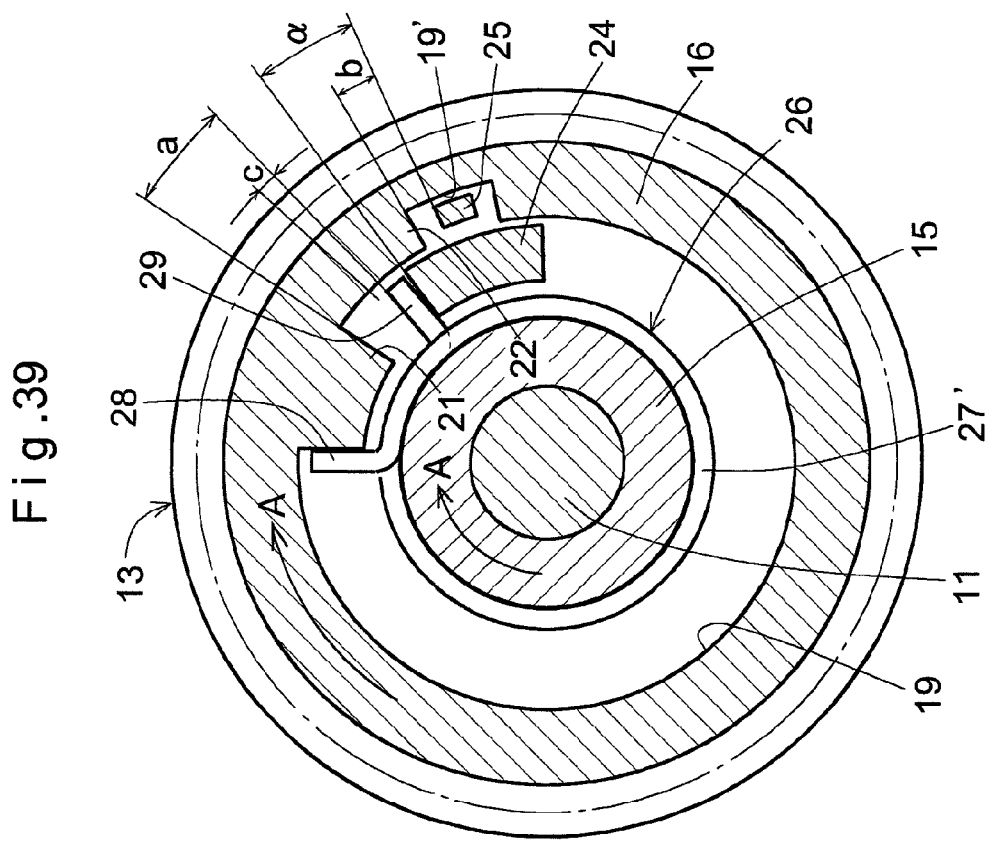
FIG. 39 is a sectional view taken along line X15-X15 of FIG. 38.
Figure 40:
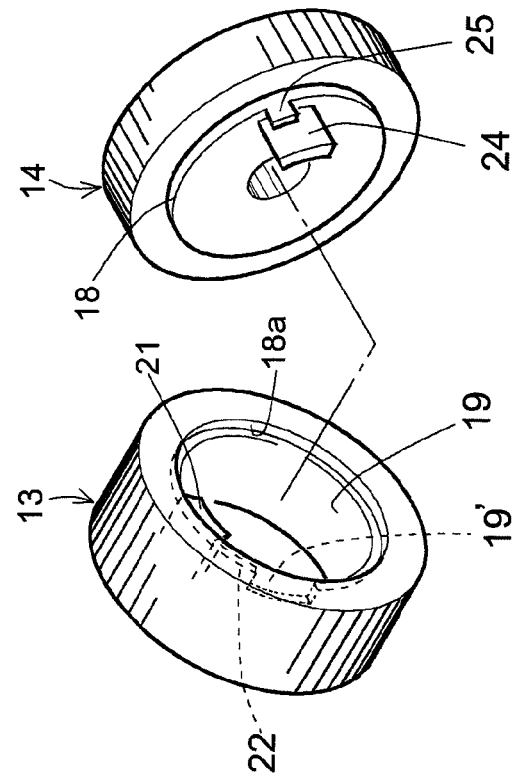
FIG. 40 is a partial exploded perspective view of Embodiment 7.
Figure 41:
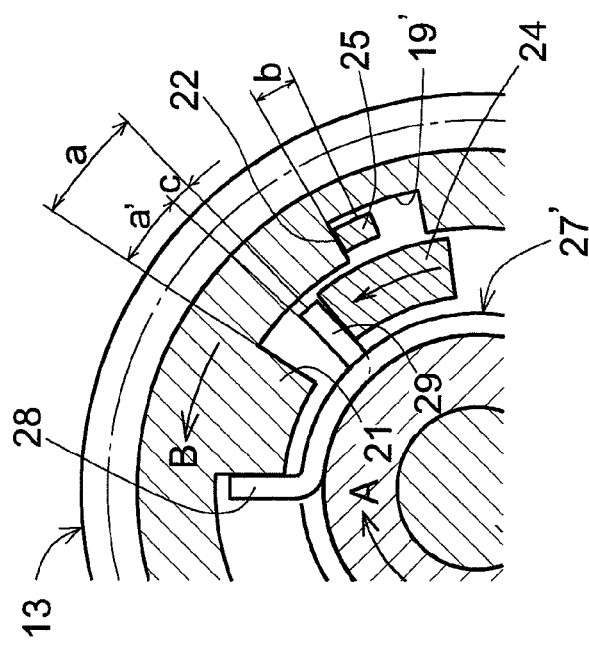
FIG. 41 is a partial sectional view of Embodiment 7 while torque in the reverse rotational direction is being transmitted.
Figure 42:
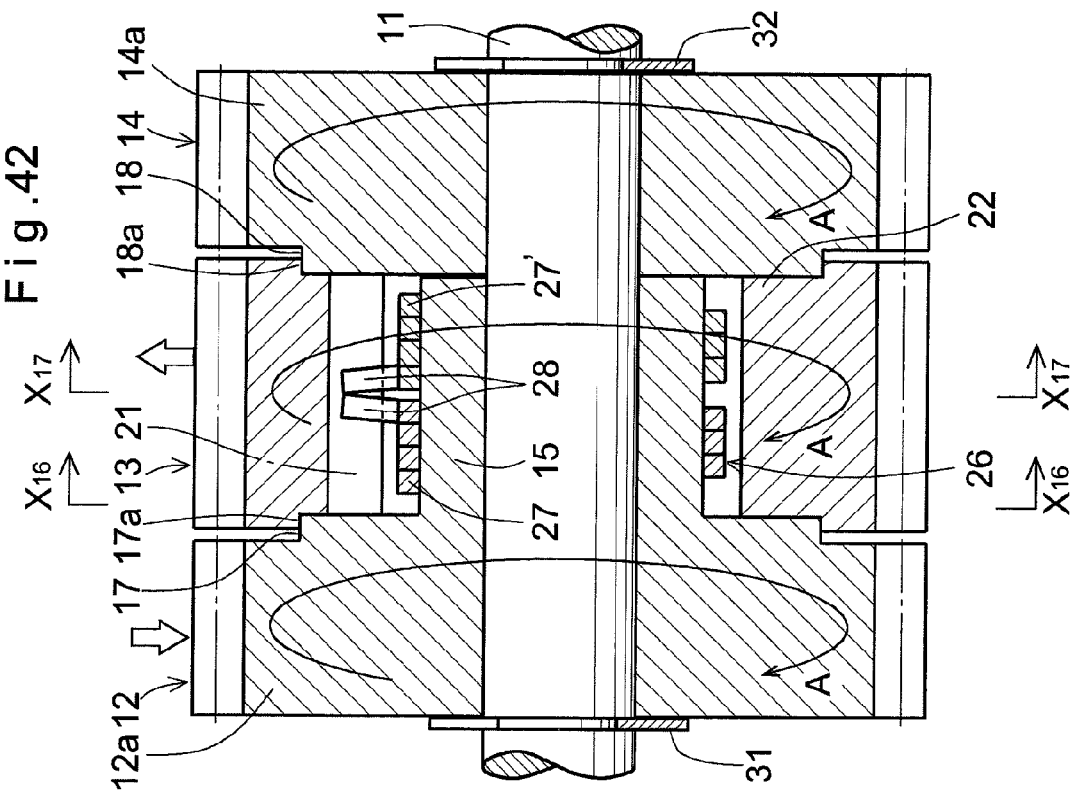
FIG. 42 is a sectional view of Embodiment 8.

In particular, the coil spring 27, which is located near the input gear 12, is wound in the counterclockwise direction (see FIG. 32), while the coil spring 27', which is located near the reverse input gear 14, is wound in the clockwise direction (see FIG. 33). Ordinarily, an even number of coil springs are provided, with half of them wound in one direction and the remainder wound in the opposite direction. The transmission hooks 28 of the respective coil springs 27 and 27' are axially aligned with each other. Their release hooks 29 are also axially aligned with each other. As shown in FIG. 31, the transmission hooks 28 of the coil springs 27 and 27' are located axially inside, and their release hooks 29 are located axially outside. The transmission hooks 28 axially face each other.

Each of the coil springs 27 and 27' have its transmission hook 28 and release hook 29 located on the respective sides (with respect to the rotational direction) of the hook engaging portion 21 with circumferential play (see FIGS. 32 and 33). In particular, the transmission hooks 28 face the rear end surface of the hook engaging portion 21 with respect to the forward rotational direction A. The release hooks 29 face the front end surface of the hook engaging portion 21 with respect to the forward rotational direction A, and are disposed between the front end surface and the release portion 24.

As shown in FIGS. 32 and 33, from the unlocking starting state in which the spring clutch 26 is locked with the transmission hooks 28 of the coil springs 27 and 27' pressed against the rear end surface of the hook engaging portion 21 and the release portion 24 in contact with the release hooks 29, the release hooks 29 are movable by a distance a until they contact the front end surface of the hook engaging portion 21. Also, in this state, the reverse rotational portion 25 is circumferentially spaced from the hook engaging portion 21 by a distance b, which is smaller than the distance a (a>b). From the unlocking state, when the release portion 24 is moved in the reverse rotational direction B by a distance c while pushing the release portions 29, the coil springs 27 and 27' are radially expanded and the spring clutch 26 is unlocked.

The operation of Embodiment 6 is now described. Because the operation of Embodiment 6 is basically the same as that of Embodiment 1, only what differs from Embodiment 1 is described. That is, while torque in the reverse rotational direction is being transmitted to the output gear 13, the input gear 12 keeps rotating in the forward rotational direction A. But because the spring clutch 26 is unlocked in this state, idling torque is produced between the spring clutch 26 and the input gear 12. Due to this idling torque, thrust forces S are produced in the respective coil springs 27 and 27' (see FIG. 31).

The thrust force S produced in the coil spring 27, which is wound counterclockwise, is the force toward the reverse input gear 14, while the thrust force S produced in the coil spring 27', which is wound clockwise, is the force in the opposite direction, i.e. toward the input gear 12. Since these thrust forces S are of the same magnitude and opposite in direction to each other, they cancel each other.

If the two coil springs were wound in the same direction, because thrust forces are produced in the respective coil springs in the same direction, the sum of these thrust forces would act on the input gear 12 or the reverse input gear 14, which could impede the rotation of the gears 12 and 14. In contrast, according to Embodiment 6, because the thrust forces cancel each other, they do not impede the rotation of the gears 12 and 14.

Embodiment 7

FIGS. 38 to 41 show Embodiment 7, which is the same as Embodiment 7 in that the spring clutch 26 comprises coil springs 27 and 27' which are wound in opposite directions to each other. Otherwise, this embodiment is the same as Embodiment 5 (shown in FIGS. 24 to 29) in that a single hook engaging portion 21 is formed on the radially inner surface of the output clutch portion 16 to define a receiving portion 19 on the radially inner surface of the output clutch portion 16 except its portion where the hook engaging portion 21 is formed, and a small recess as a second receiving portion 19' is formed in the radially inner surface of the receiving portion 19. The release portion 24 is received in the receiving portion 19, and the reverse rotational portion 25 is received in the receiving portion 19'.

Otherwise, Embodiment 7 is structurally and functionally identical to Embodiment 5, including the function that the thrust forces produced in the spring clutch 26 cancel each other. Thus, further description of Embodiment 7 is omitted.

Embodiment 8

FIGS. 42 to 51 show Embodiment 8, which is the same as Embodiment 6 (shown in FIGS. 30 to 37) in that the spring clutch 26 comprises coil springs 27 and 27' that are wound in opposite directions to each other. Otherwise this embodiment is structurally similar to Embodiment 1 (shown in FIGS. 1 to 6), and is also functionally similar to Embodiment 1 except that the thrust forces of the spring clutch 26 cancel each other as in Embodiment 6.

Functionally, this embodiment differs from Embodiment 6 in that the transmission hooks 27 of the coil springs 27 and 27' of Embodiment 6 face the rear end surface of the hook engaging portion 21 in a free state, while the transmission hooks 28 of Embodiment 8 are inserted in and circumferentially engaged with an engaging slit 23. Due to this structural difference, these embodiments functionally differ from each other as follows.

Figure 43:
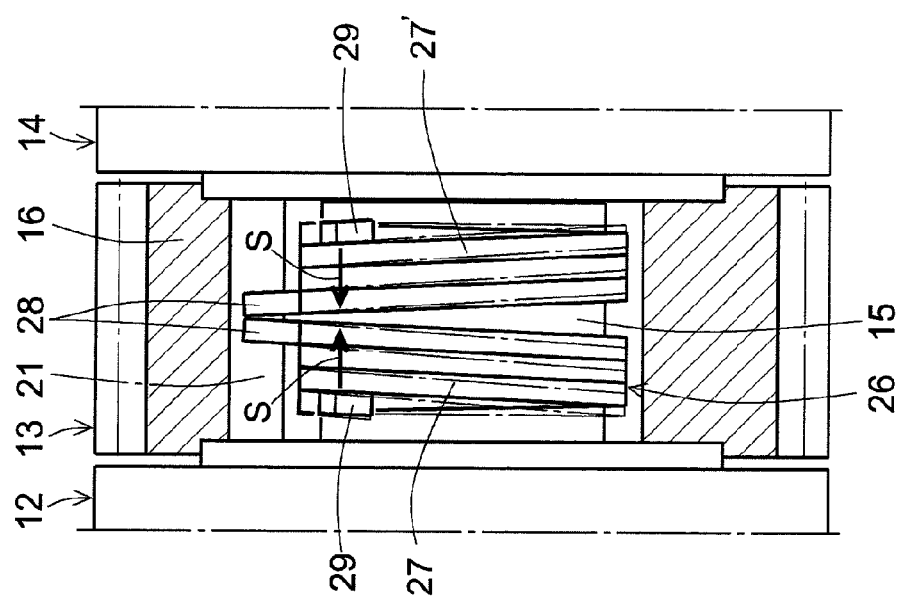
FIG. 43 is a partial vertical sectional front view of Embodiment 8.
Figure 44:
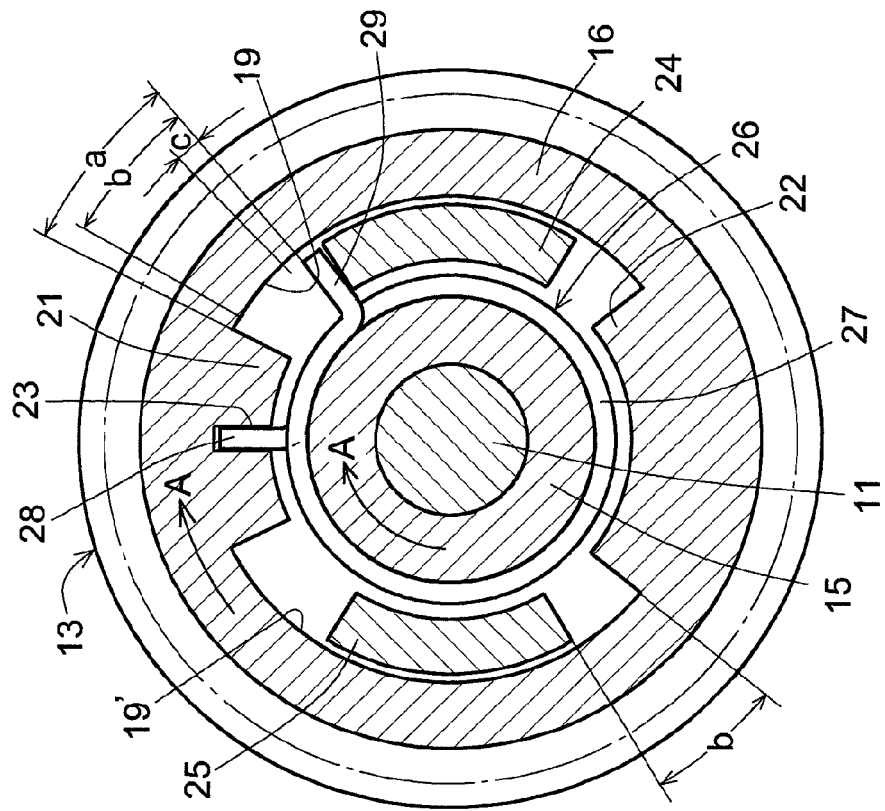
FIG. 44 is a sectional view taken along line X16-X16 of FIG. 42.
Figure 45:
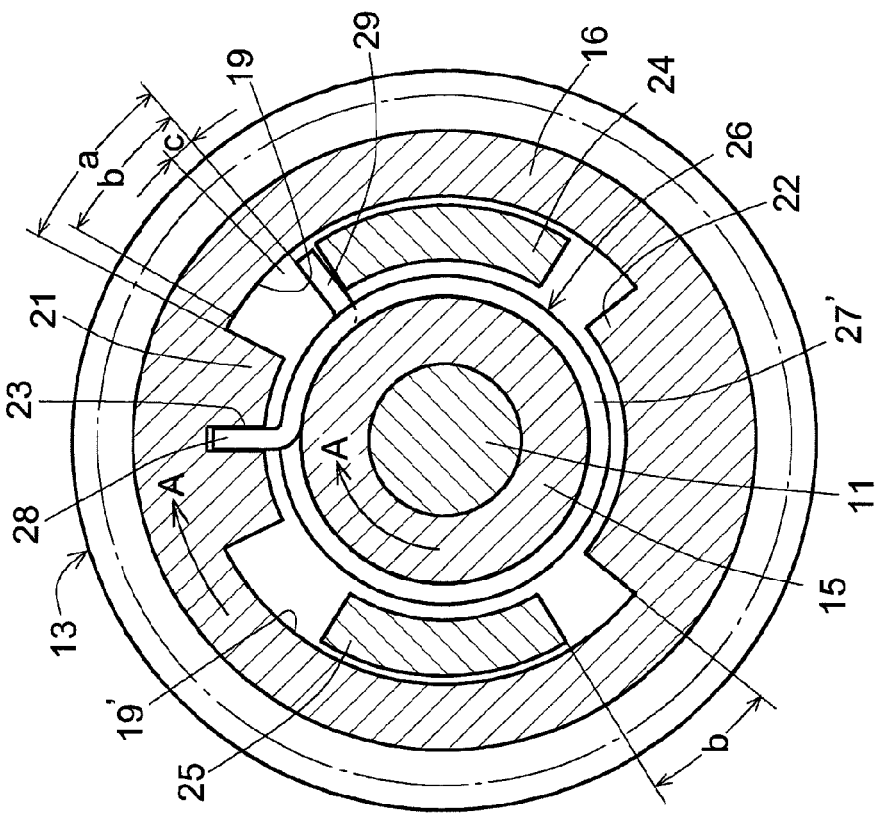
FIG. 45 is a sectional view taken along line X17-X17 of FIG. 42.
Figure 46:
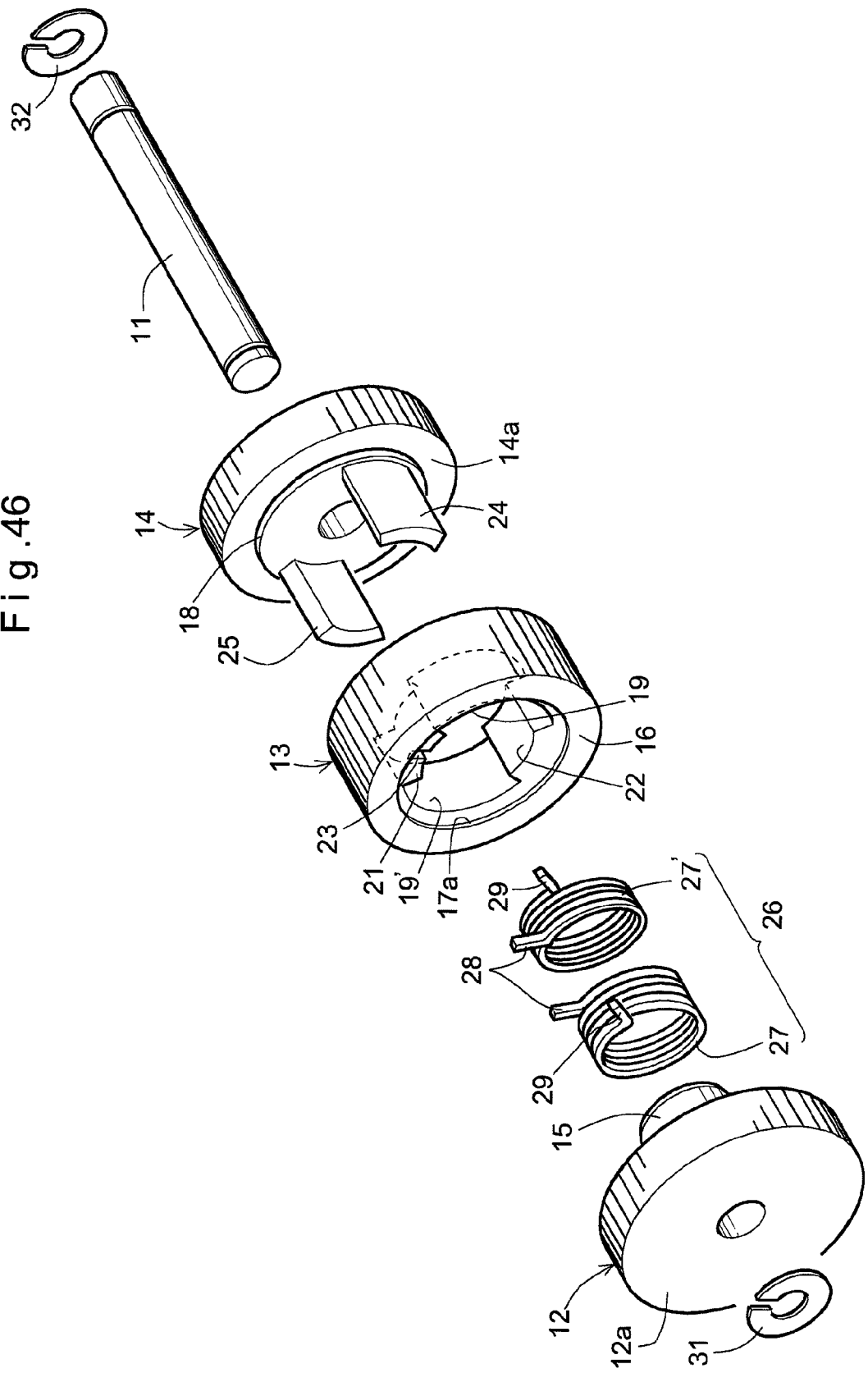
FIG. 46 is an exploded perspective view of Embodiment 8.
Figure 47:
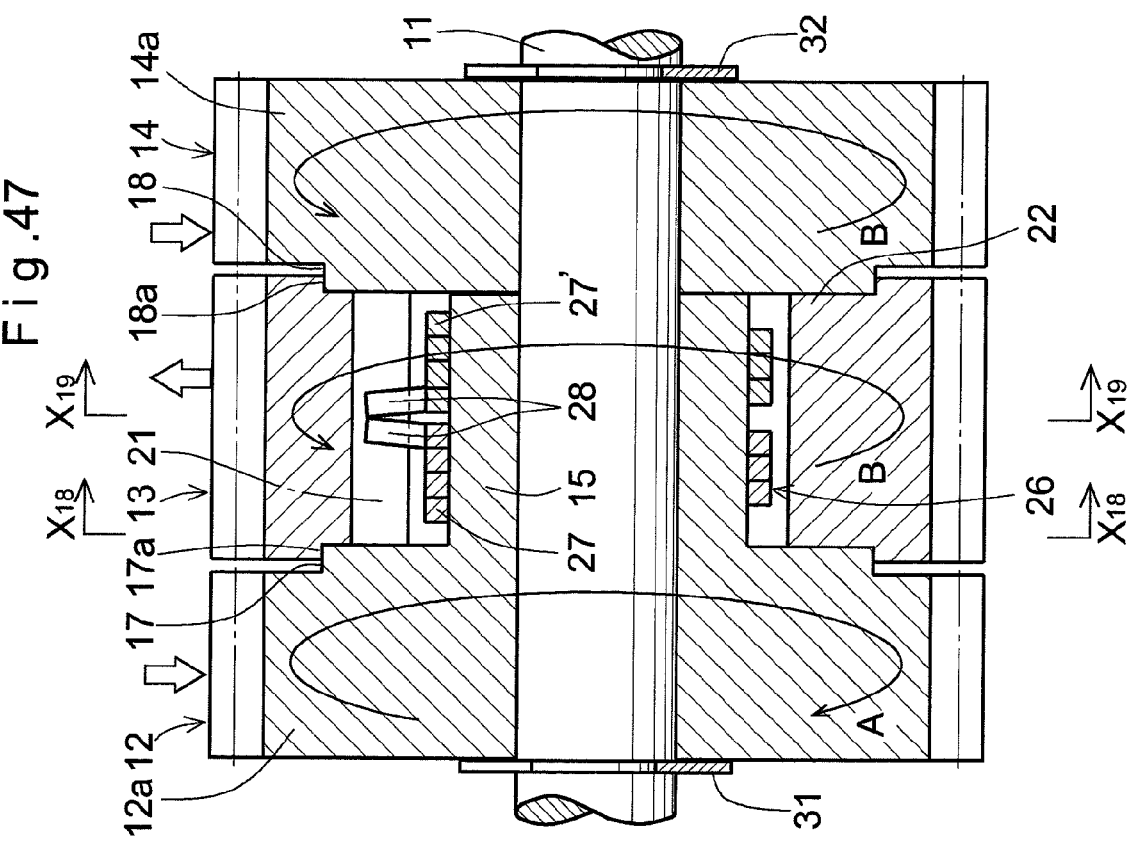
FIG. 47 is a partial sectional view of Embodiment 8 while torque in the reverse rotational direction is being transmitted.
Figure 48:
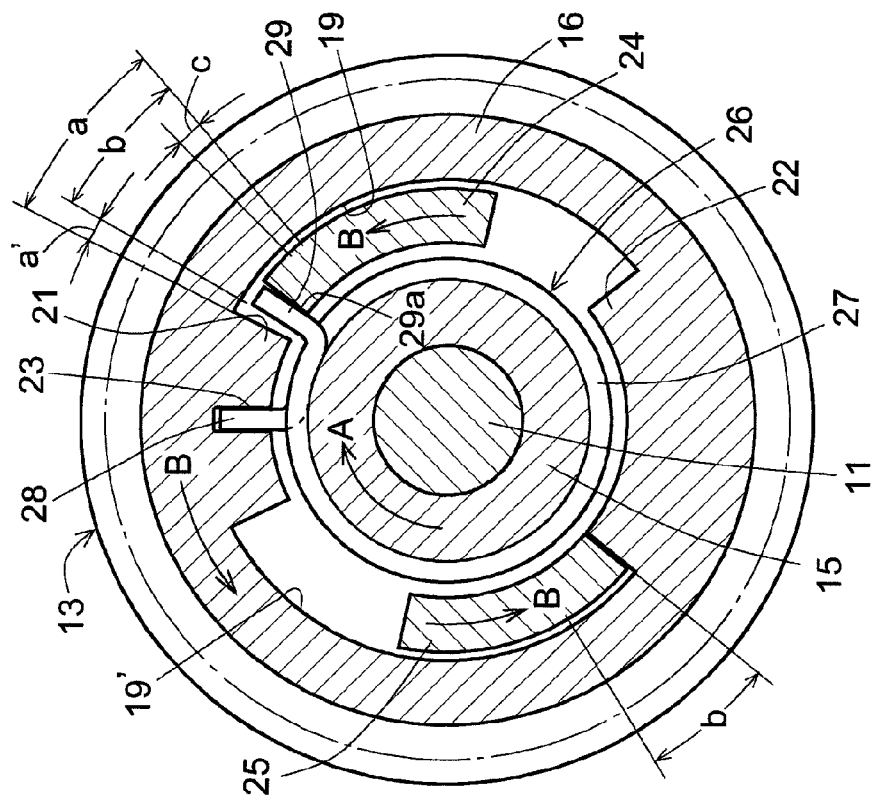
FIG. 48 is a sectional view taken along line X18-X18 of FIG. 47.
Figure 49:
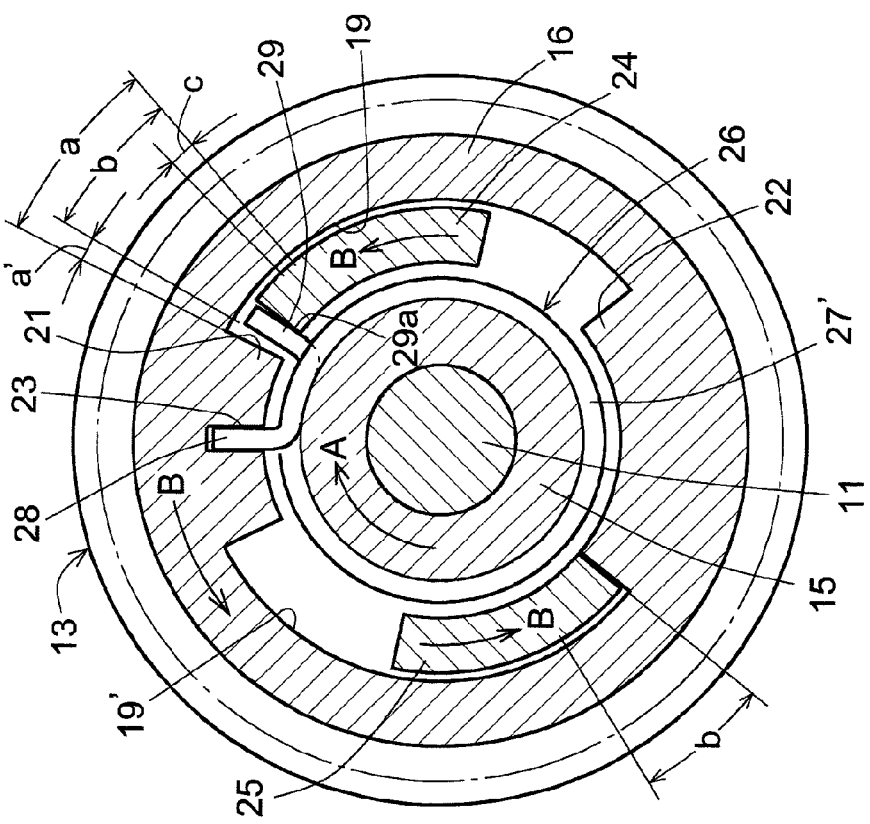
FIG. 49 is a sectional view taken along line X19-X19 of FIG. 47.

That is, in Embodiment 8, when the spring clutch is unlocked, the pushing amount of the release hooks 29 is entirely converted to the radial expansion of the coil springs 27 and 27'. Thus, the radial gap between the coil springs 27 and 27' and the radially outer surface of the input clutch portion 15 becomes relatively large. Thus, the coil springs 27 and 27' tend to be axially inclined. As shown in FIG. 43, the coil spring 27, which is wound counterclockwise, tends to be inclined rightwardly in FIG. 43 (as shown by one-dot chain line), while the coil spring 27', which is wound clockwise, tends to be inclined leftwardly in FIG. 43. Thus, the coil springs 27 and 27' abut and support each other, thereby preventing any further inclination of the coil springs.

In contrast, if the plurality of coil springs were wound in the same direction, they would be inclined in the same direction without being supported by each other, thus causing one of the coil springs to be pressed hard against the input gear 12 or the reverse input gear 14. This may in turn destabilize the rotation of the gears 12 and 14. In Embodiment 8, because the coil springs tend to be inclined in opposite directions to each other, each of the coil springs serve to prevent excessive inclination of the other, thereby allowing stable transmission of torque.

Figure 50:
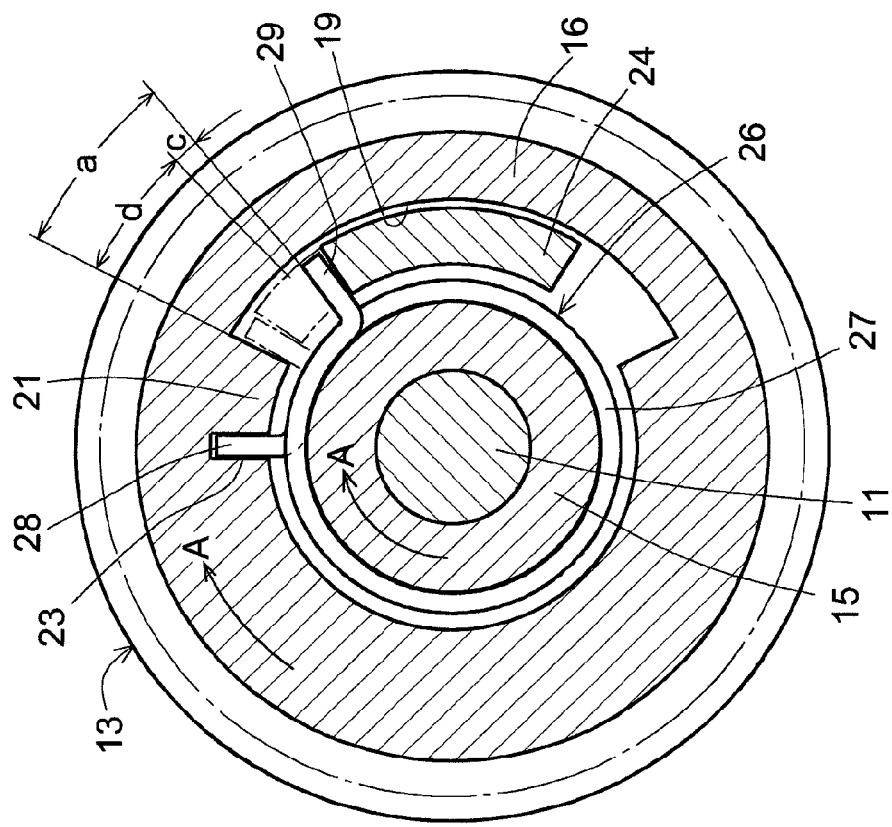
FIG. 50 is a sectional view of a modified embodiment of Embodiment 8.
Figure 51:
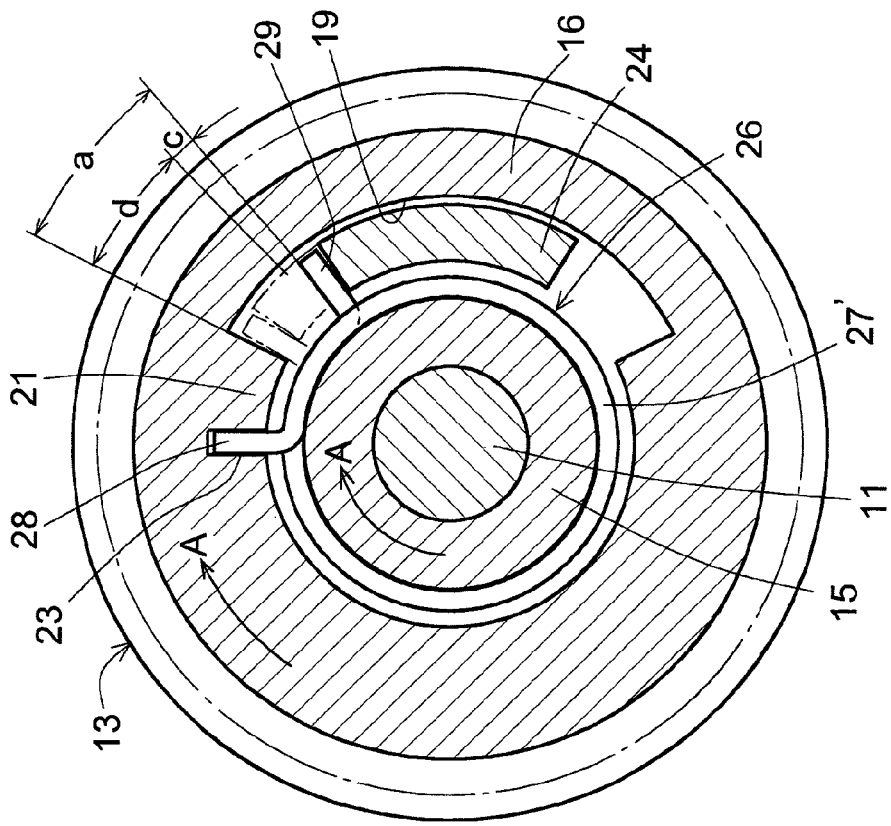
FIG. 51 is a sectional view of a different portion of the modified embodiment of Embodiment 8.
Figure 52:
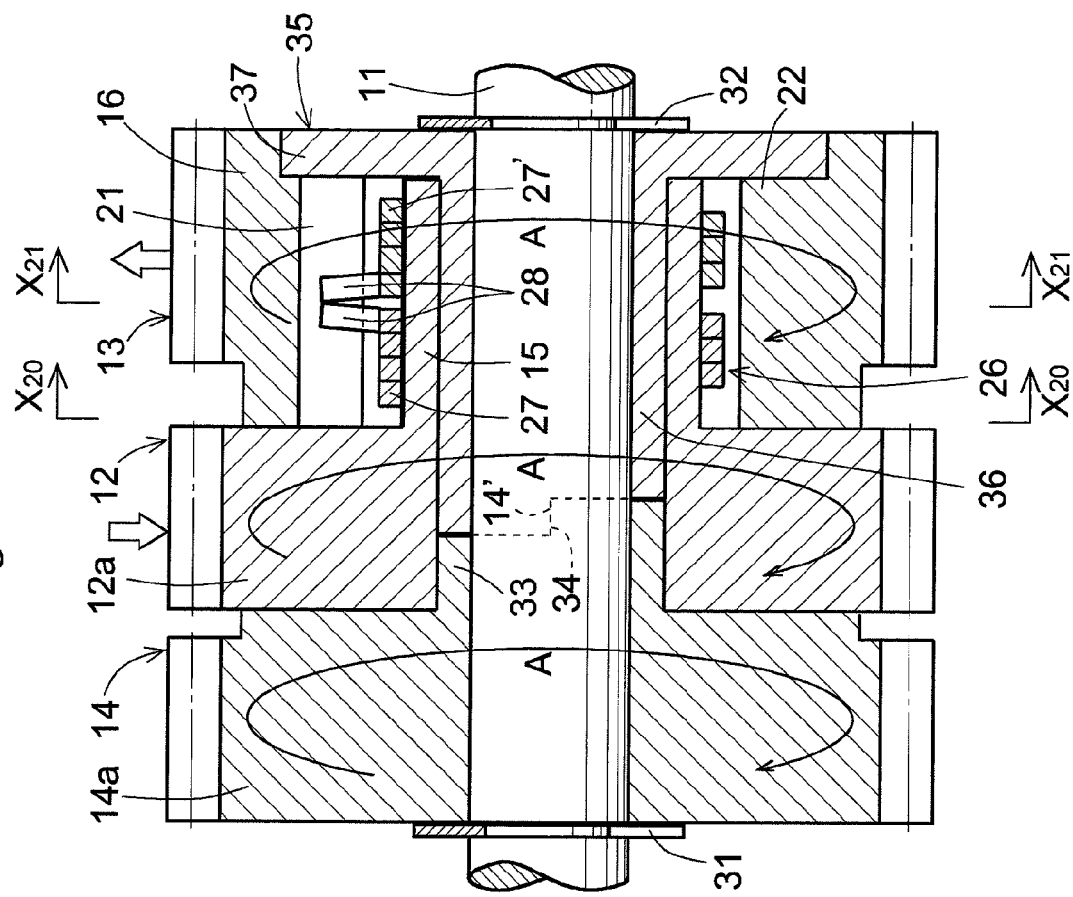
FIG. 52 is a sectional view of Embodiment 9.
Figure 53:
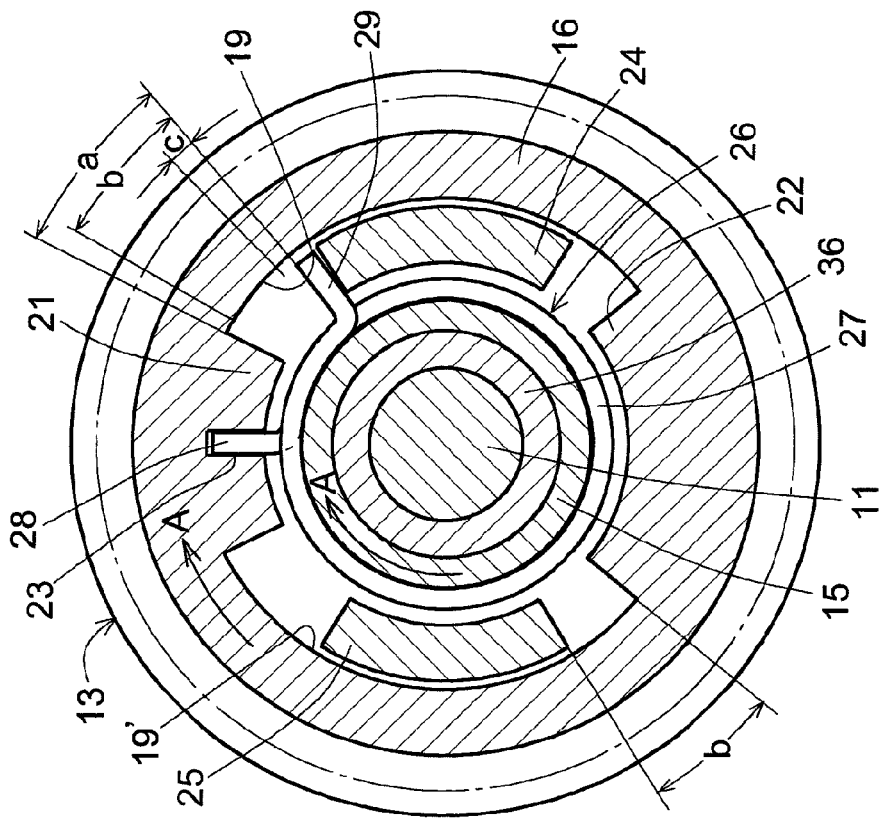
FIG. 53 is a sectional view taken along line X20-X20 of FIG. 52.
Figure 54:
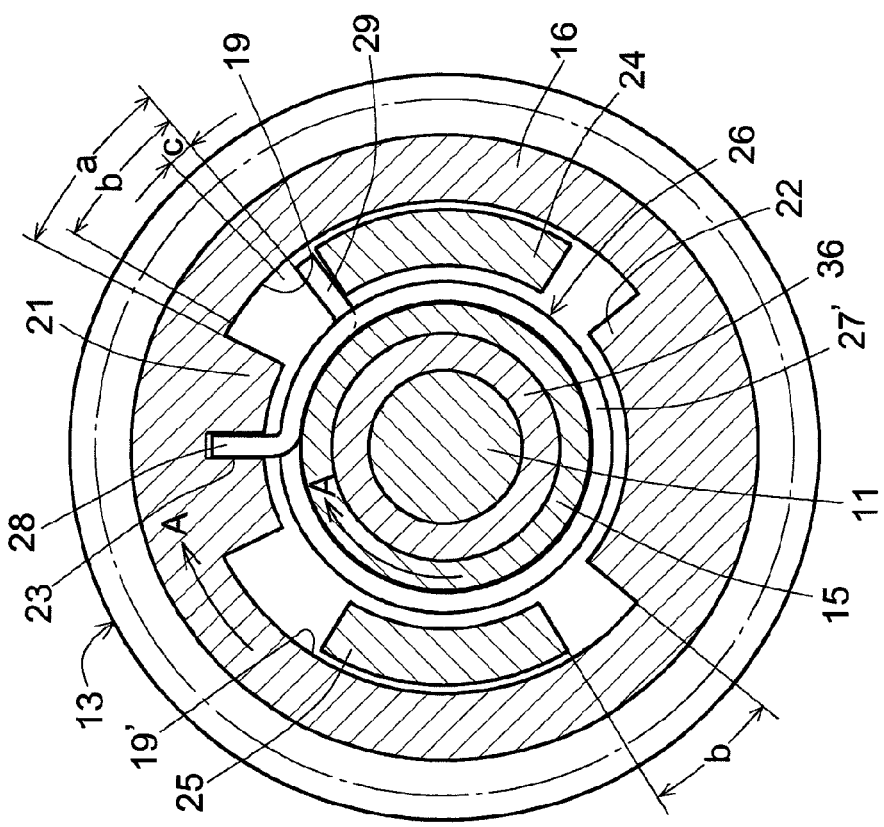
FIG. 54 is a sectional view taken along line X21-X21 of FIG. 52.
Figure 55:
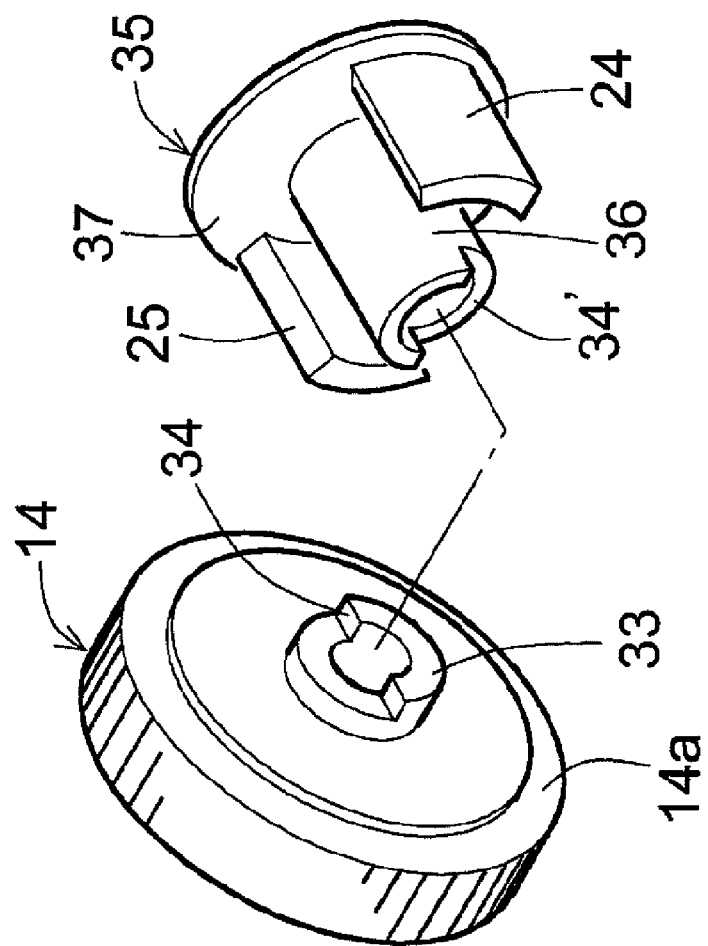
FIG. 55 is a partial exploded perspective view of Embodiment 9.
Figure 56:
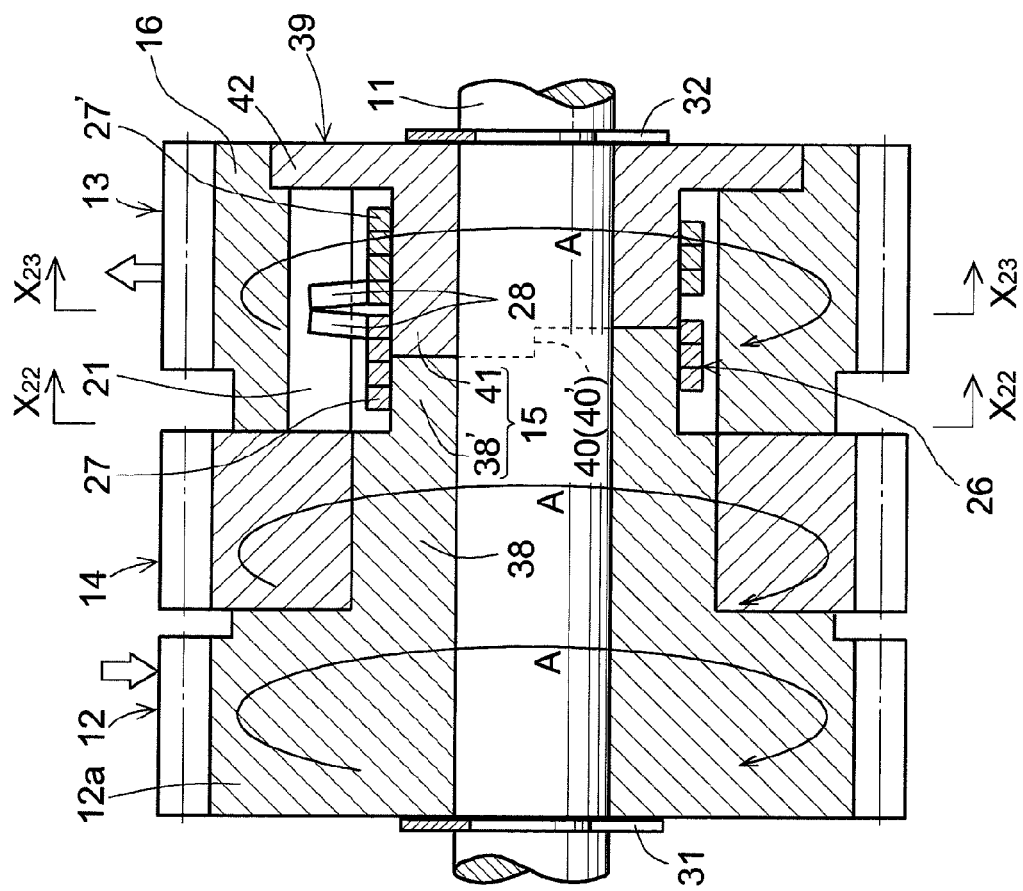
FIG. 56 is a sectional view of Embodiment 10.
Figure 57:
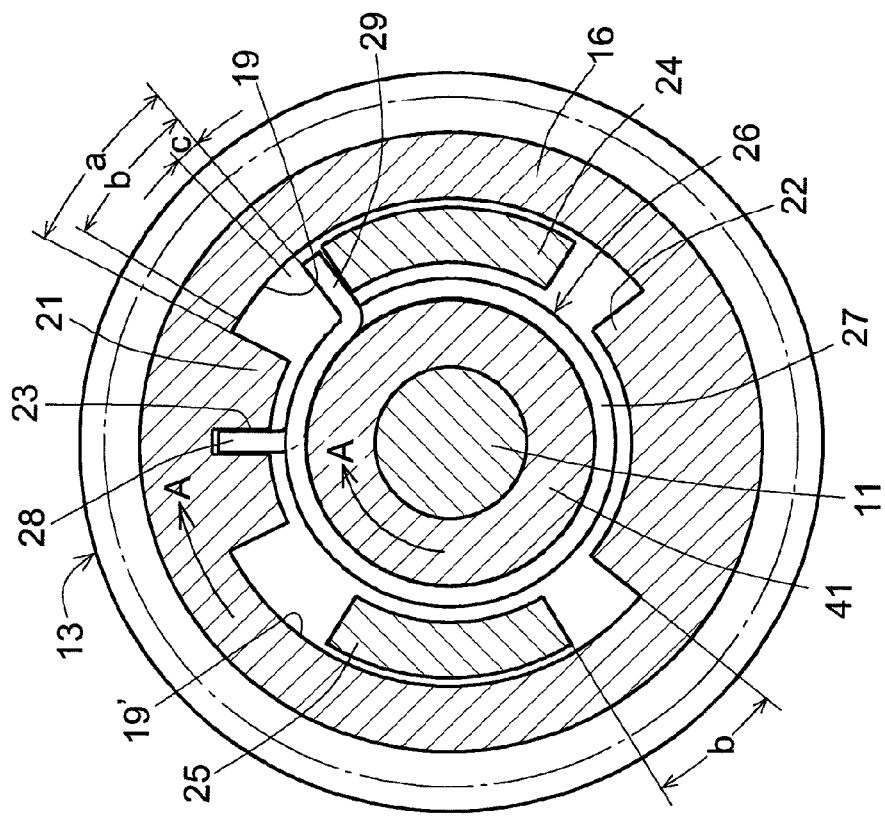
FIG. 57 is a sectional view taken along line X22-X22 of FIG. 56.
Figure 58:
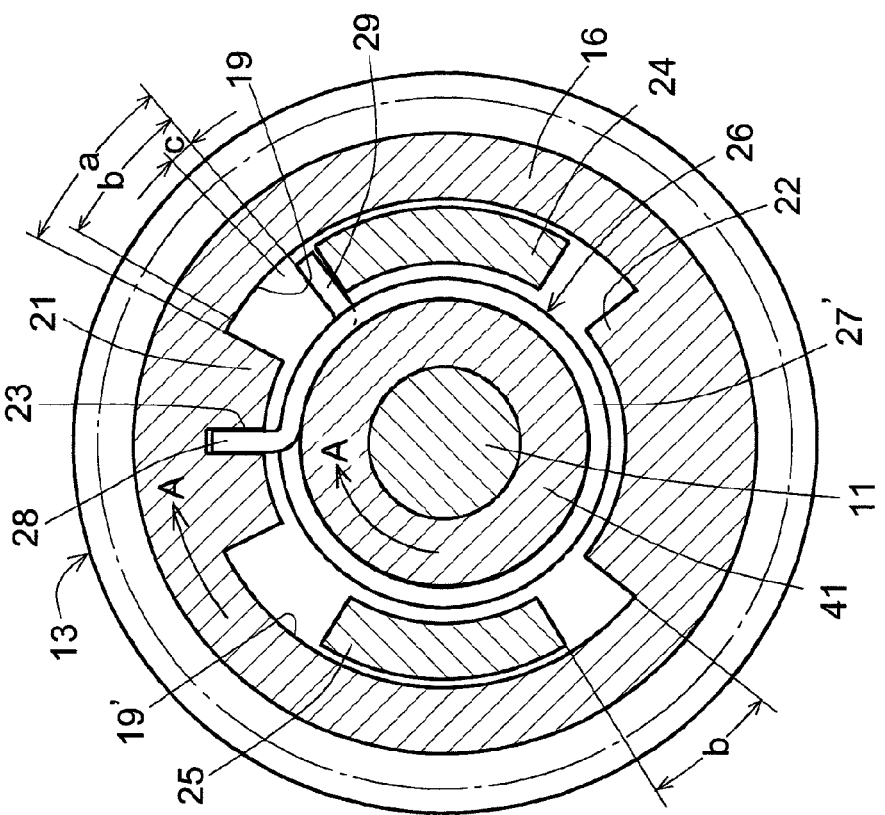
FIG. 58 is a sectional view taken along line X23-X23 of FIG. 56.
Figure 59:
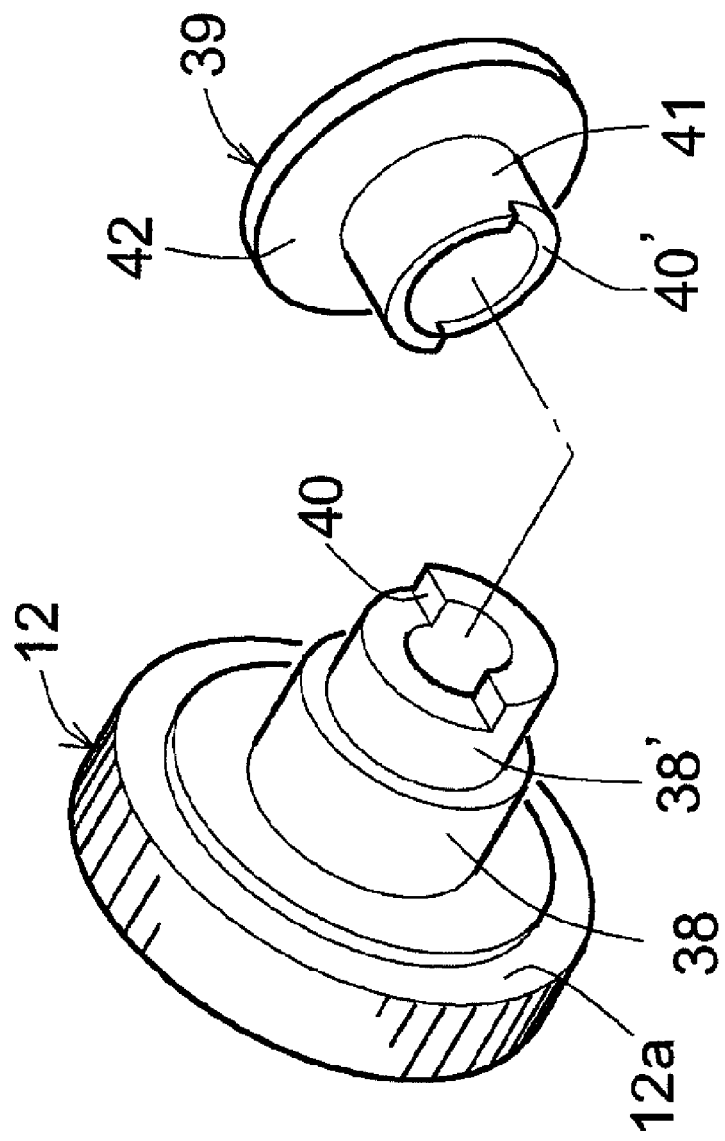
FIG. 59 is a partial exploded perspective view of Embodiment 10.

FIGS. 50 and 51 show a modified embodiment of Embodiment 8, in which as with the modified embodiment of Embodiment 1 (shown in FIG. 6(*a*)), the reverse rotational portion 25 and the reverse rotation engaging portion 22 are omitted. That is, a hook engaging portion 21 is formed on the radially inner surface of the output gear 13 to extend most of the radially inner surface, thereby defining a receiving portion 19 between the ends of the hook engaging portion 21.

This embodiment differs from the embodiment of FIG. 6 in that the spring clutch 26 comprises two coil springs 27 and 27' that are wound in opposite directions to each other. But since the spring clutch 26 of this embodiment is structurally and functionally the same as those of Embodiments 6 to 8, its description is omitted.

Embodiment 9

FIGS. 52 to 55 show Embodiment 9, which is the same as Embodiment 2 (shown in FIGS. 7 to 11) except that the spring clutch 26 comprises two coil springs 27 and 27' that are wound in opposite directions to each other. This spring clutch 26 has already been described.

Embodiment 10

FIGS. 56 to 59 show Embodiment 10, which is the same as Embodiment 3 (shown in FIGS. 12 to 16) except that the spring clutch 26 comprises two coil springs 27 and 27' that are wound in opposite directions to each other. This spring clutch 26 has already been described.

Embodiment 11

FIGS. 60 to 63 show Embodiment 11, which is the same as Embodiment 4 (shown in FIGS. 18 to 23) except that the spring clutch 26 comprises two coil springs 27 and 27' that are wound in opposite directions to each other. This spring clutch 26 has already been described.

Embodiment 12

Figure 64:
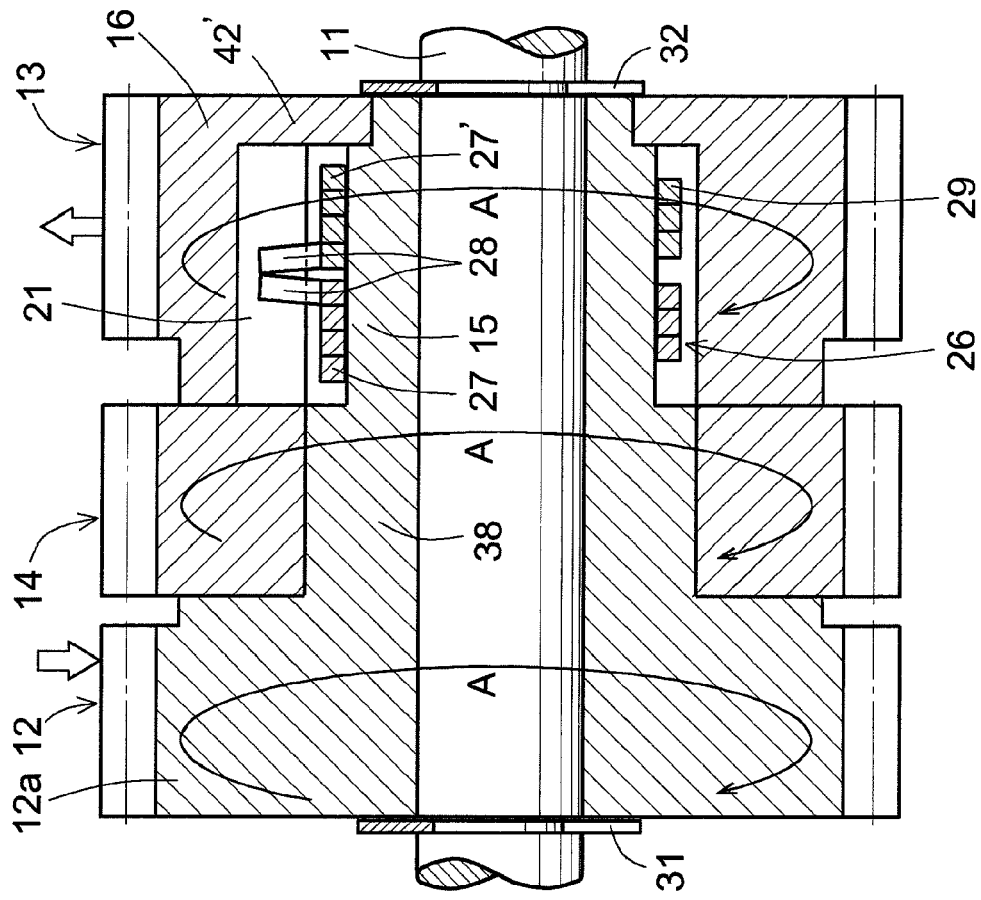
FIG. 64 is a sectional view of Embodiment 12.

FIG. 64 shows Embodiment 12, which is similar in basic structure to Embodiment 10 (shown in FIGS. 56 to 59). In this embodiment, instead of the independent flange member 39 of Embodiment 10, at the front end of the boss portion 38 of the input gear 12, a boss-shaped input clutch portion 15 having a smaller diameter than the boss portion 38 is provided to extend through the output gear 13. The output clutch portion 16, which is integral with the output gear 13, has a radially inwardly extending flange 42' on the front end of its radially inner surface. The flange 42' is engaged in the radially outer surface of the input clutch portion 15 at its front end. The spring clutch 26 comprises coil springs 27 and 27' which are tightly bound to the input clutch portion 15.

Embodiment 13

FIGS. 65 to 76 show Embodiment 13, which differs from the previous embodiments in that the spring clutch 26a is mounted on the radially inner surface of the input clutch portion 15a (internally mounted type).

In this case, the output gear 13, input gear 12, and reverse input gear 14 are coaxially mounted in this order from left on the fixed shaft 11. The output gear 13 has a gear body 13a having a cylindrical output clutch portion 16a on the central portion of its inner end surface. The output clutch portion 16a extends through the center of the input gear 12 with its front end portion rotatably extending through the radially inner surface of the reverse input gear 14. The input gear 12 is an annular member which is held in position in the radial and thrust directions so as to be rotatable relative to the output shaft 13 and the reverse input gear 14, by shoulders 17 and 18 formed on the opposed inner surfaces of the output gear 13 and the reverse input gear 14, respectively.

Figure 65:
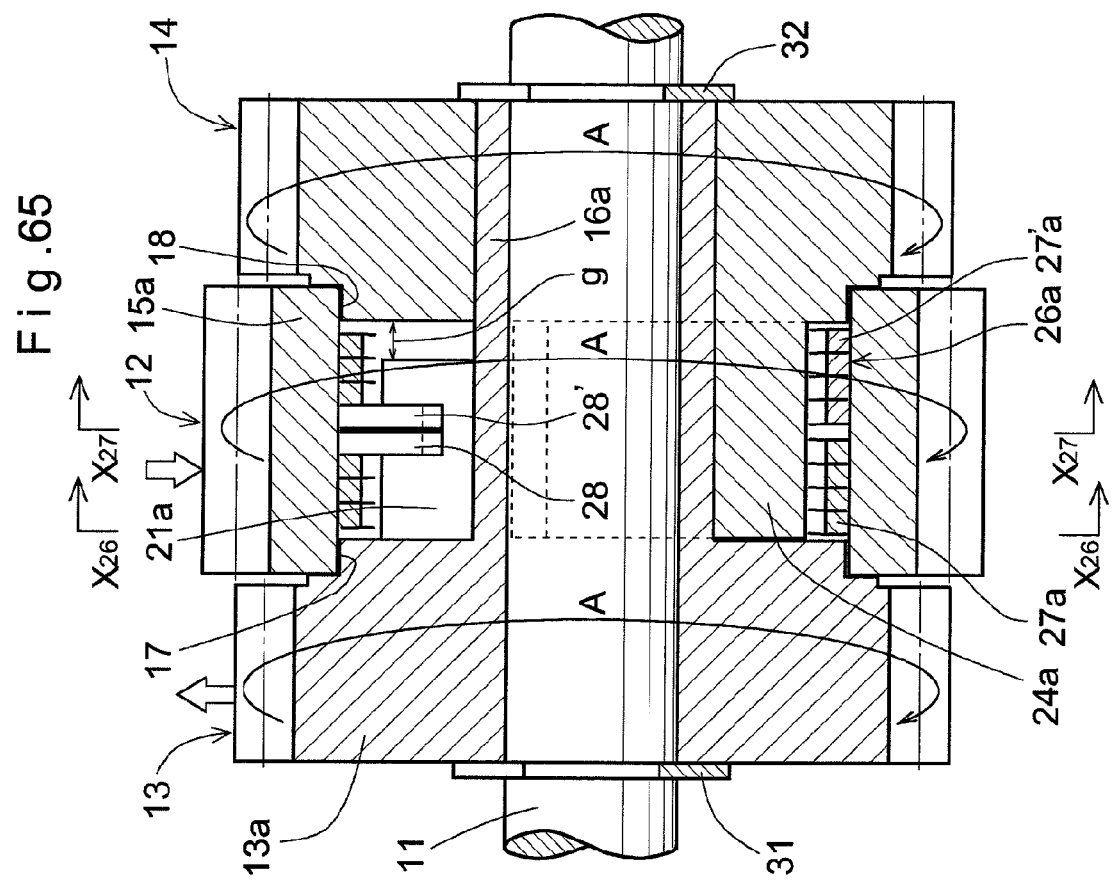
FIG. 65 is a sectional view of Embodiment 13.
Figure 66:
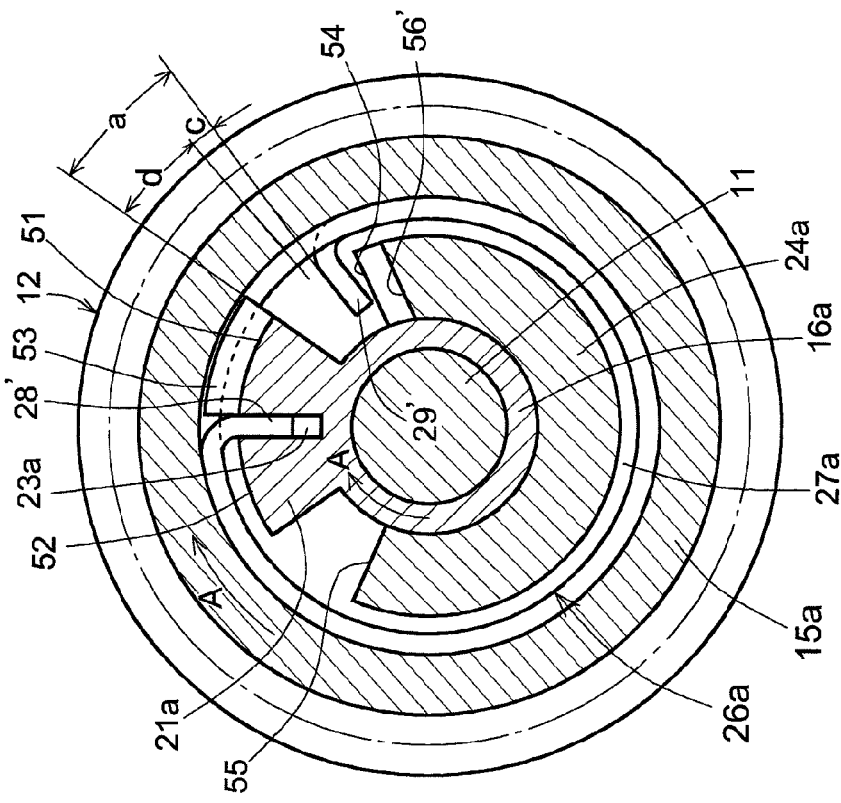
FIG. 66 is a sectional view taken along line X26-X26 of FIG. 65.
Figure 67:
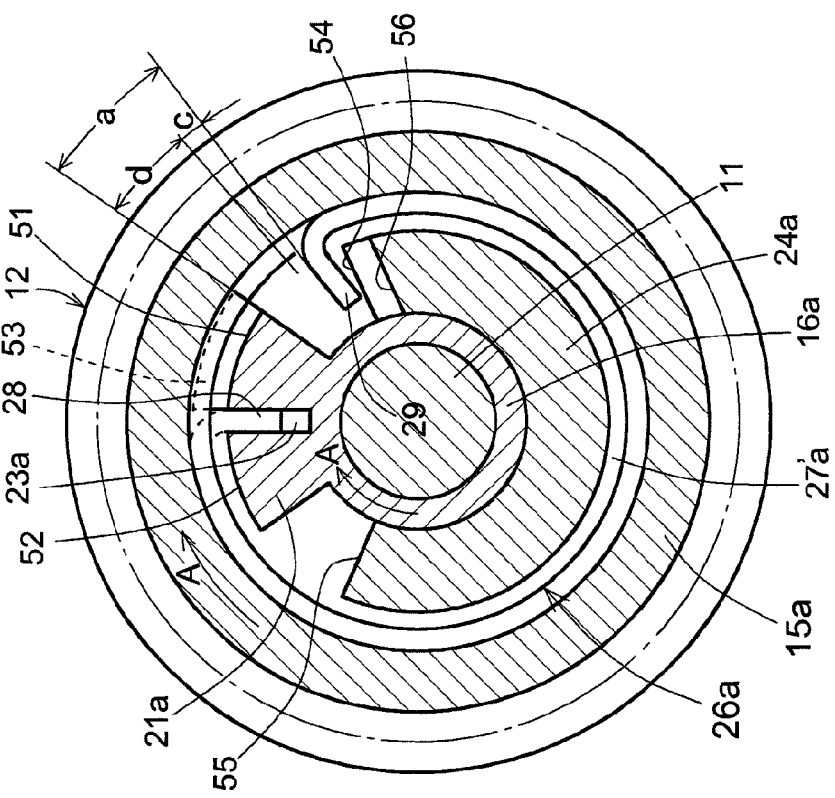
FIG. 67 is a sectional view taken along line X27-X27 of FIG. 65.

A hook engaging portion 21a having a fan-shaped axial section is formed on the radially outer surface of the base of the output clutch portion 16a of the output gear 13, i.e. its portion in contact with or near the inner end surface of the output gear 13 (see FIGS. 66 and 67). The hook engaging portion 21a has such an axial length that a small gap g (see FIG. 65) is defined between it and the inner surface of the reverse input gear 14, and serves, as described below, to transmit driving torque in the forward rotational direction A from the input gear 12 to the output gear 13, in cooperation with the spring clutch 26a.

The hook engaging portion 21a has a central angle of about 60 degrees as viewed from the axial direction (see FIGS. 66 and 67), and has an axial engaging slit 23a at its central portion. The hook engaging portion 21a is divided by the engaging slit 23a into a front engaging portion 51 with respect to the forward rotational direction A (which is the right-hand portion in FIGS. 66 and 67) and a rear engaging portion 52 with respect to the forward rotational direction A (left-hand portion in FIGS. 66 and 67). The front engaging portion 51 has a hook reinforcing protrusion 53 that extends perpendicular to the engaging slit 23a (see FIG. 69). The hook reinforcing protrusion 53 is provided substantially on the longitudinal center of the engaging portion 51, and has a width substantially equal to the sum of the axial widths of two axially adjacent transmission hooks 28 and 28' of the spring clutch 26a, which is described later (see FIG. 71).

Figure 68:
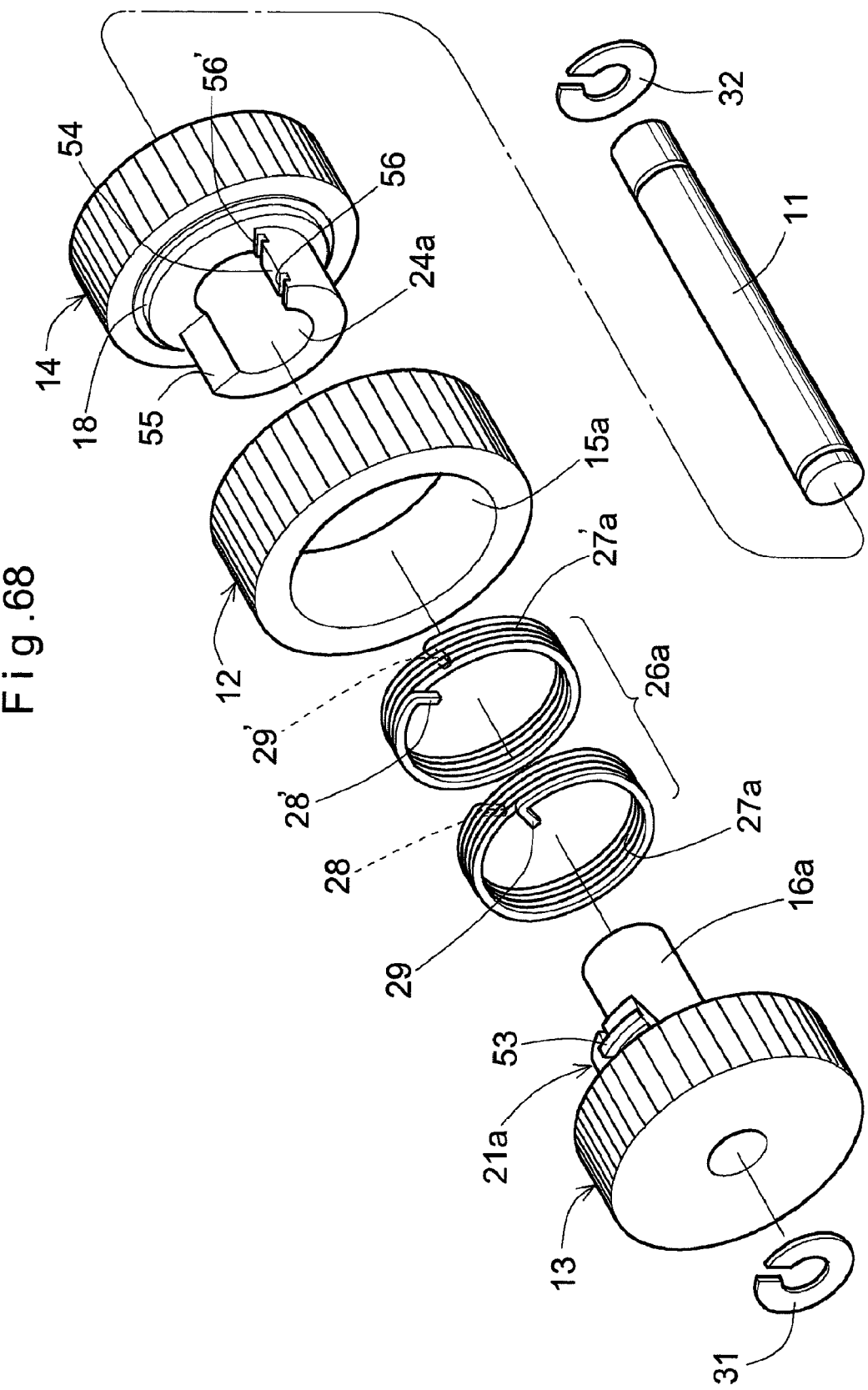
FIG. 68 is an exploded perspective view of Embodiment 13.

A part-cylindrical release portion 24a having a central angle of 180-plus degrees as viewed from the axial direction is formed on the inner end surface of the reverse input gear 14 (see FIGS. 66 to 68). The release portion 24a has a radially inner arcuate surface that is coincident with the radially inner surface of the reverse input gear 14, and is rotatably fitted around the output clutch portion 16a. Because the part-cylindrical release portion 24a having a central angle of 180-plus degrees surrounds and supports the output clutch portion 16a, the output gear 13 and the reverse input gear 14 can stably rotate relative to each other (see FIGS. 66 and 67).

The front engaging surface 54 of the release portion 24a with respect to the reverse rotational direction B and its rear engaging surface 55 are circumferentially spaced from the hook engaging portion 21a. Thus, the release portion 24a can rotate relative to the hook engaging portion 21a between the positions where the respective engaging surfaces 54 and 55 abut the hook engaging portion 21a. Release hooks 29 and 29' of the spring clutch 26a are disposed between the front engaging surface 54 with respect to the reverse rotational direction B and the hook engaging portion 21a.

Engaging grooves 56 and 56' are formed in the engaging surface 54 so as to face the release hooks 29 and 29' in the reverse rotational direction B (see FIG. 68). The engaging grooves 56 and 56' have a depth larger than the wire thickness of the release hooks 29 and 29', so that when the release portion 24a rotates in the reverse rotational direction B and contacts the release hooks 29 and 29', the release hooks 29 and 29' are entirely received in the respective engaging grooves 56 and 56', thereby allowing the engaging surface 54 to be directly brought into engagement with the hook engaging portion 21a (see FIGS. 75 and 76).

As shown in FIG. 68, the spring clutch 26a comprises a pair of coil springs 27a and 27'a that are of the same size and differs from each other only in winding direction. Each of the coil springs 27a and 27'a is formed by tightly winding a steel wire having a square section (by four-less times in the illustrated example). Their ends are bent radially inwardly to form transmission hooks 28 and 28' and release hooks 29 and 29'. The coil springs 27a and 27'a are radially pressed against the radially inner surface of the input clutch portion 15a, which is formed by the gear body of the input gear 12, in a radially compressed state (internally mounted type).

The coil spring 27a is wound clockwise, while the coil spring 27'a is wound counterclockwise. The transmission hooks 28 and 28', which are provided inside and pressed against each other, transmit driving torque from the input member to the output member. The release hooks 29 and 29', which are provided outside, serve to unlock the spring clutch 26a.

Figure 70:
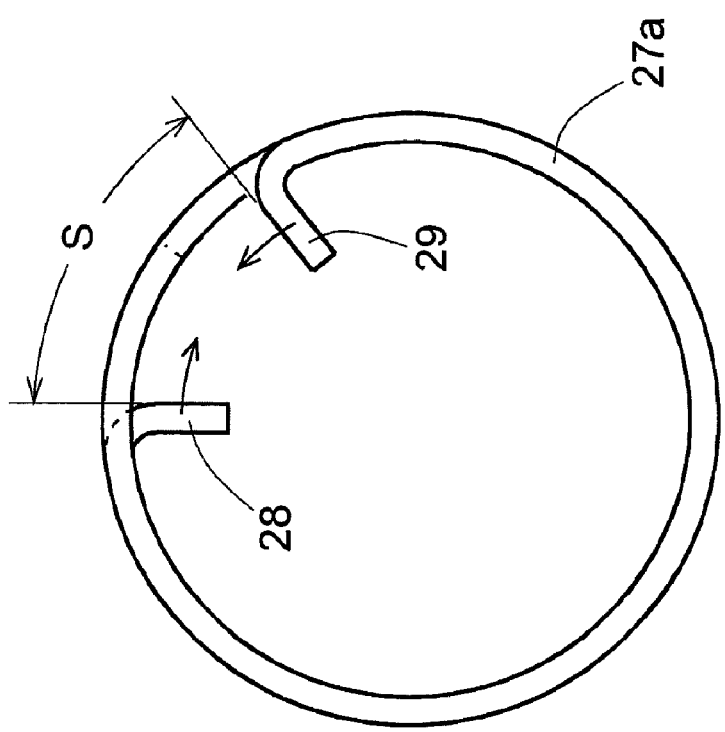
FIG. 70 is an enlarged front view of a coil spring thereof.

Now the coil spring 27a, which is wound clockwise, is described with reference to FIG. 70. The transmission hook 28 and the release hook circumferentially face each other at the respective ends of a minor arc extending the circumferential range S. With this coil spring 27a, as well the coil spring 27'a, which is wound counterclockwise, when external forces are applied to the transmission hook 28 (28') and the release hook 29 (29') that tend to push them toward each other over the minor arc (see the arrows), the coil spring is radially compressed. When external forces in the opposite directions are applied, the coil spring is radially expanded.

The transmission hooks 28 and 28' of the coil springs 27a and 27'a are inserted into the engaging slit 23a formed in the hook engaging portion 21a from radially outside thereof while being axially adjacent to each other and engaged in the rotational direction. The release hooks 29 and 29' are disposed between the hook engaging portion 21a and the front engaging surface 54 with respect to the reverse rotational direction B (see FIGS. 66 to 68). The coil portions of the respective coil springs 27a and 27'a is elastically pressed, in a radially compressed state, against the radially inner surface of the input gear 12, i.e. the radially inner surface of the input clutch portion 15a.

Figure 69:
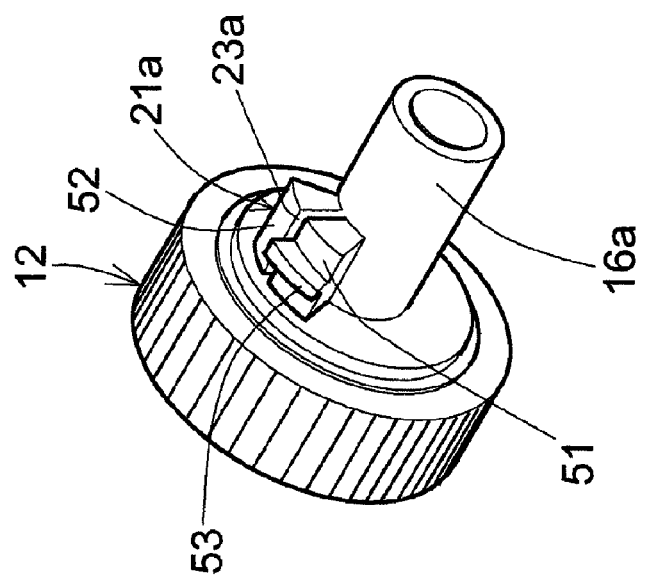
FIG. 69 is a perspective view of the input gear thereof.

With the coil springs 27a and 27'a mounted in this manner, the transmission hooks 28 and 28' are axially pressed against each other, and their bent portions abut the end surface of the hook reinforcing protrusion 53 (see FIGS. 66, 67 and 69). Thus, the protrusion 53 reinforces the transmission hooks 28 and 28'. That is, with the spring clutch 26a locked, when the input gear 12 rotates in the forward rotational direction A and driving torque is applied to the transmission hooks 28 and 28', bending moment that acts on their bent portions is supported by the hook reinforcing protrusion 53, thus preventing excessive bending moment from acting on the bent portions.

In the internally mounted type, in which the coil springs 27a and 27'a are mounted in the radially inner surface of the input clutch portion 15a, compared to the externally mounted type (in which the coil springs are tightly bound to the radially outer surface of the input clutch portion 15a with the transmission hooks 28 and 28' and the release hooks 29 and 29' bent radially outwardly, thereby bringing the transmission hooks 28 and 28' into engagement with the radially inner surface of the output gear 13; such as Embodiment 1), the coil portions of the coil springs have a relatively large diameter. Thus, if torque applied is the same, bending stress in the tangential direction of the transmission hooks 28 and 28' is smaller.

A circumferential gap a having a predetermined central angle exists between the release hooks 29 and 29' and the hook engaging portion 21a (see FIGS. 66 and 67). The distance between the release hooks 29 and 29' and the engaging surface 54 of the release portion 24a is indefinite because the position of the release portion 24a relative to the hook engaging portion 21a is indefinite.

Now the operation of the rotational direction switching clutch unit of Embodiment 13 is described. As shown in FIG. 65, when driving torque in the forward rotational direction A (shown by the arrow) is applied to the input gear 12 from an external driving source, the input gear 12 and the input clutch portion 15a, which is integral with the input gear 12, is rotated in the forward direction, so that the coil springs 27a and 27'a, which are ordinarily radially expanded, are further radially expanded, and the spring clutch 26a is locked (see FIGS. 66 and 67). Thus, driving torque in the forward rotational direction A is transmitted to the output gear 13 through the transmission hooks 28 and 28' of the coil springs 27a and 27'a, the hook engaging portion 21a, and the output clutch portion 16a, which is integral with the hook engaging portion 21a (see FIG. 65).

The reverse input gear 14 is separated from the reverse rotation driving source in this state, the reverse input gear 14, which is integral with the release portion 24a, is also rotated in the forward rotational direction A when the release hooks 29 and 29' engage the release portion 24a.

Figure 72:
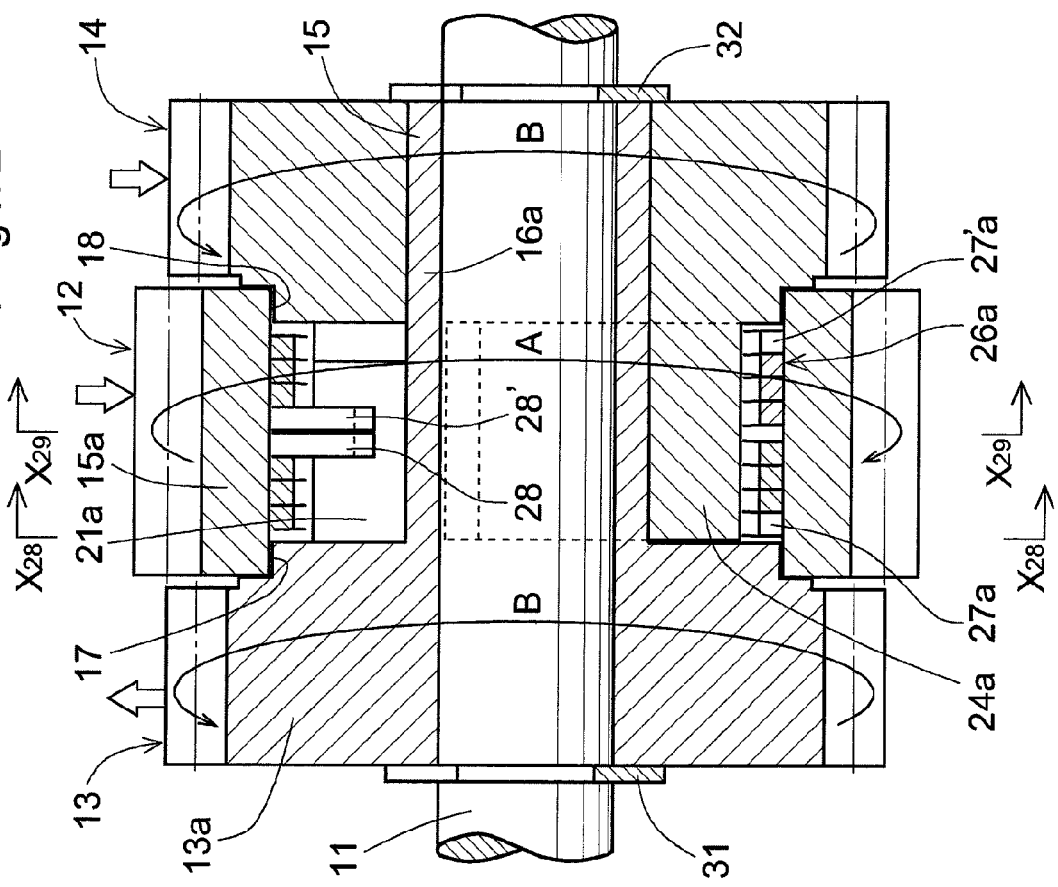
FIG. 72 is sectional view thereof while torque in the reverse rotational direction is being transmitted.
Figure 73:
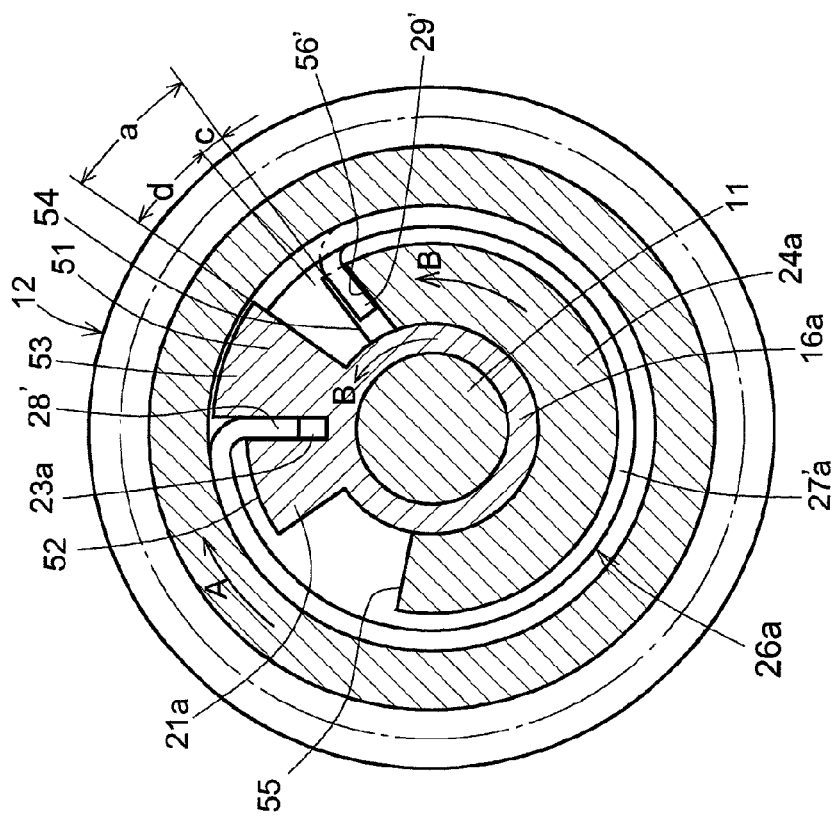
FIG. 73 is a sectional view taken along line X28-X28 of FIG. 72.
Figure 74:
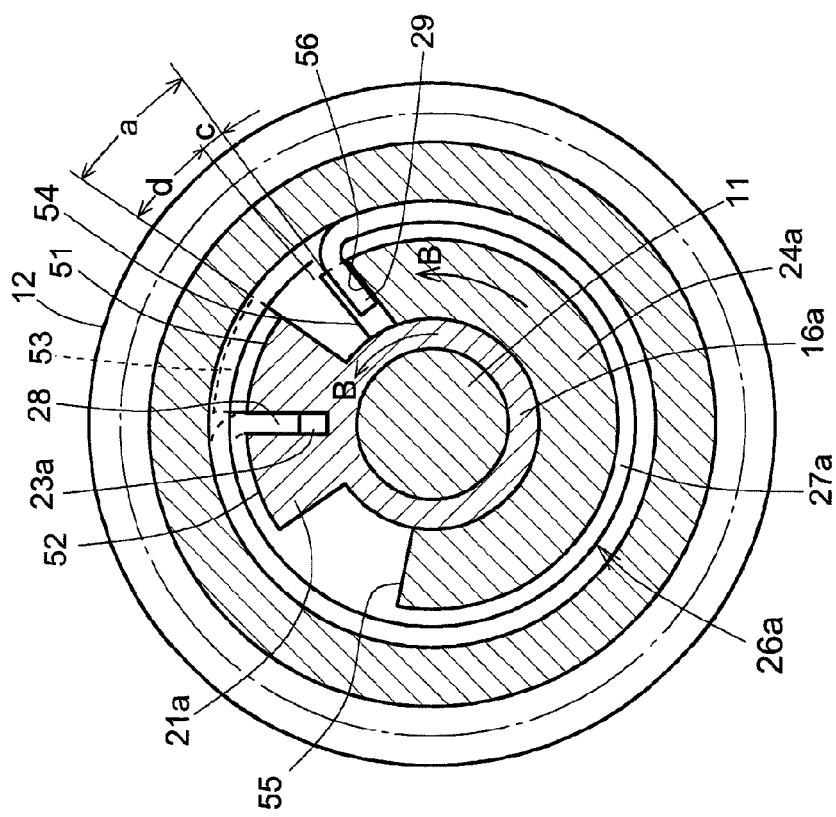
FIG. 74 is a sectional view taken along line X29-X29 of FIG. 72.

While driving torque in the forward rotational direction A is being applied to the input gear 12 and transmitted, when driving torque in the reverse rotational direction B is applied to the reverse input gear 14 (as shown in FIG. 72), the release portion 24a, which is integral with the reverse input gear 14, is rotated in the reverse rotational direction B. Thus, the engaging surface 54 of the release portion 24a engages the release hooks 29 and 29', and the engaging hooks 29 and 29' are received in the respective engaging grooves 56 and 56' (see FIGS. 73 and 74). When the hooks 29 and 29' are pushed by a distance c from this position, the coil springs 27a and 27'a are radially compressed, and the spring clutch 26a is unlocked. When the spring clutch is unlocked, transmission of torque in the forward rotational direction A is shut off, and the output gear 13 temporarily stops.

When the release hooks 29 and 29' are further pushed by a distance d, and the engaging surface 54 abuts the hook engaging portion 21a (as shown in FIGS. 75 and 76), driving torque in the reverse rotational direction B is transmitted from the release portion 24a to the output clutch portion 16a and the output gear 13, which is integral with the output clutch portion 16a, so that the output gear 13 is rotated in the reverse rotational direction B.

Figure 71:
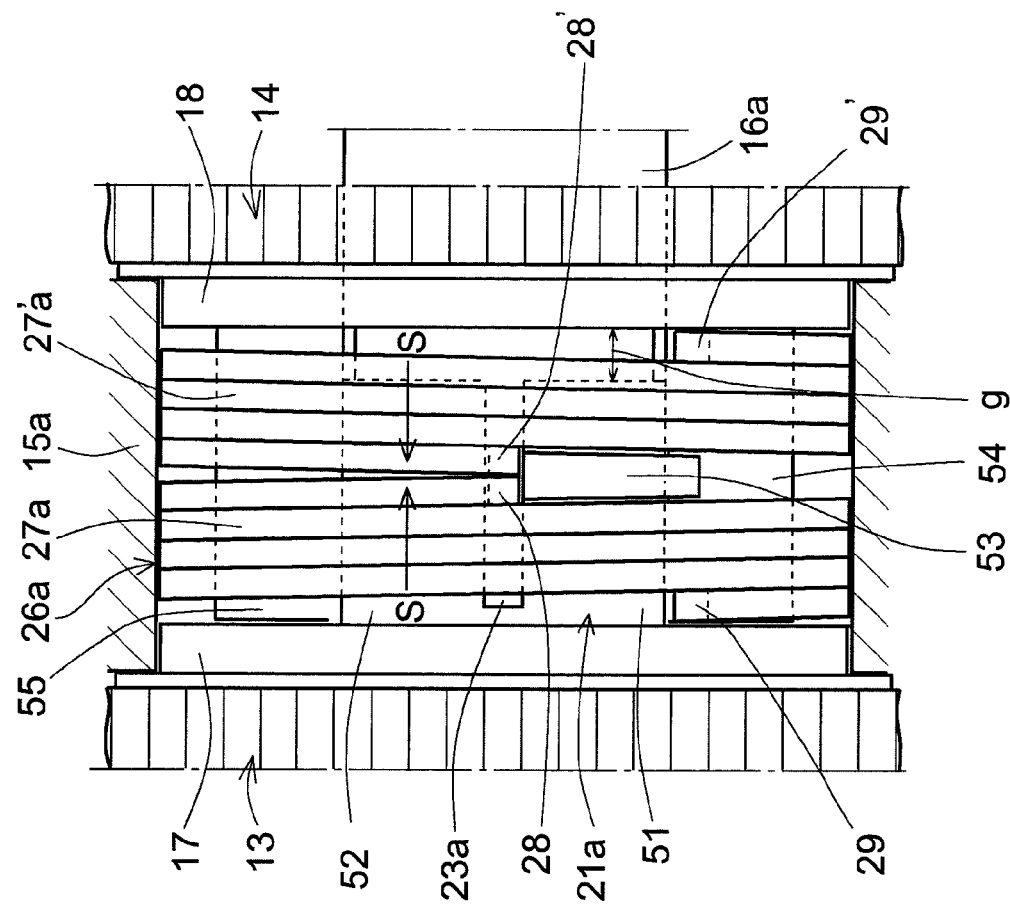
FIG. 71 is a partial vertical sectional front view thereof.

In this state, because the coil springs 27a and 27'a are radially compressed, and the input gear 12 is rotating in the forward rotational direction A, thrust forces S are produced in the respective coil springs 27a and 27'a (see FIG. 71). The thrust forces S are produced according to the helix angle of the coil springs 27a and 27'a when the input gear 12 rotates while in contact with the helical portions of the coil springs. A rightward thrust force S, i.e. a force toward the reverse input gear 14 is produced in the coil spring 27a, which is wound clockwise, and a leftward thrust force S, i.e. a force toward the output gear 13 is produced in the coil spring 27'a, which is wound counterclockwise. Because these thrust forces are of the same magnitude and opposite in direction, they cancel each other, and do not impede the rotation of the output gear 13 and the reverse input gear 14.

If two coil springs that were wound in the same direction, such as two coil springs 27a or two coil springs 27'a, were used, because thrust forces S are produced in the respective two coil springs in the same direction, the sum of these thrust forces would act on the input gear 12 or the reverse input gear 14, which could impede the rotation of the gears 12 and 14.

The invention claimed is:

1. A rotational direction switching clutch unit comprising an input gear (12), an output gear (13) and a reverse input gear (14) which are coaxially arranged in the axial direction, and a spring clutch (26, 26a);

wherein said input gear (12) includes an input clutch portion (15, 15a), and said output gear (13) includes an output clutch portion (16, 16a) that radially opposes said input clutch portion (15, 15a);

wherein said spring clutch (26, 26a) comprises coil springs (27 and 27', 27a and 27'a) tightly bound to said input clutch portion (15, 15a) and having such directivity that said spring clutch is locked when the input clutch portion (15, 15a) rotates in a forward rotational direction A, each of said coil springs (27 and 27', 27a and 27'a) having a transmission hook (28) at one end thereof and a release hook (29) at another end thereof, wherein with said transmission hooks (28) in engagement with a hook engaging portion (21, 21a) of the output clutch portion (16, 16a), said release hooks (29) are spaced by a predetermined distance from said transmission hooks (28) in the forward rotational direction A;

wherein said reverse input gear (14) has a release portion (24, 24a) axially protruding into a space between the input clutch portion (15, 15a) and the output clutch portion (16, 16a) and opposed to said release hooks (29) in a reverse rotational direction B; and wherein when said release portion (24, 24a) is rotated in the reverse rotational direction B by a distance c from an unlocking starting state in which the release portion (24, 24a) is in contact with the release hooks (29) while pushing the release hooks (29), said spring clutch (26, 26a) is configured to be unlocked, and when said release portion (24, 24a) is rotated in the reverse rotational direction B by a distance a from said unlocking starting state while pushing said release hooks (29), said release portion (24, 24a) is configured to engage said hook engaging portion (21, 21a), said distance a being greater than said distance c (a>c).

2. The rotational direction switching clutch unit of claim 1 wherein said reverse input gear (14) includes, besides said release portion (24, 24'), a reverse rotational portion (25, 25') axially protruding into the space between the input clutch portion (15) and the output clutch portion (16, 16') and opposed to a reverse rotation engaging portion (22, 22') of the output gear (13) in the reverse rotational direction B; and wherein when said reverse rotational portion (25, 25') is rotated in the reverse rotational direction B by a distance b from said unlocking starting state, said reverse rotational portion (25, 25') is configured to engage the reverse rotation engaging portion (22, 22'), said distances a, b and c being determined to satisfy the relation a>b>c.

3. The rotational direction switching clutch unit of claim 2 wherein the reverse input gear (14), the input gear (12) and the output gear (13) are axially arranged in this order, wherein the reverse input gear (13) includes a boss portion (33) inserted in said input gear (12), said clutch unit further comprising a flange member (35) comprising a flange boss portion (36) and a flange portion (37), said flange boss portion (36) extending through the input clutch portion (15) of the input gear (12) and being axially coupled to said boss portion (33), wherein said flange portion (37) is fitted on a radially inner surface of the output gear (13), and wherein said release portion (24) and said reverse rotational portion (25) are provided on said flange portion (37).

4. The rotational direction switching clutch unit of claim 2 wherein the hook engaging portion (21) and the reverse rotation engaging portion (22) of the output gear (13) comprise protrusions radially inwardly extending from a radially inner surface of the output gear (13), and wherein the release portion (24) and the reverse rotational portion (25) of the reverse input gear (14) are arm portions axially protruding from an inner end surface of the reverse input gear (14) into the space between the input clutch portion (15) and the output clutch portion (16).

5. The rotational direction switching clutch unit of claim 2 wherein the release portion (24') and the reverse rotational portion (25') of the reverse input gear (14) comprise protrusions radially inwardly extending from a radially inner surface of the reverse input gear (14), and wherein the hook engaging portion (21') and the reverse rotation engaging portion (22') of the output gear (13) are arm portions axially protruding from an inner end surface of the output gear (13) into the space between the input clutch portion (15) and the output clutch portion (16).

6. The rotational direction switching clutch unit of claim 5 wherein the release portion (24') of the reverse input gear (14) comprises a protrusion radially inwardly extending from a radially inner surface of said reverse input gear (14), and wherein the hook engaging portion (21') of the output gear (13) is an arm portion axially protruding from an inner end surface of the output gear (13) into the space between the input clutch portion (15) and the output clutch portion (16).

7. The rotational direction switching clutch unit of claim 1 wherein said spring clutch (26) comprises a plurality of axially arranged coil springs (27, 27').

8. The rotational direction switching clutch unit of claim 1 wherein said coil springs (27, 27') are mounted around a radially outer surface of the input clutch portion (15).

9. The rotational direction switching clutch unit of claim 1 wherein the input gear (12), the output gear (13) and the reverse input gear (14) are axially arranged in this order.

10. The rotational direction switching clutch unit of claim 1 wherein the input gear (12), the reverse input gear (14) and the output gear (13) are axially arranged in this order, wherein the input gear (12) has a boss portion (38) extending through the reverse input gear (14), said clutch unit further comprising a flange member (39) comprising a flange boss portion (41) and a flange portion (42), said flange boss portion (41) being axially coupled to said boss portion (38), wherein said flange portion (42) is fitted on a radially inner surface of the output gear (13), and wherein said input clutch portion (15) is formed by a portion of said boss portion (38) and said flange boss portion (41).

11. The rotational direction switching clutch unit of claim 1 wherein the input gear (12), the reverse input gear (14) and the output gear (13) are axially arranged in this order, wherein the input gear (12) has a boss portion (38) extending through the reverse input gear (14), wherein said input clutch portion (15) is integrally provided on a front end of said boss portion (38), and wherein said output gear (13) includes a radially inwardly extending flange portion (42') that is fitted to the input clutch portion (15).

12. The rotational direction switching clutch unit of claim 1 wherein the transmission hooks (28) of the coil springs (27) are engaged in an engaging slit (23) formed in the hook engaging portion (21).

13. The rotational direction switching clutch unit of claim 1 wherein the transmission hooks (28) of the coil springs (27) are opposed to a rear end surface of the hook engaging portion (21) with respect to the forward rotational direction A, and wherein when the input clutch portion (15) rotates in the forward rotational direction A relative to the output clutch portion (16), the transmission hooks (28) are configured to engage said rear end surface of the hook engaging portion (21) in the forward rotational direction.

14. The rotational direction switching clutch unit of claim 1 wherein said spring clutch (26) comprises an even number of coil springs (27, 27') that are arranged axially close to each other, and wherein half of said coil springs is or are wound in an opposite direction to the other half of the coil springs.

15. The rotational direction switching clutch unit of claim 1 wherein said coil springs (27a, 27'a) are fitted on a radially inner surface of the input clutch portion (15a).

16. The rotational direction switching clutch unit of claim 15 wherein said spring clutch (26a) comprises an even number of coil springs (27a, 27'a) that are arranged axially close to each other, and wherein half of said coil springs is or are wound in an opposite direction to the other half of the coil springs.

17. The rotational direction switching clutch unit of claim 15 wherein said spring clutch comprises a pair of axially adjacent coil springs (27a, 27'a), and wherein the transmission hooks (28, 28') of the pair of coil springs are engaged in an axial engaging slit (23a) formed in the hook engaging portion (21a).

18. The rotational direction switching clutch unit of claim 15 wherein said hook engaging portion (21a) is divided into a front engaging portion (51) and a rear engaging portion (52) with respect to the forward rotational direction A by the engaging slit (23a), said front engaging portion (51) having a hook reinforcing protrusion (53) configured to abut said transmission hooks (28, 28').

19. The rotational direction switching clutch unit of claim 15 wherein the hook engaging portion (21a) is provided on a radially outer surface of the output clutch portion (16a) of the output gear (13), and wherein the release portion (24a) of the reverse input gear (14) is an arcuate portion surrounding and supporting a radially outer surface of the output clutch portion (16a) over its range of more than 90 degrees in the rotational direction.

20. The rotational direction switching clutch unit of claim 19 wherein the release portion (24a) has an engaging surface (54) formed with engaging grooves (56) corresponding to the respective release hooks (29) in their rotational direction.

* * * * *